(12) United States Patent
Kondo

(10) Patent No.: US 9,961,366 B2
(45) Date of Patent: May 1, 2018

(54) IMAGE PROCESSING APPARATUS AND METHOD THAT PROHIBITS BI-PREDICTION BASED ON BLOCK SIZE

(71) Applicant: Sony Corporation, Tokyo (JP)

(72) Inventor: Kenji Kondo, Tokyo (JP)

(73) Assignee: SONY CORPORATION, Tokyo (JP)

(*) Notice: Subject to any disclaimer, the term of this patent is extended or adjusted under 35 U.S.C. 154(b) by 361 days.

(21) Appl. No.: 14/365,415

(22) PCT Filed: Jan. 9, 2013

(86) PCT No.: PCT/JP2013/050213
§ 371 (c)(1),
(2) Date: Jun. 13, 2014

(87) PCT Pub. No.: WO2013/108690
PCT Pub. Date: Jul. 25, 2013

(65) Prior Publication Data
US 2014/0348233 A1    Nov. 27, 2014

(30) Foreign Application Priority Data

Jan. 19, 2012 (JP) ................. 2012-009329
Mar. 2, 2012 (JP) ................. 2012-046566
Apr. 26, 2012 (JP) ................. 2012-101006

(51) Int. Cl.
*H04N 19/593* (2014.01)
*H04N 19/29* (2014.01)
*H04N 19/119* (2014.01)

(52) U.S. Cl.
CPC ......... *H04N 19/593* (2014.11); *H04N 19/119* (2014.11)

(58) Field of Classification Search
CPC .................... H04N 19/119; H04N 19/593
(Continued)

(56) References Cited

U.S. PATENT DOCUMENTS

2005/0062885 A1* 3/2005 Kadono .......... H04N 19/137
348/407.1
2008/0043845 A1* 2/2008 Nakaishi ........ H04N 19/176
375/240.16

(Continued)

OTHER PUBLICATIONS

Kondo et al., Non-CE3: Report on a restriction for small block, Nov. 21-30, 2011, Joint Collaborative Team on Video Coding (JCT-VC) of ITU-T SG16 WP3 and ISO/IEC JTC1/SC29/WG11 7th Meeting: Geneva, CH.*

(Continued)

*Primary Examiner* — Francis Geroleo
(74) *Attorney, Agent, or Firm* — Paratus Law Group, PLLC

(57) ABSTRACT

The present technology relates to an image processing apparatus and method capable of preventing an increase in a cost of the apparatus. A setting unit sets identification information for identifying a correspondence relationship between a size of a block of an image and changing of a prediction method applied to the block, and an inter-prediction unit generates a prediction image according to the identification information. An encoder codes the block by using the prediction image so as to generate a coded stream. In addition, the encoder transmits the coded stream and the identification information. The present technology is applicable to, for example, a case of coding/decoding an image, and the like.

16 Claims, 46 Drawing Sheets

(58) Field of Classification Search
USPC .................................................. 375/240.12
See application file for complete search history.

(56) References Cited

U.S. PATENT DOCUMENTS

| | | | |
|---|---|---|---|
| 2012/0195366 A1* | 8/2012 | Liu ................... | H04N 19/159 375/240.02 |
| 2012/0243609 A1* | 9/2012 | Zheng ................ | H04N 19/197 375/240.15 |
| 2012/0250765 A1* | 10/2012 | Wu .................... | H04N 19/105 375/240.12 |

OTHER PUBLICATIONS

Test Model under Consideration, Joint Collaborative Team on Video Coding (JCT-VC) of ITU-T SG16 WP3 and ISO/IEC JTC1/SC29/WG11, Jul. 21-28, 2010, p. 1-153, 2$^{nd}$ Meeting, Geneva, Switzerland.

Jung, et al., Competition-Based Scheme for Motion Vector Selection and Coding, ITU—Telecommunications Standardization Sector Study Group 16 Question 6 Video Coding Experts Group (VCEG), Jul. 17-18, 2006, p. 1-7, 29$^{th}$ Meeting, Klagenfurt, Austria.

Winken, et al., Description of video coding technology proposal by Fraunhofer HHI, Joint Collaborative Team on Video Coding (JCT-VC) of ITU-T SG16 WP3 and ISO/IEC JTC1/SC29/WG11, Apr. 15-23, 2010, p. 1-44, 1$^{st}$ Meeting, Dresden, Germany.

Dec. 30, 2016, CN communication issued for related CN application No. 201380005304.0.

Kenji Kondo, et al. Non-CE3: Report on a restriction for small block, Joint Collaborative Team on Video Coding (JCT-VC) of ITU-T SG16 WP3 and ISO/IEC JTC1/SC29/WG11, 7$^{th}$ Meeting, Nov. 21-30, 2011, pp. 1-8, Geneva, CH.

Tomohiro Ikai, Bi-prediction restriction in small PU, Joint Collaborative Team on Video Coding (JCT-VC) of ITU-T SG16 WP3 and ISO/IEC JTC1/SC29/WG11, 7$^{th}$ Meeting, Nov. 21-30, 2011, pp. 1-5, Geneva, CH.

* cited by examiner

X: current inter-coded prediction block
L: left neighbour of current block X
T: top neighbour of current block X

FIG. 17 disable_bip_small_mrg_idc INFORMATION

| VALUE | CHANGING OF PREDICTION METHOD |
|---|---|
| 0 | NO CHANGE |
| 1 | CHANGE BI-PREDICTION TO UNI-PREDICTION FOR BLOCK OF 4×4 |
| 2 | CHANGE BI-PREDICTION TO UNI-PREDICTION FOR BLOCK OF 4×4, 8×4, AND 4×8 |
| 3 | CHANGE BI-PREDICTION TO UNI-PREDICTION FOR BLOCK OF 4×4, 8×4, 4×8, AND 8×8 |

FIG. 19 disable_bip_small_mrg_idc EXTENSION INFORMATION

| VALUE | CHANGING OF PREDICTION METHOD |
|---|---|
| 0 | NO CHANGE |
| 1 | CHANGE BI-PREDICTION TO L0 PREDICTION FOR BLOCKS OF 4×4 |
| 2 | CHANGE BI-PREDICTION TO L1 PREDICTION FOR BLOCKS OF 4×4 |
| 3 | CHANGE BI-PREDICTION TO L0 PREDICTION FOR BLOCKS OF 4×4, 8×4, AND 4×8 |
| 4 | CHANGE BI-PREDICTION TO L1 PREDICTION FOR BLOCKS OF 4×4, 8×4, AND 4×8 |
| 5 | CHANGE BI-PREDICTION TO L0 PREDICTION FOR BLOCKS OF 4×4, 8×4, 4×8, AND 8×8 |
| 6 | CHANGE BI-PREDICTION TO L1 PREDICTION FOR BLOCKS OF 4×4, 8×4, 4×8, AND 8×8 |

FIG. 25

| RESTRICTION MODE RB | CONTENT OF RESTRICTION | | | | | |
|---|---|---|---|---|---|---|
| B1(Lv. 1) | Bi-4×4 | | | | | |
| B2(Lv. 2) | Bi-4×4 | Bi-4×8 | | | | |
| B3(Lv. 3) | Bi-4×4 | Bi-4×8 | Bi-8×4 | | | |
| B4(Lv. 4) | Bi-4×4 | Bi-4×8 | Bi-8×4 | Uni-4×4 | | |
| B5(Lv. 5) | Bi-4×4 | Bi-4×8 | Bi-8×4 | Uni-4×4 | Bi-8×8 | |
| B6(Lv. 6) | Bi-4×4 | Bi-4×8 | Bi-8×4 | Uni-4×4 | Bi-8×8 | Uni-4×8 |
| B7(Lv. 7) | Bi-4×4 | Bi-4×8 | Bi-8×4 | Uni-4×4 | Bi-8×8 | Uni-4×8 | Uni-8×4 |

FIG. 29

| Frame rate | LCU size | RESTRICTION MODE RV | | |
|---|---|---|---|---|
| | | V1(Lv. 1) | V2(Lv. 2) | V3(Lv. 3) |
| 0<rate<=30 | 8x8 | 8 | 4 | 2 |
| | 16x16 | 32 | 16 | 8 |
| | 32x32 | 128 | 64 | 32 |
| | 64x64 | 512 | 256 | 128 |
| 30<rate<=60 | 8x8 | 4 | 2 | 1 |
| | 16x16 | 16 | 8 | 4 |
| | 32x32 | 64 | 32 | 16 |
| | 64x64 | 256 | 128 | 64 |
| 60<rate<=120 | 8x8 | 2 | 1 | 1 |
| | 16x16 | 8 | 4 | 2 |
| | 32x32 | 32 | 16 | 8 |
| | 64x64 | 128 | 64 | 32 |

FIG. 30

| | Descriptor |
|---|---|
| seq_parameter_set_rbsp() { | |
| profile_idc | u(8) |
| ... | |
| if(log2_min_coding_block_size_minus3==0) | |
| inter_4x4_enabled_flag | u(1) |
| disable_bip_small_mrg_idc | u(2) |
| num_short_term_ref_pic_sets | ue(v) |
| ... | |
| } | |

FIG. 31

| disable_bip_small_mrg_idc | SIZE OF PU (prediction blocks) FOR WHICH BI-PREDICTION IS PROHIBITED |
|---|---|
| 0 | - |
| 1 | 4x4 |
| 2 | 4x4, 8x4, 4x8 |
| 3 | 4x4, 8x4, 4x8, 8x8 |

FIG. 32

| | | |
|---|---|---|
| seq_parameter_set_rbsp( ) { | | |
| ... | | |
| temporal_id_nesting_flag | | u(1) |
| if(log2_min_coding_block_size_minus3<=1) | | |
| disable_inter_4x8_8x4_8x8_bidir_flag | | u(1) |
| if(log2_min_coding_block_size_minus3==0 && disable_inter_4x8_8x4_8x8_bidir_flag==0) | | |
| disable_inter_4x8_8x4_bidir_flag | | u(1) |
| num_short_term_ref_pic_sets | | ue(v) |

FIG. 33

| | |
|---|---|
| prediction_unit(x0,y0,log2PbSize) { | |
| ... | |
| } else { /* MODE_INTER */ | |
| merge_flag[x0][y0] | ae(v) |
| if(merge_flag[x0][y0]) { | |
| if(MaxNumMergeCand>1) | |
| merge_idx[x0][y0] | ae(v) |
| } else { | |
| disable_bidir=( <br> (log2PbSize==3 && ( <br> (disable_inter_4x8_8x4_bidir_flag && (PartMode==PART_Nx2N \|\| PartMode ==PART_2NxN \|\| PartMode ==PART_NxN ) )\|\| <br> (disable_inter_4x8_8x4_8x8_bidir_flag && PartMode==PART_2Nx2N) <br> )) \|\| <br> (log2PbSize==4 && disable_inter_4x8_8x4_8x8_bidir_flag && PartMode == PART_NxN ) <br> ) ? 1 : 0; | |
| if(slice_type == B && !disable_bidir) | |
| inter_pred_flag[x0][y0] | ae(v) |
| if(inter_pred_flag[x0][y0] == Pred_LC ){ | |
| if(num_ref_idx_lc_active_minus1>0) | |
| ref_idx_lc[x0][y0] | ae(v) |
| mvd_coding(mvd_lc[x0][y0][0], <br> mvd_lc[x0][y0][1]) | |
| mvp_lc_flag[x0][y0] | ae(v) |

# IMAGE PROCESSING APPARATUS AND METHOD THAT PROHIBITS BI-PREDICTION BASED ON BLOCK SIZE

CROSS REFERENCE TO PRIOR APPLICATION

This application is a National Stage Patent Application of PCT International Patent Application No. PCT/JP2013/050213 (filed on Jan. 9, 2013) under 35 U.S.C. § 371, which claims priority to Japanese Patent Application Nos. 2012-009329 (filed on Jan. 19, 2012), 2012-046566 (filed on Mar. 2, 2012), and 2012-101006 (filed on Apr. 26, 2012), which are all hereby incorporated by reference in their entirety.

TECHNICAL FIELD

The present technology relates to an image processing apparatus and an image processing method, and, particularly to an image processing apparatus and an image processing method capable of, for example, preventing an increase in a cost of the apparatus.

BACKGROUND ART

In recent years, apparatuses which conform to a method such as Moving Picture Experts Group (MPEG) have been widely used for both of information delivery in broadcasting stations or the like and information reception in ordinary homes. MPEG treats image information as a digital value, and, at this time, compresses the image information through orthogonal transform such as discrete cosine transform and motion compensation by using redundancy unique to the image information in order to transmit and accumulate information with high efficiency.

Particularly, MPEG2 (International Organization for Standardization (ISO)/International Electrotechnical Commission (IEC) 13818-2) is defined as a general use image coding method, and is currently widely used in extensive applications for professional use and consumer use as a standard covering both an interlaced scanning image and a progressive scanning image, and a standard resolution image and a high definition image. By the use of the MPEG2 compression method, it is possible to realize a high compression ratio and good image quality, for example, by assigning a bit rate of 4 Mbps to 8 Mbps to an interlaced scanning image of a standard resolution having 720×480 pixels and assigning a bit rate of 18 Mbps to 22 Mbps to an interlaced scanning image of a high resolution having 1920×1088.

MPEG2 has mainly targeted high image quality coding suitable for broadcasting, but has not handled a coding method at a bit rate lower than that in MPEG1, that is, at a higher compression ratio. With the wide use of portable terminals, the need for such a coding method has been considered to increase, and thus a MPEG4 coding method has been standardized so as to correspond thereto. In relation to an image coding method, a standard thereof was approved as an international standard entitled ISO/IEC 14496-2 on December, 1998.

In addition, in recent years, standardization of a standard called H.26L (International Telecommunication Union Telecommunication Standardization Sector (ITU-T) Q6/16 Video Coding Expert Group (VCEG)) has progressed for the original purpose of image coding for video conference use. H.26L requires a larger calculation amount due to coding and decoding than the coding method of the related art such as MPEG2 or MPEG4, but is known for realizing higher coding efficiency. Further, as part of activities of MPEG4, Joint Model of Enhanced-Compression Video Coding is currently being standardized in order to realize higher coding efficiency by also incorporating functions which are not supported by H.26L on the basis of H.26L.

As for the standardization schedule thereof, the coding method has become an international standard under the name of H.264 and MPEG-4 Part 10 (Advanced Video Coding which will be hereinafter referred to as AVC) on March, 2003.

However, there is a concern that a macroblock size of 16 pixels×16 pixels may not be optimum for a large picture frame such as Ultra High Definition (UHD; 4000 pixels×2000 pixels) which will become a target of a next-generation coding method.

Therefore, currently, for the purpose of improvement in higher coding efficiency than that of AVC, standardization of a coding method called High Efficiency Video Coding (HEVC) is in progress by Joint Collaboration Team-Video Coding (JCTVC) which is a joint standardization organization of ITU-T and ISO/IEC (for example, refer to NPL 1).

In the HEVC coding method, a coding unit (CU) which is the same process unit as the macroblock in the AVC is defined. The CU is not fixed to a size of 16×16 pixels unlike in the macroblock of the AVC, and is designated in image compression information for each sequence.

Meanwhile, a method has been proposed in which, in order to improve coding of a motion vector using median prediction in the AVC, either of "temporal predictor" and "spatio-temporal predictor" is adaptively used as prediction motion vector information in addition to "spatial predictor" which is defined in the AVC and is obtained by the median prediction (for example, refer to NPL 2).

An image information coding apparatus calculates a cost function when prediction motion vector information is used in each block and selects optimal prediction motion vector information. Flag information indicating information regarding which prediction motion vector information is used in each block is transmitted in image compression information.

In addition, as one of the coding methods of motion information, a method (hereinafter, referred to as a merge mode) called motion partition merging has been proposed (for example, refer to NPL 3). In this method, in a case where motion information of a corresponding block is the same as motion information of a neighboring block, only flag information is transmitted, and, during decoding, motion information of the corresponding block is rebuilt by using the motion information of the neighboring block.

CITATION LIST

Non Patent Literature

NPL 1: "Test Model under Consideration", JCTVC-B205, Joint Collaborative Team on Video Coding (JCT-VC) of ITU-T SG16 WP3 and ISO/IEC JTC1/SC29/WG112nd Meeting: Geneva, CH, 21 to 28 Jul. 2010

NPL 2: Joel Jung, Guillaume Laroche, "Competition-Based Scheme for Motion Vector Selection and Coding", VCEG-AC06, ITU-Telecommunications Standardization Sector STUDY GROUP 16 Question 6 Video Coding Experts Group (VCEG) 29th Meeting: Klagenfurt, Austria, 17 and 18 Jul. 2006

NPL 3: Martin Winken, Sebastian Bosse, Benjamin Bross, Philipp Helle, Tobias Hinz, Heiner Kirchhoffer, Haricharan Lakshman, Detlev Marpe, Simon Oudin, Matthias Preiss, Heiko Schwarz, Mischa Siekmann, Karsten Suehring, and Thomas Wiegand, "Description of video coding technology proposed by Fraunhofer HHI", JCTVC-A116, April, 2010

SUMMARY OF INVENTION

Technical Problem

In the AVC or HEVC, prediction coding is performed in which a prediction image is generated, and an image is coded by using the prediction image.

In the prediction coding, since a decoded image which is previously (coded and) decoded is used to generate the prediction image, and thus the decoded image is stored in a memory called a decode picture buffer (DPB) or the like as necessary. The decoded image stored in the DPB is read from the DPB as a reference image when a prediction image is generated.

However, if a high rate is to be secured as a memory bandwidth which is a transmission rate at which a decoded image is read from the DPB, a cost of an apparatus increases.

The present technology has been made in consideration of these circumstances and is to enable prevention of an increase in a cost of an apparatus.

Solution to Problem

According to a first aspect of the present technology, there is provided an image processing apparatus including a setting unit that sets identification information for identifying a correspondence relationship between a size of a block of an image and changing of a prediction method applied to the block; a prediction unit that generates a prediction image according to the identification information set by the setting unit; a coding unit that codes the image by using the prediction image generated by the prediction unit, so as to generate a coded stream; and a transmission unit that transmits the coded stream generated by the coding unit and the identification information set by the setting unit.

According to the first aspect of the present technology, there is provided an image processing method including a setting step of setting identification information for identifying a correspondence relationship between a size of a block of an image and changing of a prediction method applied to the block; a prediction step of generating a prediction image according to the identification information set in the setting step; a coding step of coding the image by using the prediction image generated in the prediction step, so as to generate a coded stream; and a transmission step of transmitting the coded stream generated in the coding step and the identification information set in the setting step.

In the above-described first aspect, identification information for identifying a correspondence relationship between a size of a block of an image and changing of a prediction method applied to the block is set, and a prediction image is generated according to the identification information. In addition, the image is coded by using the prediction image, and thus a coded stream is generated. Further, the coded stream and the identification information are transmitted.

According to a second aspect of the present technology, there is provided an image processing apparatus including a reception unit that receives identification information for identifying a correspondence relationship between a size of a block of an image and changing of a prediction method applied to the block, and a coded stream generated by coding the image; a prediction unit that generates a prediction image according to the identification information received by the reception unit; and a decoding unit that decodes the coded stream received by the reception unit by using the prediction image generated by the prediction unit.

According to the second aspect of the present technology, there is provided an image processing method including a reception step of receiving identification information for identifying a correspondence relationship between a size of a block of an image and changing of a prediction method applied to the block, and a coded stream generated by coding the image; a prediction step of generating a prediction image according to the identification information received in the reception step; and a decoding step of decoding the coded stream received in the reception step by using the prediction image generated in the prediction step.

In the above-described second aspect, identification information for identifying a correspondence relationship between a size of a block of an image and changing of a prediction method applied to the block, and a coded stream generated by coding the image, are received, and a prediction image is generated according to the identification information. In addition, the coded stream is decoded by using the prediction image.

Advantageous Effects of Invention

According to the present technology, it is possible to prevent an increase in a cost of an apparatus.

BRIEF DESCRIPTION OF DRAWINGS

FIG. 17 is a diagram illustrating disable_bip_small_m-rg_idc information.

FIG. 19 is a diagram illustrating disable_bip_small_mrg_idc extension information.

FIG. 25 is a diagram illustrating a restriction mode RB.

FIG. 29 is a diagram illustrating a restriction mode RV.

FIG. 30 is a diagram illustrating a first example of syntax of header information of coded data, including identification information.

FIG. 31 is a diagram illustrating values of flag disable_bip_small_mrg_idc and sizes of blocks for which bi-prediction is prohibited due to the flag disable_bip_small_mrg_idc at each value.

FIG. 32 is a diagram illustrating a second example of syntax of header information of coded data, including identification information.

FIG. 33 is a diagram illustrating a second example of syntax of header information of coded data, including identification information.

DESCRIPTION OF EMBODIMENTS

Hereinafter, a basis forming the present technology will be described prior to description of an embodiment of the present technology.

[Image Coding Device]

Figure 1:
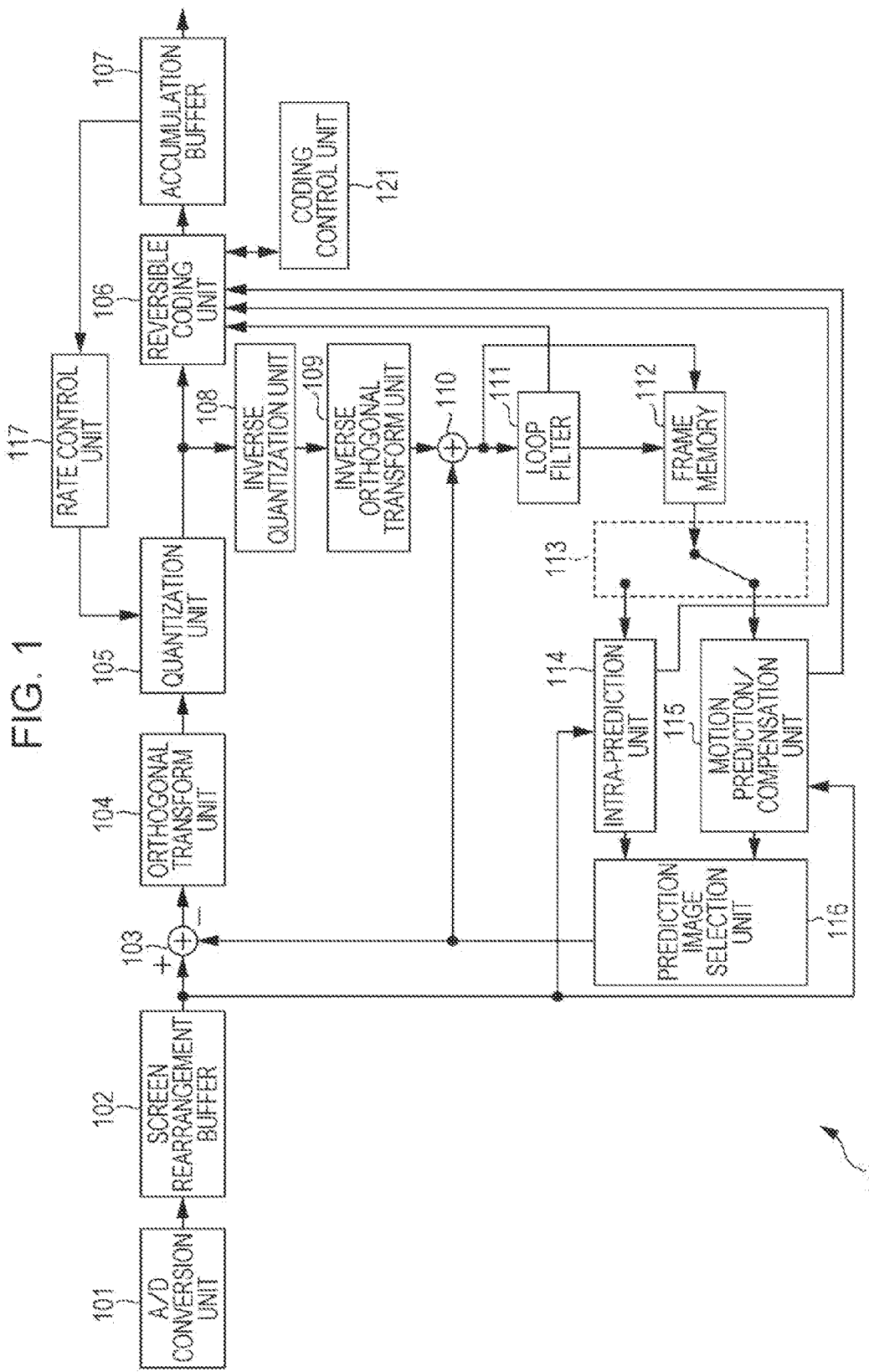
FIG. 1 is a block diagram illustrating a main configuration example of an image coding device.

FIG. 1 is a block diagram illustrating a main configuration example of an image coding device.

The image coding device 100 illustrated in FIG. 1 codes image data by using a prediction process in the same manner as in the H.264 and Moving Picture Experts Group (MPEG)4 Part 10 (Advanced Video Coding (AVC)) coding method.

As illustrated in FIG. 1, the image coding device 100 includes an A/D conversion unit 101, a screen rearrangement buffer 102, a calculation unit 103, an orthogonal transform unit 104, a quantization unit 105, a reversible coding unit 106, and an accumulation buffer 107. In addition, the image coding device 100 includes an inverse quantization unit 108, an inverse orthogonal transform unit 109, a calculation unit 110, a loop filter 111, a frame memory 112, a selection unit 113, an intra-prediction unit 114, a motion prediction/compensation unit 115, a prediction image selection unit 116, and a rate control unit 117.

The image coding device 100 further includes a coding control unit 121.

The A/D conversion unit 101 performs A/D conversion on input image data, and supplies and stores the converted image data (digital data) to and in the screen rearrangement buffer 102. The screen rearrangement buffer 102 rearranges images of frames in a stored display order, in an order of frames for coding in accordance with a group of picture (GOP), and supplies the images of which an order of the frames is rearranged to the calculation unit 103. In addition, the screen rearrangement buffer 102 also supplies the images of which an order of the frames is rearranged to the intra-prediction unit 114 and the motion prediction/compensation unit 115.

The calculation unit 103 subtracts a prediction image which is supplied from the intra-prediction unit 114 or the motion prediction/compensation unit 115 via the prediction image selection unit 116, from the image which is read from the screen rearrangement buffer 102, and outputs difference information thereof to the orthogonal transform unit 104.

For example, in a case of an image on which inter-coding is performed, the calculation unit 103 subtracts a prediction image which is supplied from the motion prediction/compensation unit 115, from an image which is read from the screen rearrangement buffer 102.

The orthogonal transform unit 104 performs orthogonal transform such as discrete cosine transform or Karhuen-Loeve transform on the difference information supplied from the calculation unit 103. In addition, any method of the orthogonal transform may be used. The orthogonal transform unit 104 supplies a transform coefficient obtained by the orthogonal transform to the quantization unit 105.

The quantization unit 105 quantizes the transform coefficient supplied from the orthogonal transform unit 104. The quantization unit 105 sets a quantization parameter on the basis of information on a target value of a bit rate supplied from the rate control unit 117, and quantizes the parameter. In addition, any method of the quantization may be used. The quantization unit 105 supplies the quantized transform coefficient to the reversible coding unit 106.

The reversible coding unit 106 codes the transform coefficient which has been quantized in the quantization unit 105, by using any coding method. The transform coefficient is quantized under the control of the rate control unit 117, and thus the bit rate becomes a target value (or is approximated to the target value) set by the rate control unit 117.

In addition, the reversible coding unit 106 acquires information or the like indicating an intra-prediction mode from the intra-prediction unit 114, and acquires information indicating an inter-prediction mode or motion vector information from the motion prediction/compensation unit 115. Further, the reversible coding unit 106 acquires a filter coefficient which has been used in the loop filter 111.

The reversible coding unit 106 codes the various information pieces by using any coding method, and uses the coded information as a part of header information of coded data (multiplexes). The reversible coding unit 106 supplies and accumulates coded data which is obtained by the coding to and in the accumulation buffer 107.

For example, variable length coding, arithmetic coding, or the like may be used as a coding method for the reversible coding unit 106. The variable length coding may include, for example, Context-Adaptive Variable Length Coding (CAVLC) defined in H.264/AVC method, or the like. The arithmetic coding may include, for example, Context-Adaptive Binary Arithmetic Coding (CABAC) or the like.

The accumulation buffer 107 temporarily holds the coded data supplied from the reversible coding unit 106. The accumulation buffer 107 outputs the coded data held therein, for example, to a recording device (recording medium) or a transmission path (not illustrated) in a subsequent stage, at a predetermined timing.

In addition, the transform coefficient quantized in the quantization unit 105 is also supplied to the inverse quantization unit 108. The inverse quantization unit 108 inversely quantizes the quantized transform coefficient in a method corresponding to the quantization in the quantization unit 105. Any method of the inverse quantization may be used as long as the method corresponds to the quantization process in the quantization unit 105. The inverse quantization unit 108 supplies an obtained transform coefficient to the inverse orthogonal transform unit 109.

The inverse orthogonal transform unit 109 performs inverse orthogonal transform on the transform coefficient supplied from the inverse quantization unit 108 in a method corresponding to the orthogonal transform process in the orthogonal transform unit 104. Any method of the inverse orthogonal transform may be used as long as the method corresponds to the orthogonal transform process in the orthogonal transform unit 104. The output which has undergone the inverse orthogonal transform (recovered difference information) is supplied to the calculation unit 110.

The calculation unit 110 adds the prediction image which is supplied from the intra-prediction unit 114 or the motion prediction/compensation unit 115 via the prediction image selection unit 116, to the inverse orthogonal transform result supplied from the inverse orthogonal transform unit 109, that is, the recovered difference information, thereby obtaining a locally decoded image (decoded image). The decoded image is supplied to the loop filter 111 or the frame memory 112.

The loop filter 111 includes a deblock filter, an adaptive loop filter, or the like, and performs an appropriate filter process on the decoded image supplied from the calculation unit 110. For example, the loop filter 111 performs a deblock filter process on the decoded image so as to remove block distortion from the decoded image. In addition, for example, the loop filter 111 performs a loop filter process on the deblock filter process result (the decoded image from which the block distortion is removed) by using a Wiener filter, thereby improving image quality.

Further, the loop filter 111 may perform any filter process on the decoded image. Furthermore, the loop filter 111 may supply information such as a filter coefficient which has been used in the filter process to the reversible coding unit 106 so as to allow the information to be coded, as necessary.

The loop filter 111 supplies the filter process result (the decoded image having undergone the filter process) to the frame memory 112. In addition, as described above, the decoded image output from the calculation unit 110 may be supplied to the frame memory 112 without using the loop filter 111. In other words, the filter process by the loop filter 111 may be omitted.

The frame memory 112 stores the supplied decoded image, and supplies the stored decoded image to the selection unit 113 as a reference image at a predetermined timing.

The selection unit 113 selects a supply destination of the reference image which is supplied from the frame memory 112. For example, in a case of inter-prediction, the selection unit 113 supplies the reference image supplied from the frame memory 112, to the motion prediction/compensation unit 115.

The intra-prediction unit 114 performs intra-prediction (in-screen prediction) for generating a prediction image with a fundamental prediction unit (PU) as a process unit by using a pixel value in a process target picture which is the reference image supplied from the frame memory 112 via the selection unit 113. The intra-prediction unit 114 performs the intra-prediction in a plurality of modes (intra-prediction mode) which are prepared in advance.

The intra-prediction unit 114 generates prediction images in all candidate intra-prediction modes, evaluates a cost function value of each prediction image by using an input image supplied from the screen rearrangement buffer 102, and selects an optimal mode. If an optimal intra-prediction mode is selected, the intra-prediction unit 114 supplies a prediction image which has been generated in the optimal mode, to the prediction image selection unit 116.

In addition, as described above, the intra-prediction unit 114 supplies intra-prediction mode information or the like indicating the employed intra-prediction mode to the reversible coding unit 106 as appropriate so as to allow the information to be coded.

The motion prediction/compensation unit 115 performs motion prediction (inter-prediction) with a fundamental PU as a process unit by using the input image which is supplied from the screen rearrangement buffer 102 and the reference image which is supplied from the frame memory 112 via the selection unit 113, and performs a motion compensation process in accordance with a detected motion vector so as to generate a prediction image (inter-prediction image information). The motion prediction/compensation unit 115 performs the inter-prediction in a plurality of modes (inter-prediction modes) which are prepared in advance.

The motion prediction/compensation unit 115 generates prediction images in all candidate inter-prediction modes, evaluates a cost function value of each prediction image, and selects an optimal mode. If an optimal inter-prediction mode is selected, the motion prediction/compensation unit 115 supplies a prediction image which has been generated in the optimal mode, to the prediction image selection unit 116.

In addition, the motion prediction/compensation unit 115 supplies information indicating the employed inter-prediction mode, information required to perform a process in the inter-prediction mode when coded data is decoded, or the like, to the reversible coding unit 106 so as to allow the information to be coded.

The prediction image selection unit 116 selects a supply source of a prediction image which is to be supplied to the calculation unit 103 or the calculation unit 110. For example, in a case of inter-coding, the prediction image selection unit 116 selects the motion prediction/compensation unit 115 as a supply source of a prediction image, and supplies a prediction image which is supplied from the motion prediction/compensation unit 115, to the calculation unit 103 or the calculation unit 110.

The rate control unit 117 controls a rate of the quantization operation of the quantization unit 105 on the basis of a bit rate of coded data accumulated in the accumulation buffer 107 so that overflow or underflow does not occur.

The coding control unit 121 controls a coding process performed by the reversible coding unit 106. At this time, the coding control unit 121 determines whether or not coding is performed in a merge mode.

In addition, the coding control unit 121 also controls a coding process in modes other than the merge mode, such as, for example, a skip mode, an intra-prediction mode, an inter-prediction mode, and a direct mode.

The reversible coding unit 106 performs a reversible coding process in a mode selected by the coding control unit 121.

[Coding Unit]

Meanwhile, in the AVC coding method, a macroblock or a plurality of sub-macroblocks into which the macroblock is divided are used as a process unit for a prediction process, a coding process, or the like. However, a macroblock size of 16 pixels×16 pixels is not optimum for a large picture frame such as Ultra High Definition (UHD; 4000 pixels×2000 pixels) which will become a target of a next-generation coding method.

Therefore, currently, for the purpose of improvement in higher coding efficiency than that of AVC, standardization of a coding method called High Efficiency Video Coding (HEVC) is in progress by Joint Collaboration Team-Video Coding (JCTVC) which is a joint standardization organization of International Telecommunication Union Telecommunication Standardization Sector (ITU-T) and International Organization for Standardization (ISO)/International Electrotechnical Commission (IEC).

Figure 2:
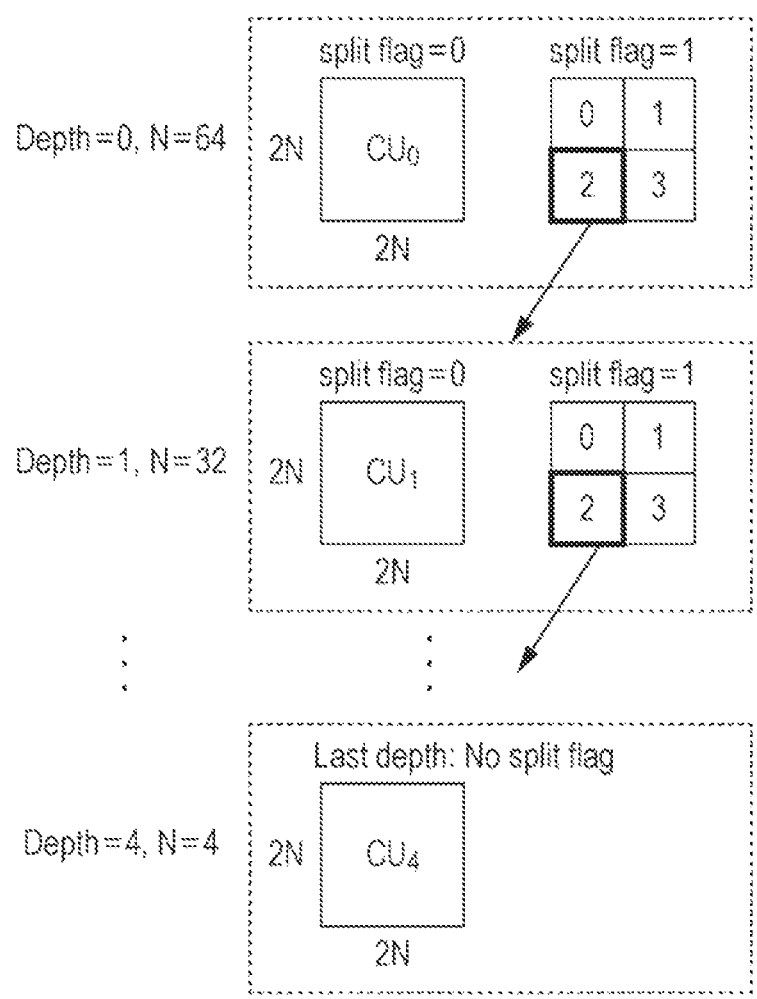
FIG. 2 is a diagram illustrating a coding unit.

In the AVC, a layer structure by a macroblock and a sub-macroblock is defined, but, in the HEVC, a coding unit (CU) is defined as illustrated in FIG. 2.

The CU, which is also called a coding tree block (CTB), is a partial region of an image in a picture unit and has the same function as that of the macroblock in the AVC. Whereas the latter is fixed to a size of 16×16 pixels, the former is not fixed in a size, and is designated in image compression information in each sequence.

For example, in a sequence parameter set (SPS) included in coded data which is an output, the largest coding unit (LCU) and the smallest coding unit (SCU) of the CU are defined.

Each LCU is set to split-flag=1 in a range in which the LCU is not smaller than the SCU in a size, and thus can be split into the CU with a smaller size. In the example of FIG. 2, a size of the LCU is 128, and the maximal layer depth is 5. The CU with a size of 2N×2N is split into the CUs with a size of N×N, which are a one-order-lower layer when a value of split_flag is "1".

Figure 3:
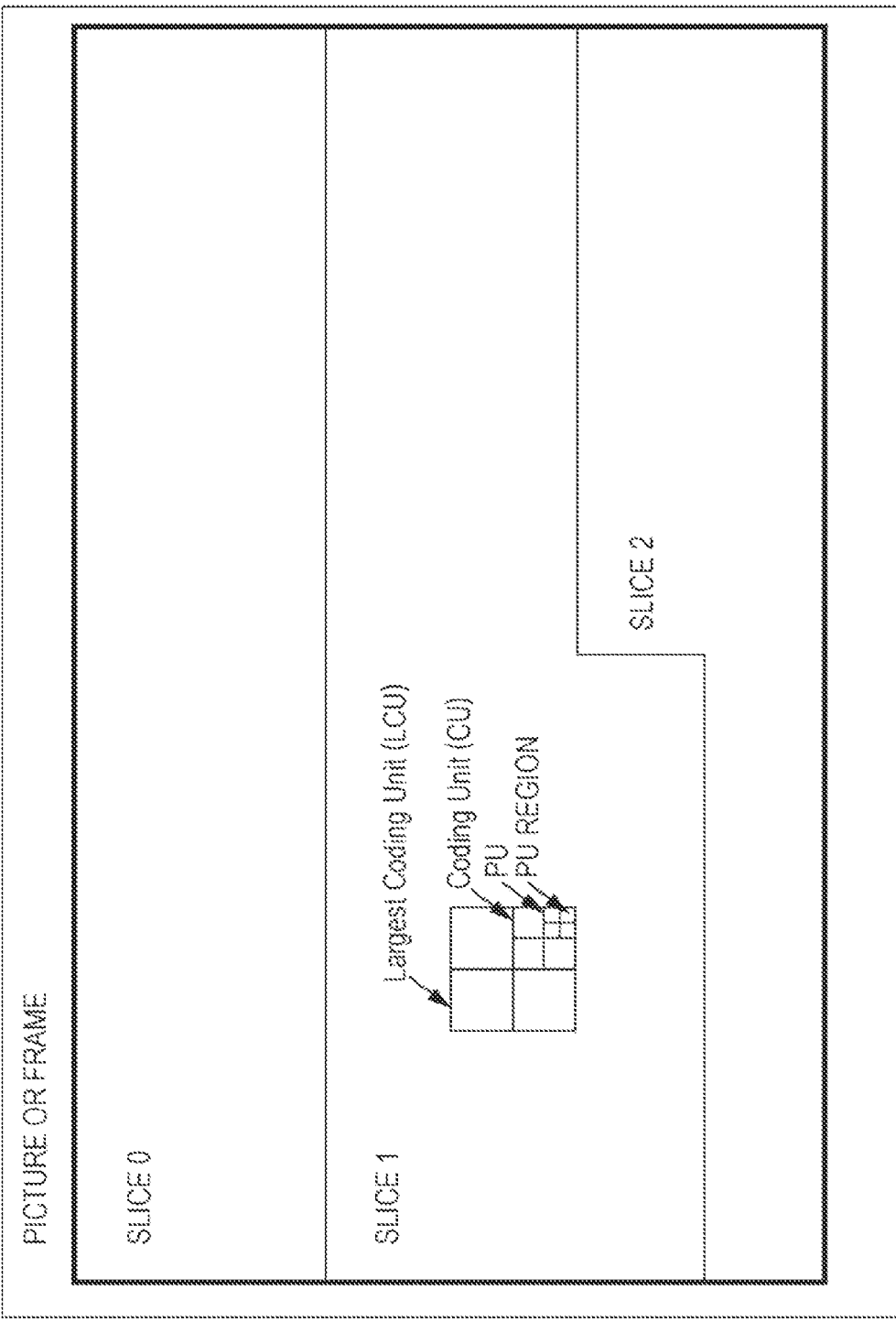
FIG. 3 is a diagram illustrating a relationship between a slice and a coding unit.

Further, as illustrated in FIG. 3, the CU is split into prediction units (PUs) which are regions (partial regions of an image in a picture unit) serving as a process unit for intra-prediction or inter-prediction, and is also split into transform units (TU) which are regions (partial regions of an image in a picture unit) serving as a process unit for orthogonal transform. At present, in the HEVC, 16×16 and 32×32 orthogonal transform can be used in addition to 4×4 and 8×8.

In a case of a coding method in which the CU is defined and various processes are performed with the CU as a process unit as in the above HEVC, the macroblock in the AVC may be considered to correspond to the LCU. However, as illustrated in FIG. 2, since the CU has a layer structure, a size of the LCU in the highest-order layer is set to be larger than that of the macroblock in the AVC, for example, as in 128×128 pixels.

The present technology is applicable to coding methods using the CU, PU, TU, and the like instead of the macroblock. In other words, a process unit for a prediction process may be any region. That is, in the following, a region (also referred to as a corresponding region or a target region) which is a process target of a prediction process, or a neighboring region which is a neighbor of the corresponding region includes not only a macroblock or a submacroblock but also the CU, the PU, the TU, and the like.

[Merge of Motion Partition]

Figure 4:
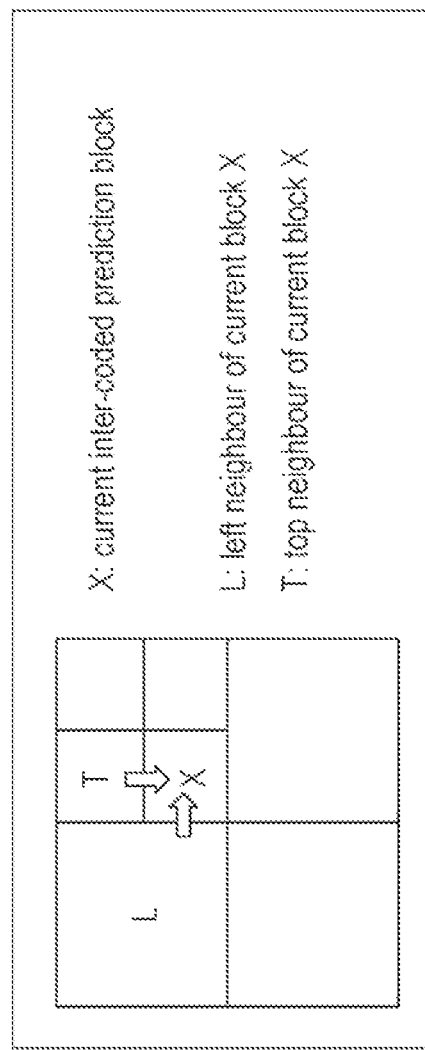
FIG. 4 is a diagram illustrating a merge mode.

Meanwhile, as one of coding methods of motion information, a method (merge mode) called motion partition merging as illustrated in FIG. 4 has been proposed. In this method, two flags including Merge_Flag and Merge_Left_Flag are transmitted as merge information which is information regarding the merge mode.

Merge_Flag=1 indicates that motion information of a corresponding region X is the same as that of a neighboring region T which is a top neighbor of the corresponding region or a neighboring region L which is a left neighbor of the corresponding region. At this time, merge information includes Merge_Left_Flag and is transmitted. Merge_Flag=0 indicates that motion information of the corresponding region X is different from both of those of the neighboring region T and the neighboring region L. In this case, the motion information of the corresponding region X is transmitted.

In a case where the motion information of the corresponding region X is the same as motion information of the neighboring region L, Merge_Flag is set to 1, and Merge_Left_Flag is set to 1. In a case where the motion information of the corresponding region X is the same as motion information of the neighboring region T, Merge_Flag is set to 1, and Merge_Left_Flag is set to 0.

[Reversible Coding Unit and Coding Control Unit]

Figure 5:
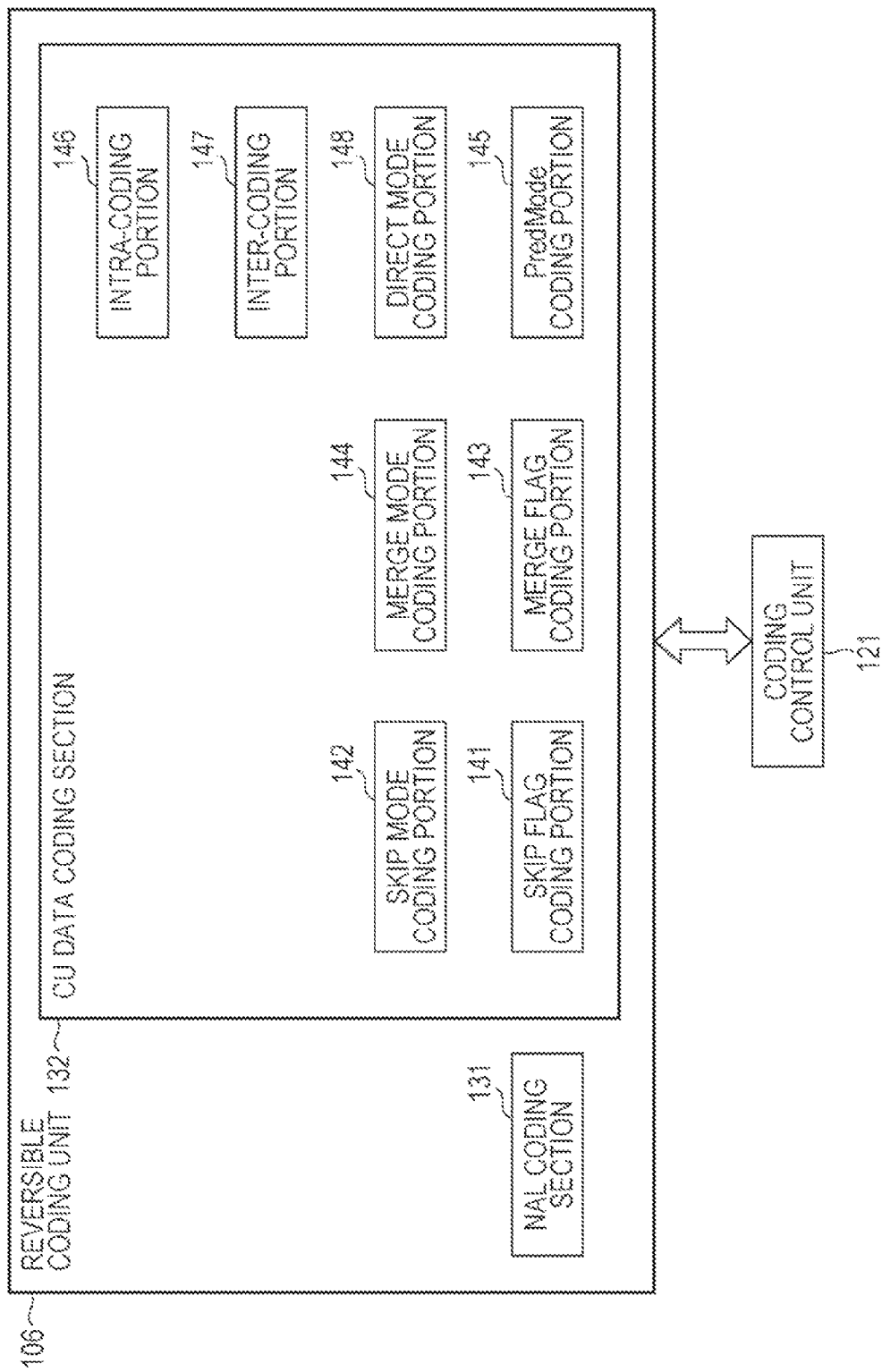
FIG. 5 is a block diagram illustrating a main configuration example of a reversible coding unit and a coding control unit.

FIG. 5 is a block diagram illustrating a main configuration example of the reversible coding unit 106 and the coding control unit 121.

As illustrated in FIG. 5, the reversible coding unit 106 includes a network abstraction layer (NAL) coding section 131 and a CU data coding section 132.

The NAL coding section 131 codes data of an NAL such as a sequence parameter set (SPS), a picture parameter set (PPS), and a slice header. The CU data coding section 132 codes data (video coding layer (VCL)) in a layer which is equal to or lower than a layer of a CU.

The CU data coding section 132 includes a skip flag coding portion 141, a skip mode coding portion 142, a merge flag coding portion 143, and a merge mode coding portion 144. In addition, the CU data coding section 132 includes a PredMode coding portion 145, an intra-coding portion 146, an inter-coding portion 147, and a direct mode coding portion 148.

The skip flag coding portion 141 generates and codes a skip flag indicating whether or not a skip mode is employed, under the control of the coding control unit 121. The skip mode coding portion 142 performs a coding process in the skip mode under the control of the coding control unit 121.

The merge flag coding portion 143 generates and codes a merge flag indicating whether or not a merge mode is employed, under the control of the coding control unit 121. The merge mode coding portion 144 performs a coding process in the merge mode under the control of the coding control unit 121.

The PredMode coding portion 145 codes PredMode which is a parameter indicating a prediction mode under the control of the coding control unit 121. The intra-coding portion 146 performs a process regarding coding of a difference image which is generated by using intra-prediction, under the control of the coding control unit 121. The inter-coding portion 147 performs a process regarding coding of a difference image which is generated by using inter-prediction, under the control of the coding control unit 121. The direct mode coding portion 148 performs a process regarding coding of a difference image which is generated by using a direct mode, under the control of the coding control unit 121.

[Flow of Coding Process]

Next, a description will be made of a flow of each process performed by the above-described image coding device 100. First, with reference to a flowchart of FIG. 6, an example of a flow of a coding process will be described.

In step S101, the A/D conversion unit 101 A/D converts an input image. In step S102, the screen rearrangement buffer 102 stores the A/D converted image, and rearranges a display order of pictures to a coding order.

In step S103, the intra-prediction unit 114 performs an intra-prediction process in an intra-prediction mode. In step S104, the motion prediction/compensation unit 115 performs an inter-motion prediction process in which motion prediction or motion compensation is performed in an inter-prediction mode.

In step S105, the prediction image selection unit 116 determines an optimal mode on the basis of respective cost function values which are output from the intra-prediction unit 114 and the motion prediction/compensation unit 115. In other words, the prediction image selection unit 116 selects either of a prediction image generated by the intra-prediction unit 114 and a prediction image generated by the motion prediction/compensation unit 115.

In step S106, the calculation unit 103 calculates a difference between the image rearranged due to the process in step S102 and the prediction image selected due to the process in step S105. A data amount of the difference data is smaller than that of original image data. Therefore, a data amount can be compressed as compared with when an image is coded as it is.

In step S107, the orthogonal transform unit 104 performs orthogonal transform on the difference information generated due to the process in step S106. Specifically, orthogonal transform such as discrete cosine transform or Karhunen-Loeve transform is performed, and thus a transform coefficient is output.

In step S108, the quantization unit 105 quantizes the transform coefficient obtained due to the process in step S107.

The difference information quantized due to the process in step S108 is locally decoded as follows. In other words, in step S109, the inverse quantization unit 108 inversely quantizes the quantized transform coefficient (also referred to as a quantized coefficient) generated due to the process in step S108 in a characteristic corresponding to a characteristic of the quantization unit 105. In step S110, the inverse orthogonal transform unit 109 performs inverse orthogonal transform on the transform coefficient obtained due to the process in step S107 in a characteristic corresponding to a characteristic of the orthogonal transform unit 104 so as to locally decode the difference information, and supplies the decoded result to the calculation unit 110.

In step S111, the calculation unit 110 adds the prediction image to the locally decoded difference information so as to generate a locally decoded image (an image corresponding to an input to the calculation unit 103). In step S112, the loop filter 111 performs an appropriate loop filter process such as a deblock filter process or an adaptive loop filter process on the locally decoded image obtained due to the process in step S111.

In step S113, the frame memory 112 stores the decoded image having undergone the loop filter process due to the process in step S112. In addition, the frame memory 112 also stores an image which has not undergone the filter process in the loop filter 111, supplied from the calculation unit 110.

In step S114, the reversible coding unit 106 codes the transform coefficient (quantized coefficient) quantized due to the process in step S108. In other words, reversible coding such as variable length coding or arithmetic coding is performed on the difference image.

In addition, the reversible coding unit 106 codes the quantized parameter calculated in step S108, and adds (includes) the coded result to (in) coded data. Further, the reversible coding unit 106 codes information regarding a prediction mode of the prediction image selected due to the process in step 3105, and adds the coded result to a coded data which is obtained by coding the difference image. In other words, the reversible coding unit 106 also codes optimal intra-prediction mode information supplied from the intra-prediction unit 114, information corresponding to an optimal inter-prediction mode supplied from the motion prediction/compensation unit 115, or the like, and adds the coded result to the coded data.

In step S115, the accumulation buffer 107 accumulates the coded data obtained due to the process in step S114. The coded data accumulated in the accumulation buffer 107 is read and is transmitted to a decoding side via a transmission path or a recording medium as appropriate.

In step S116, the rate control unit 117 controls a rate of a quantization operation of the quantization unit 105 on the basis of a bit rate (generated bit rate) of the coded data accumulated in the accumulation buffer 107 due to the process in step S115 so that overflow or underflow does not occur.

If the process in step S116 is completed, the coding process finishes.

In addition, in step S114, the reversible coding unit 106 performs a coding process under the control of the coding control unit 121.

[Flow of Reversible Coding Process]

Figure 6:
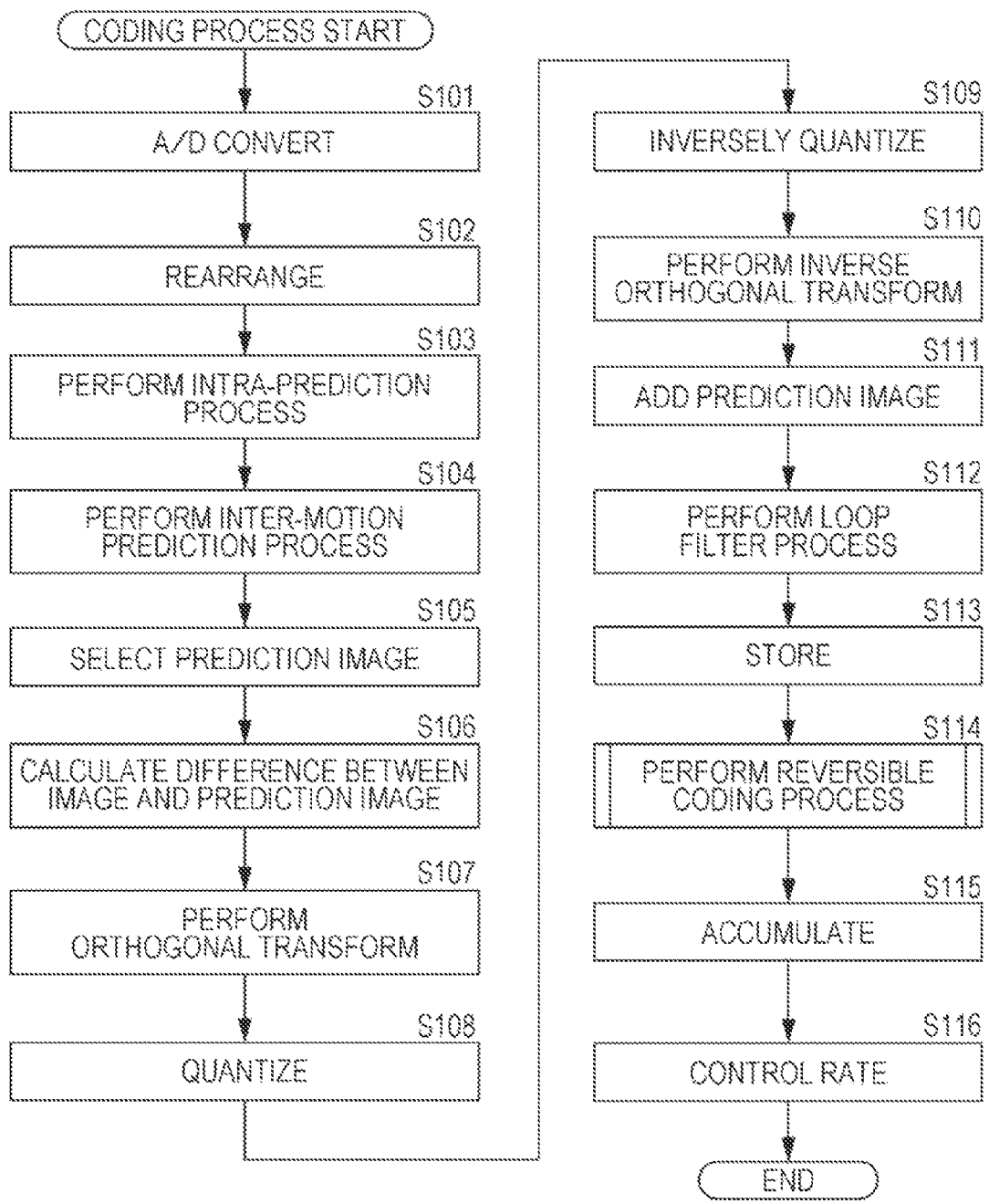
FIG. 6 is a flowchart illustrating an example of a flow of a coding process.
Figure 7:
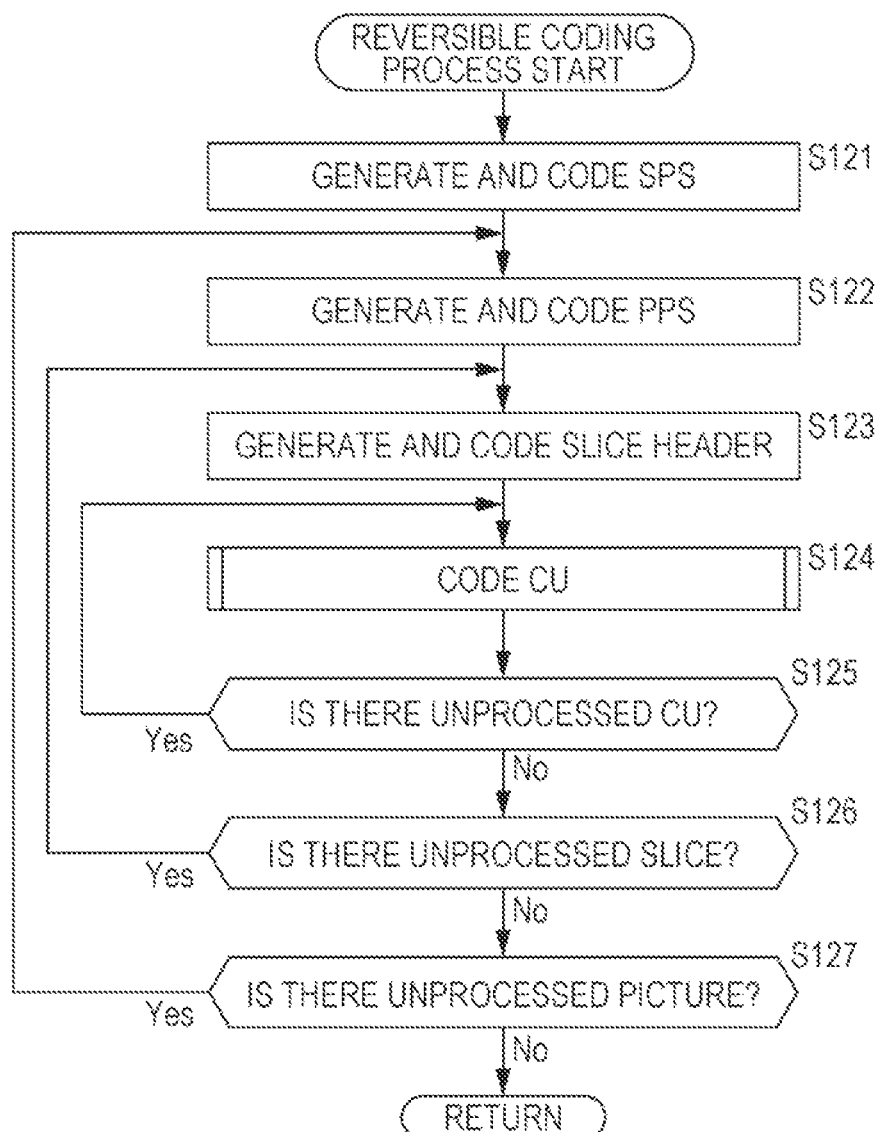
FIG. 7 is a flowchart illustrating an example of a flow of a reversible coding process.

Next, with reference to a flowchart of FIG. 7, a description will be made of an example of a flow of a reversible coding process performed in step S114 of FIG. 6. As illustrated in FIG. 7, the reversible coding process is performed for each layer of an image.

In other words, the NAL coding section 131 generates and codes an SPS in step S121, generates and codes a PSP in step S122, and generates and codes a slice header in step S123. In step S124, the CU data coding section 132 codes a corresponding CU which is a process target.

The CU data coding section 132 repeatedly performs the process in step S124 on all CUs in a corresponding slice which is a process target. In step S125, if it is determined that there is no unprocessed CU in the corresponding slice, the CU data coding section 132 makes the process proceed to step S126.

The NAL coding section 131 repeatedly performs the processes in step S123 to step S125 on all slices in a corresponding picture which is a process target. In step S126, if it is determined that there is no unprocessed slice in the corresponding picture, the NAL coding section 131 makes the process proceed to step S127.

The NAL coding section 131 repeatedly performs the processes in step S122 to step S126 on all pictures in a corresponding sequence which is a process target. In step S127, if it is determined that there is no unprocessed picture in the corresponding sequence, the NAL coding section 131 finishes the reversible coding process, and returns the process to FIG. 6.

[Flow of CU Coding Process]

Next, with reference to flowcharts of FIGS. 8 and 9, a description will be made of an example of a flow of the CU coding process performed in step S124 of FIG. 7.

When the CU coding process starts, in step S131, the coding control unit 121 determines a type of corresponding slice from the NAL data generated by the NAL coding section 131, and determines whether or not the corresponding slice is an I slice. Only in a case where the corresponding slice is not an I slice (the slice is a P slice or a B slice), the skip flag coding portion 141 generates and codes a skip flag in step S132.

If the coding control unit 121 determines that a value of the skip flag is 1 in step S133, the skip mode coding portion 142, which acquires the determination result from the coding control unit 121, codes CU data in a skip mode in step S134. If the coding is completed, the CU coding process finishes, and the process is returned to FIG. 7.

Figure 8:
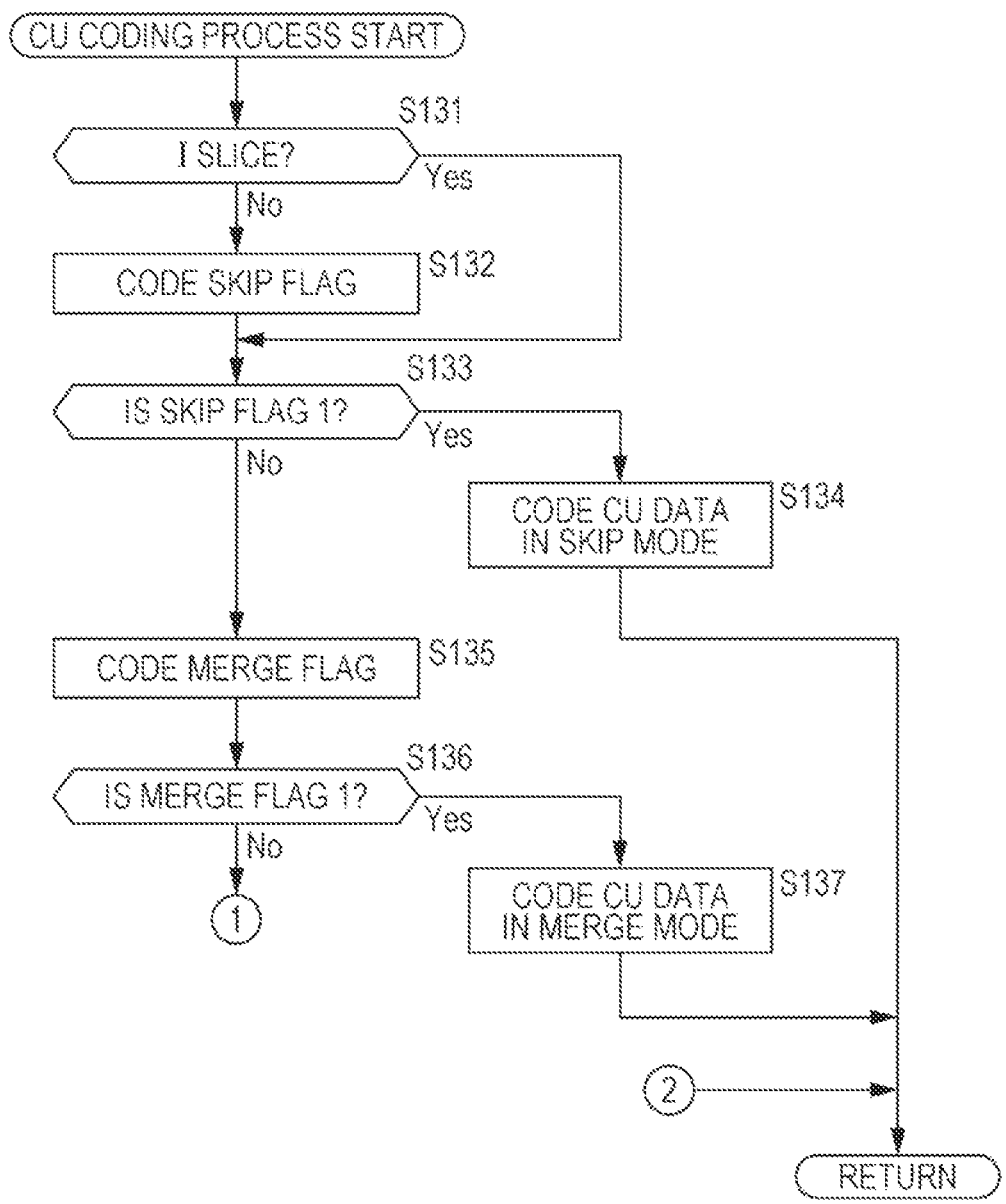
FIG. 8 is a flowchart illustrating an example of a flow of a CU coding process.

In addition, if the coding control unit 121 determines that a value of the skip flag is 0 or there is no skip flag in step S133 of FIG. 8, the coding control unit 121 makes the process proceed to step S135. In this case, coding in the skip mode is not performed.

In step S135, the merge flag coding portion 143 generates and codes a merge flag.

If the coding control unit 121 determines that a value of the merge flag is 1 in step S136, the merge mode coding portion 144, which acquires the determination result from the coding control unit 121, codes CU data in a merge mode in step S137. If the coding is completed, the CU coding process finishes, and the process is returned to FIG. 7.

Figure 9:
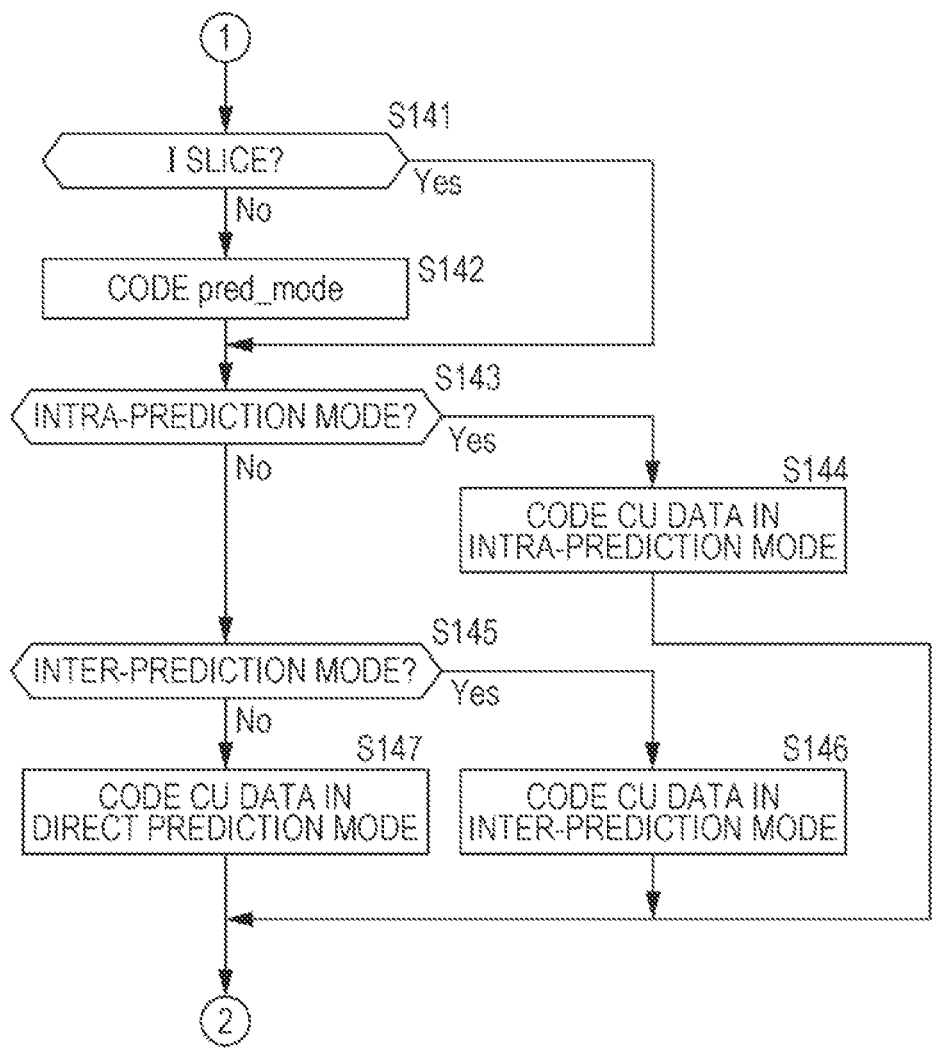
FIG. 9 is a flowchart which illustrates an example of a flow of a CU coding process and is subsequent to FIG. 8.

In addition, if the coding control unit 121 determines that a value of the merge flag is 0 or there is no merge flag in step S136 of FIG. 8, the process proceeds to the flowchart of FIG. 9, and coding based on an employed prediction mode is performed.

In other words, only in a case where the coding control unit 121 determines that the corresponding slice which is a process target is not the I slice in step S141 of FIG. 9, the PredMode coding portion 145 generates and codes pred_mode which is a parameter indicating a type of prediction mode for the corresponding slice in step S142.

If the coding control unit 121 determines that a prediction mode for the corresponding region is an intra-prediction mode in step S143, the intra-coding portion 146 codes CU data in the intra-prediction mode in step S144. In other words, difference image information (quantized coefficient), information regarding intra-prediction mode, or the like is coded. If the coding is completed, the CU coding process finishes, and the process is returned to FIG. 7.

In addition, if the coding control unit 121 determines that a prediction mode for the corresponding region is not an intra-prediction mode but an inter-prediction mode (step S143 and step S145), the inter-coding portion 147 codes CU data in the inter-prediction mode in step S146. In other words, difference image information (quantized coefficient), information regarding inter-prediction mode, or the like is coded. If the coding is completed, the CU coding process finishes, and the process is returned to FIG. 7.

In addition, if the coding control unit 121 determines that a prediction mode for the corresponding region is neither the intra-prediction mode nor the inter-prediction mode (step S143 and step S145), the direct mode coding portion 148 codes CU data in a direct prediction mode in step S147. If the coding is completed, the CU coding process finishes, and the process is returned to FIG. 7.

[Image Decoding Device]

Figure 10:
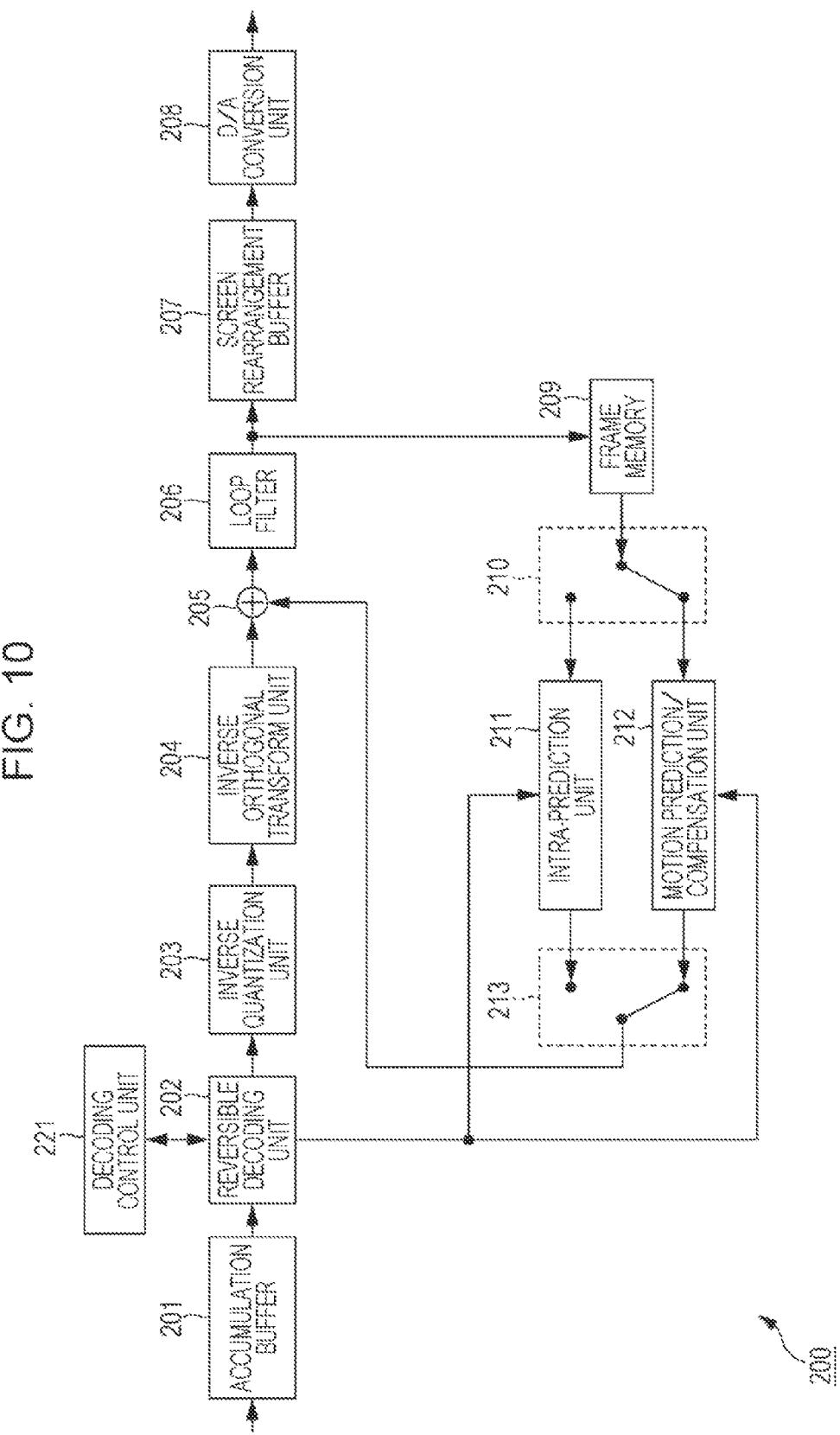
FIG. 10 is a block diagram illustrating a main configuration example of an image decoding device.

FIG. 10 is a block diagram illustrating a main configuration example of an image decoding device. An image decoding device 200 illustrated in FIG. 10 decodes coded data generated by the image coding device 100 by using a decoding method corresponding to the coding method. In addition, the image decoding device 200 is assumed to perform a prediction process for each arbitrary region (for example, a prediction unit (PU) or the like) in the same manner as the image coding device 100.

As illustrated in FIG. 10, the image decoding device 200 includes an accumulation buffer 201, a reversible decoding unit 202, an inverse quantization unit 203, an inverse orthogonal transform unit 204, a calculation unit 205, a loop filter 206, a screen rearrangement buffer 207, and a D/A conversion unit 208. In addition, the image decoding device 200 includes a frame memory 209, a selection unit 210, an intra-prediction unit 211, a motion prediction/compensation unit 212, and a selection unit 213.

Further, the image decoding device 200 includes a decoding control unit 221.

The accumulation buffer 201 accumulates coded data which is transmitted, and supplies the coded data to the reversible decoding unit 202 at a predetermined timing. The reversible decoding unit 202 decodes the information which is supplied from the accumulation buffer 201 and has been coded by the reversible coding unit 106 of FIG. 1, by using a method corresponding to the coding method in the reversible coding unit 106. The reversible decoding unit 202 supplies a quantized coefficient of a difference image obtained through the decoding, to the inverse quantization unit 203.

In addition, the reversible decoding unit 202 determines whether an intra-prediction mode or an inter-prediction mode is selected as an optimal prediction mode, and supplies information regarding the optimal prediction mode to a mode side which is determined as being selected, of the intra-prediction unit 211 and the motion prediction/compensation unit 212. In other words, for example, in a case where the inter-prediction mode is selected as an optimal prediction mode in the image coding device 100, information regarding the optimal prediction mode is supplied to the motion prediction/compensation unit 212.

The inverse quantization unit 203 inversely quantizes the quantized coefficient which has been decoded and obtained by the reversible decoding unit 202, by using a method corresponding to the quantization method in the quantization unit 105 of FIG. 1, and supplies an obtained transform coefficient to the inverse orthogonal transform unit 204.

The inverse orthogonal transform unit 204 performs inverse orthogonal transform on the transform coefficient supplied from the inverse quantization unit 203 by using a method corresponding to the orthogonal transform in the orthogonal transform unit 104 of FIG. 1. Due to the inverse orthogonal transform process, the inverse orthogonal transform unit 204 obtains decoded remainder data (which is the same data as locally decoded difference information which is output by the inverse orthogonal transform unit 109 of the image coding device 100) corresponding to remainder data before undergoing orthogonal transform in the image coding device 100.

The decoded remainder data obtained through the inverse orthogonal transform is supplied to the calculation unit 205. In addition, a prediction image is supplied to the calculation unit 205 from the intra-prediction unit 211 or the motion prediction/compensation unit 212 via the selection unit 213.

The calculation unit 205 adds the decoded remainder data to the prediction image, so as to obtain decoded image data corresponding to image data from which the prediction image is not subtracted by the calculation unit 103 of the image coding device 100. The calculation unit 205 supplies the decoded image data to the loop filter 206.

The loop filter 206 performs an appropriate loop filter process such as a deblock filter process or an adaptive loop filter process on the supplied decoded image, and supplies a result thereof to the screen rearrangement buffer 207.

The loop filter 206 includes a deblock filter or an adaptive loop filter, and performs an appropriate filter process on the decoded image supplied from the calculation unit 205. For example, the loop filter 206 performs a deblock filter process on the decoded image so as to remove block distortion from the decoded image. In addition, for example, the loop filter 206 performs a loop filter process on the deblock filter process result (the decoded image from which the block distortion is removed) by using a Wiener filter, thereby improving image quality.

Further, the loop filter 206 may perform any filter process on the decoded image. Furthermore, the loop filter 206 may perform a filter process by using a filter coefficient supplied from the image coding device 100 of FIG. 1.

The loop filter 206 supplies the filter process result (the decoded image having undergone the filter process) to the screen rearrangement buffer 207 and the frame memory 209. In addition, the decoded image output from the calculation unit 205 may be supplied to the screen rearrangement buffer 207 or the frame memory 209 without using the loop filter 206. In other words, the filter process by the loop filter 206 may be omitted.

The screen rearrangement buffer 207 rearranges the images. In other words, an order of frames which has been rearranged to the coding order by the screen rearrangement buffer 102 of FIG. 1 is rearranged to the original display order. The D/A conversion unit 208 D/A coverts the image supplied from the screen rearrangement buffer 207, and outputs and displays the D/A converted image to and on a display (not illustrated).

The frame memory 209 stores the supplied decoded image, and supplies the stored decoded image to the selection unit 210 as a reference image, at a predetermined timing or on the basis of a request from an external element such as the intra-prediction unit 211 or the motion prediction/compensation unit 212.

The selection unit 210 selects a supply destination of the reference image which is supplied from the frame memory 209. In a case where an intra-coded image is decoded, the selection unit 210 supplies the reference image supplied from the frame memory 209, to the intra-prediction unit 211. In addition, in a case where an inter-coded image is decoded, the selection unit 210 supplies the reference image supplied from the frame memory 209, to the motion prediction/compensation unit 212.

Information or the like indicating an intra-prediction mode which is obtained by decoding header information included in the coded data is appropriately supplied to the intra-prediction unit 211 from the reversible decoding unit 202. The intra-prediction unit 211 performs intra-prediction by using the reference image acquired from the frame memory 209, in the intra-prediction mode which has been used in the intra-prediction unit 114 of FIG. 1, so as to generate a prediction image. The intra-prediction unit 211 supplies the generated prediction image to the selection unit 213.

The motion prediction/compensation unit 212 acquires, from the reversible decoding unit 202, information (optimal prediction mode information, difference information, a code number of prediction motion vector information, and the like) obtained by decoding the header information.

The motion prediction/compensation unit 212 performs inter-prediction by using the reference image acquired from the frame memory 209, in the inter-prediction mode which has been used in the motion prediction/compensation unit 115 of FIG. 1, so as to generate a prediction image.

The decoding control unit 221 controls a decoding process performed by the reversible decoding unit 202. The reversible decoding unit 202 fundamentally performs a decoding process in a method corresponding to that of the reversible coding unit 106 of FIG. 1, and thus a control method of the decoding control unit 221 is basically the same as the control method of the coding control unit 121 of FIG. 1. By matching the control methods with each other on the coding side and the decoding side, the decoding control unit 221 can select a decoding method corresponding to a coding method selected by the coding control unit 121, and thus can perform control so that a correct decoding process is performed.

In other words, the decoding control unit 221 determines whether or not decoding will be performed in the merge mode.

In addition, the decoding control unit 221 also controls a decoding process in modes other than the merge mode, such as, for example, a skip mode, an intra-prediction mode, an inter-prediction mode, and a direct mode.

The reversible decoding unit 202 performs a reversible decoding process in a mode selected by the decoding control unit 221.

[Reversible Decoding Unit and Decoding Control Unit]

Figure 11:
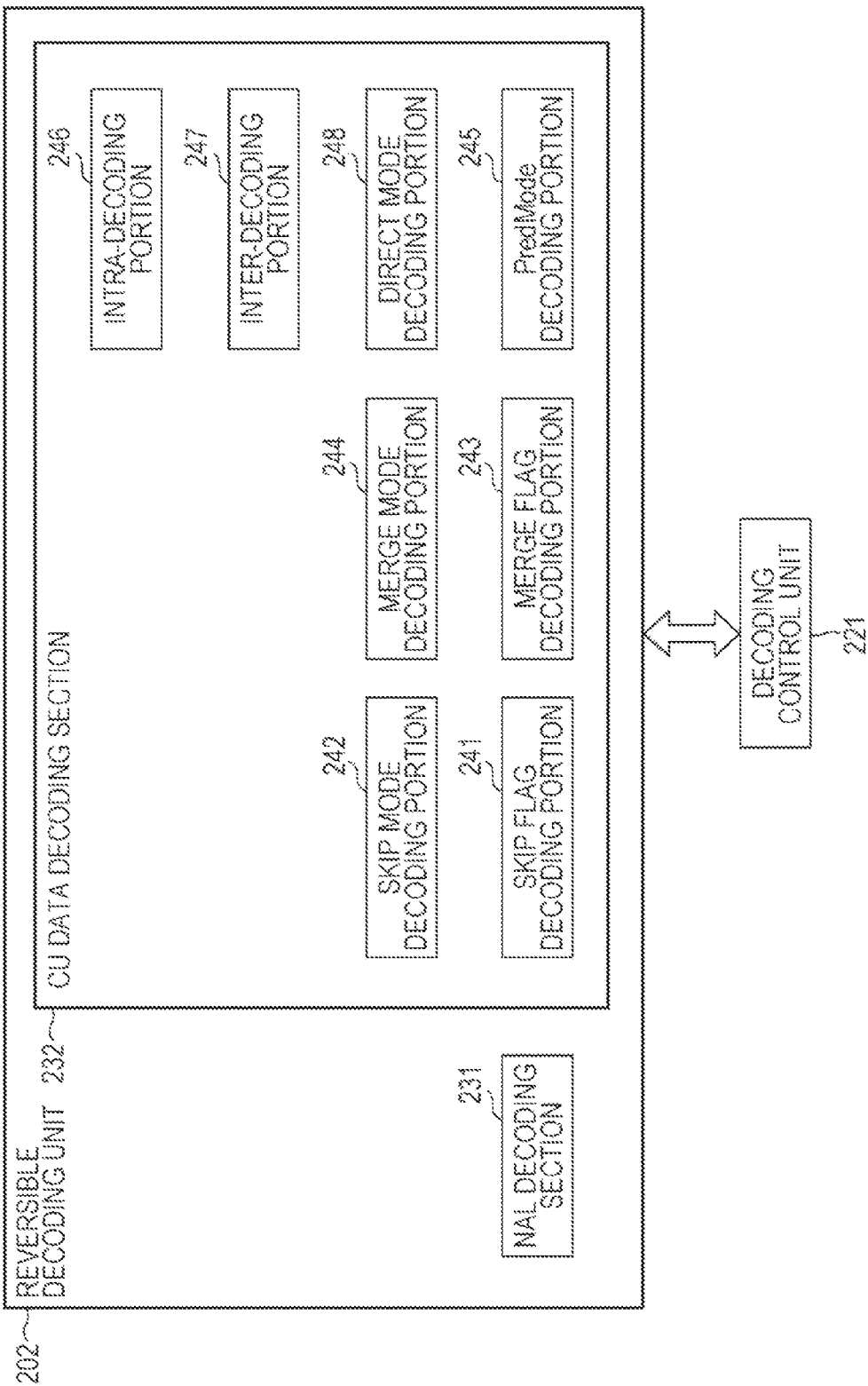
FIG. 11 is a block diagram illustrating a main configuration example of a reversible decoding unit and a decoding control unit.

FIG. 11 is a block diagram illustrating a main configuration example of the reversible decoding unit 202 and the decoding control unit 221.

As illustrated in FIG. 11, the reversible decoding unit 202 includes an NAL decoding section 231 and a CU data decoding section 232.

The NAL decoding section 231 decodes coded data of an NAL such as a sequence parameter set, a picture parameter set, and a slice header. The CU data decoding section 232 decodes coded data in a layer which is equal to or lower than a layer of a CU.

The CU data decoding section 232 includes a skip flag decoding portion 241, a skip mode decoding portion 242, a merge flag decoding portion 243, and a merge mode decoding portion 244. In addition, the CU data decoding section 232 includes a PredMode decoding portion 245, an intra-decoding portion 246, an inter-decoding portion 247, and a direct mode decoding portion 248.

The skip flag decoding portion 241 decodes the skip flag under the control of the decoding control unit 221. The skip mode decoding portion 242 performs a decoding process in the skip mode under the control of the decoding control unit 221.

The merge flag decoding portion 243 decodes the merge flag under the control of the decoding control unit 221. The merge mode decoding portion 244 performs a decoding process in the merge mode under the control of the decoding control unit 221.

The PredMode decoding portion 245 decodes PredMode under the control of the decoding control unit 221. The intra-decoding portion 246 performs a process regarding decoding of coded data on a difference image which is generated by using intra-prediction, under the control of the decoding control unit 221. The inter-decoding portion 247 performs a process regarding decoding of coded data on a difference image which is generated by using inter-prediction, under the control of the decoding control unit 221. The direct mode decoding portion 248 performs a process regarding decoding of coded data on a difference image which is generated by using a direct mode, under the control of the decoding control unit 221.

[Flow of Decoding Process]

Next, a description will be made of a flow of each process performed by the above-described image decoding device 200. First, with reference to a flowchart of FIG. 12, an example of a flow of a decoding process will be described.

When the decoding process starts, in step S201, the accumulation buffer 201 accumulates transmitted coded data (coded stream). In step S202, the reversible decoding unit 202 decodes the coded data supplied from the accumulation buffer 201. In other words, an I picture, a P picture, and a B picture which have been coded by the reversible coding unit 106 of FIG. 1 are decoded. In addition, various information pieces other than the difference image information included in the coded data, such as difference motion information, a code number of prediction motion vector information, and merge information, are decoded.

In step S203, the inverse quantization unit 203 inversely quantizes the quantized transform coefficient (quantized coefficient) obtained due to the process in step S202. In step S204, the inverse orthogonal transform unit 204 performs inverse orthogonal transform on the transform coefficient which is inversely quantized in step S203.

In step S205, the intra-prediction unit 211 or the motion prediction/compensation unit 212 performs a prediction process by using the supplied information. In step S206, the selection unit 213 selects the prediction image generated in step S205. In step S207, the calculation unit 205 adds the prediction image selected in step S206 to the difference information obtained due to the inverse orthogonal transform in step S204. Accordingly, a decoded image is obtained.

In step S208, the loop filter 206 performs an appropriate loop filter process such as a deblock filter process or an adaptive loop filter process on the decoded image obtained in step S207.

In step S209, the screen rearrangement buffer 207 rearranges the images which undergo the filter process in step S208. In other words, an order of frames which has been rearranged to the coding order by the screen rearrangement buffer 102 of the image coding device 100 is rearranged to the original display order.

In step S210, the D/A conversion unit 208 D/A converts the images whose frame order is rearranged in step S209. These images are output to a display (not illustrated), and the images are displayed.

In step S211, the frame memory 209 stores the image which undergo the filter process in step S208. These images are used for generation of a prediction image (prediction process) as a reference image in step S205.

If the process in step S211 is completed, the decoding process finishes.

[Flow of Reversible Decoding Process]

Figure 12:
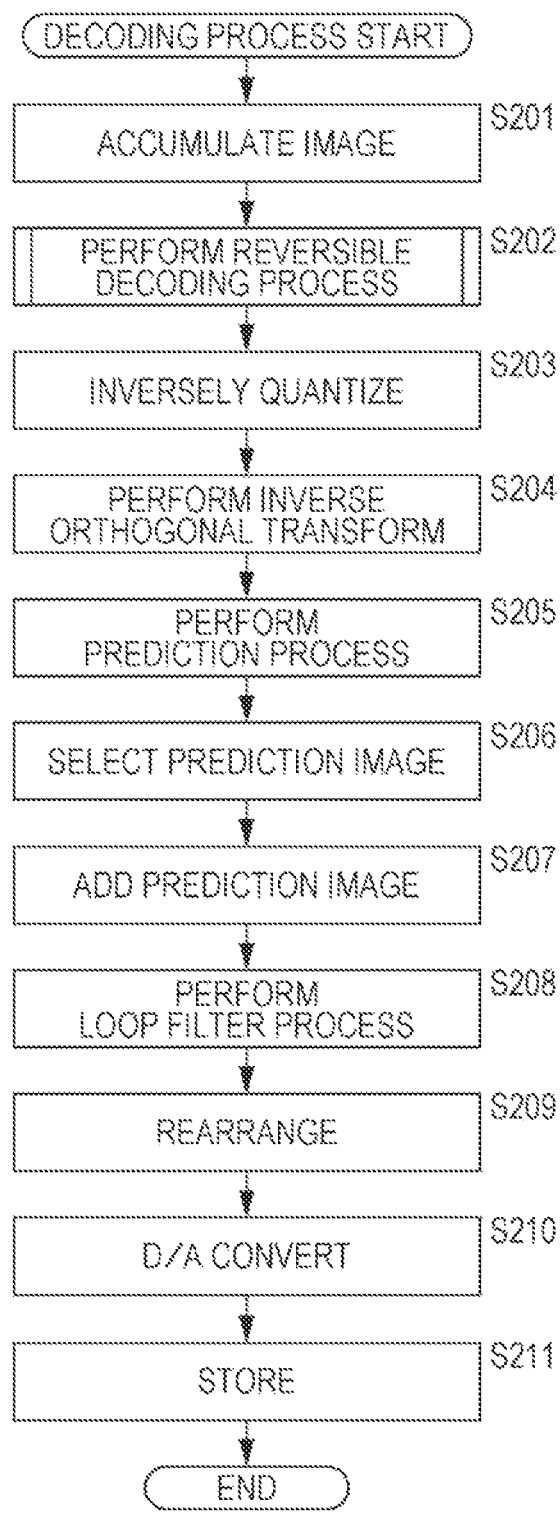
FIG. 12 is a flowchart illustrating an example of a flow of a decoding process.
Figure 13:
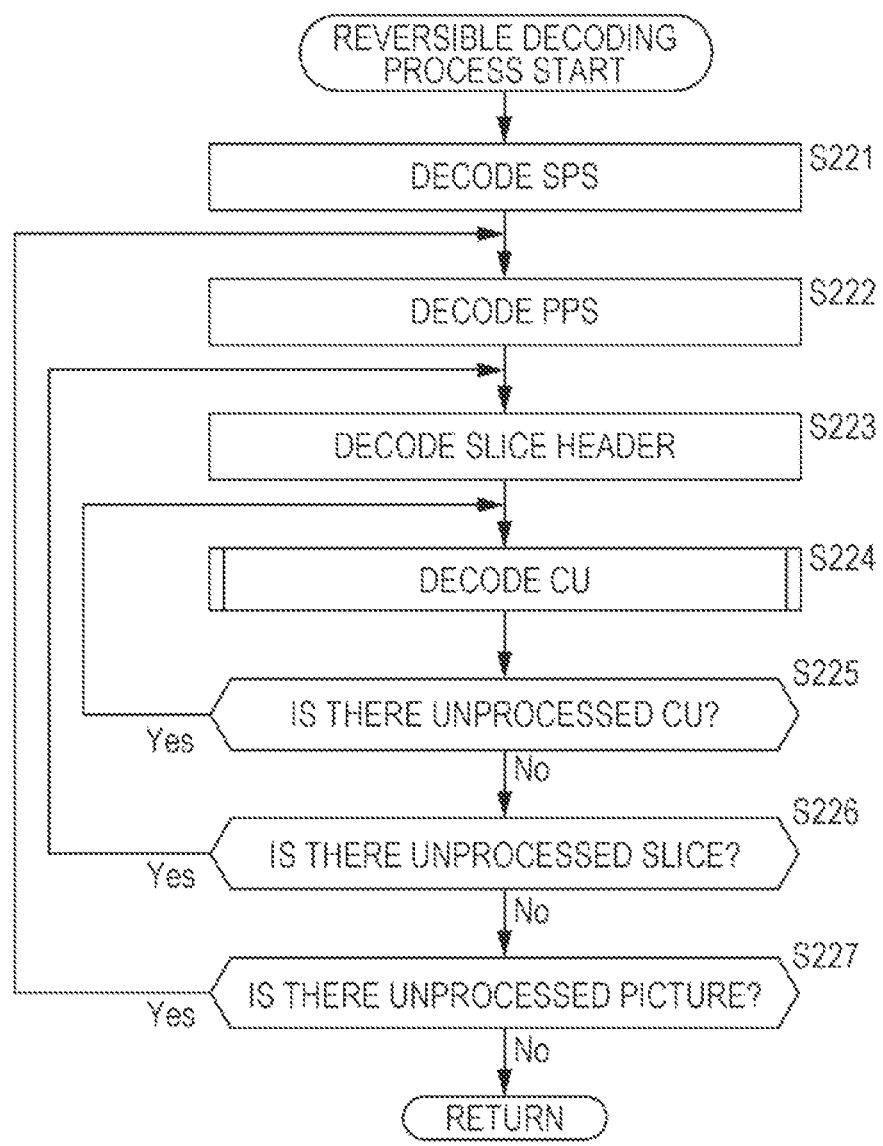
FIG. 13 is a flowchart illustrating an example of a flow of a reversible decoding process.

Next, with reference to a flowchart of FIG. 13, a description will be made of an example of a flow of the reversible decoding process performed in step S202 of FIG. 12.

The reversible decoding process is performed for each layer of an image in the same manner as the reversible coding process.

In other words, the NAL decoding section 231 decodes coded data on the SPS in step S221, decodes coded data on the PPS in step S222, and decodes coded data on the slice header in step S223. In step S224, the CU data decoding section 232 decodes a corresponding CU which is a process target.

The CU data decoding section 232 repeatedly performs the process in step S224 on all CUs in a corresponding slice which is a process target. In step S225, if it is determined that there is no unprocessed CU in the corresponding slice, the CU data decoding section 232 makes the process proceed to step S226.

The NAL decoding section 231 repeatedly performs the processes in step S223 to step S225 on all slices in a corresponding picture which is a process target. In step S226, if there is no unprocessed slice in the corresponding picture, the NAL decoding section 231 makes the process proceed to step S227.

The NAL decoding section 231 repeatedly performs the processes in step S222 to step S226 on all pictures in a corresponding sequence which is a process target. In step S227, if there is no unprocessed picture in the corresponding sequence, the NAL decoding section 231 finishes the reversible decoding process, and returns the process to FIG. 12.

[CU Decoding Process]

Figure 14:
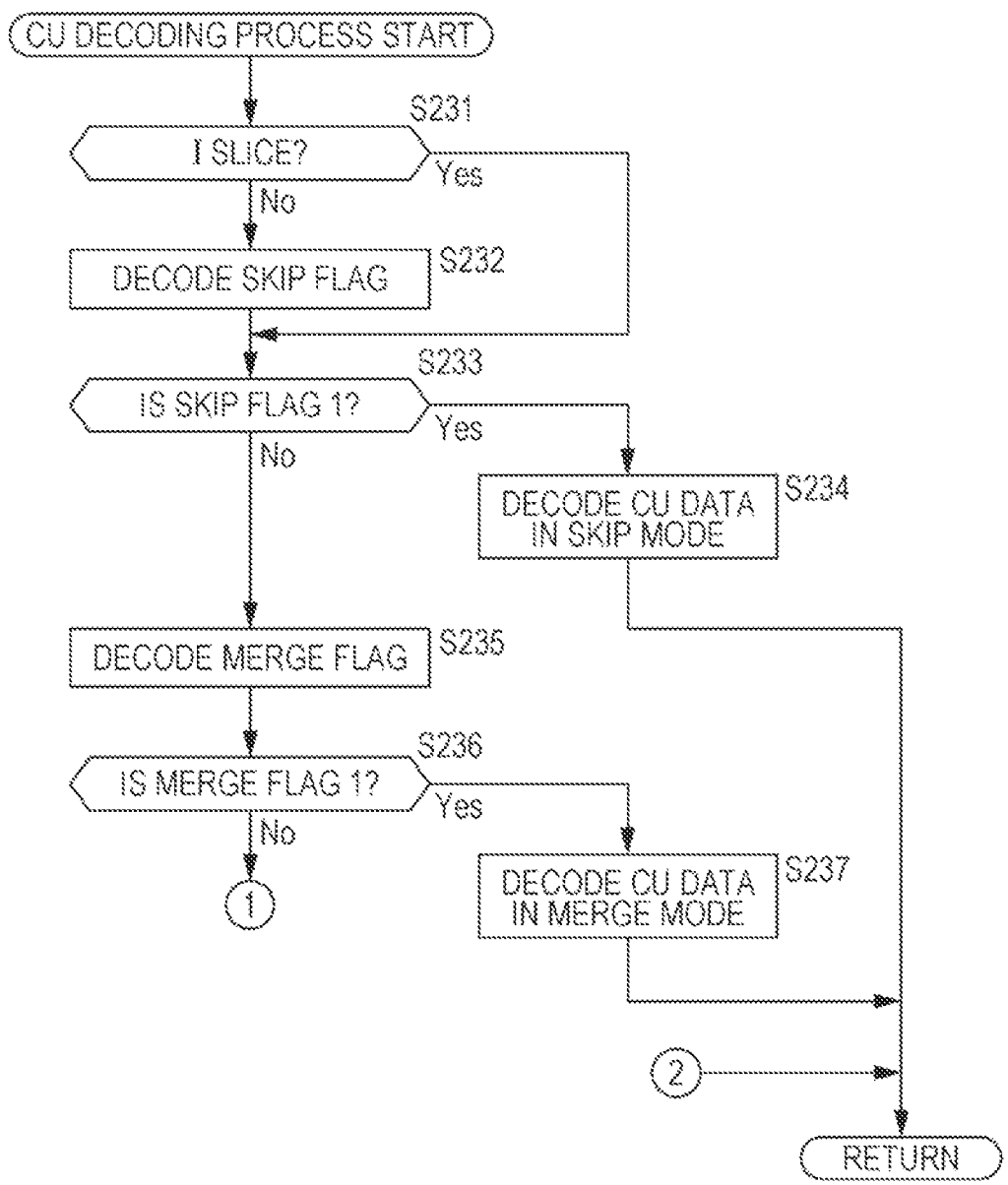
FIG. 14 is a flowchart illustrating an example of a flow of a CU decoding process.

Next, with reference to flowcharts of FIGS. 14 and 15, a description will be made of an example of a flow of the CU decoding process performed in step S224 of FIG. 13.

When the CU decoding process starts, in step S231, the decoding control unit 221 determines a type of corresponding slice from the NAL data generated by the NAL decoding section 231, and determines whether or not the corresponding slice is an I slice.

In a case where the corresponding slice is not an I slice (the slice is a P slice or a B slice), the skip flag decoding portion 241 decodes the skip flag in step S232. If the corresponding slice is determined as being an I slice, the skip flag has not been coded, and thus this process is omitted.

If the decoding control unit 221 determines that a value of the skip flag is 1 in step S233, the skip flag is present, and the skip mode decoding portion 242 decodes CU data in the skip mode in step S234. If the CU data has been decoded, the skip mode decoding portion 242 finishes the CU decoding process finishes, and returns the process to FIG. 13.

If the decoding control unit 221 determines that there is not skip flag or a value of the skip flag is 0 in step S233, the merge flag decoding portion 243 decodes the merge flag in step S235.

If the decoding control unit 221 determines that the merge flag is present and a value thereof is 1 in step S236, the merge mode decoding portion 244 decodes CU data in the merge mode in step S237. If the CU data has been decoded, the merge mode decoding portion 244 finishes the CU decoding process, and returns the process to FIG. 13.

Figure 15:
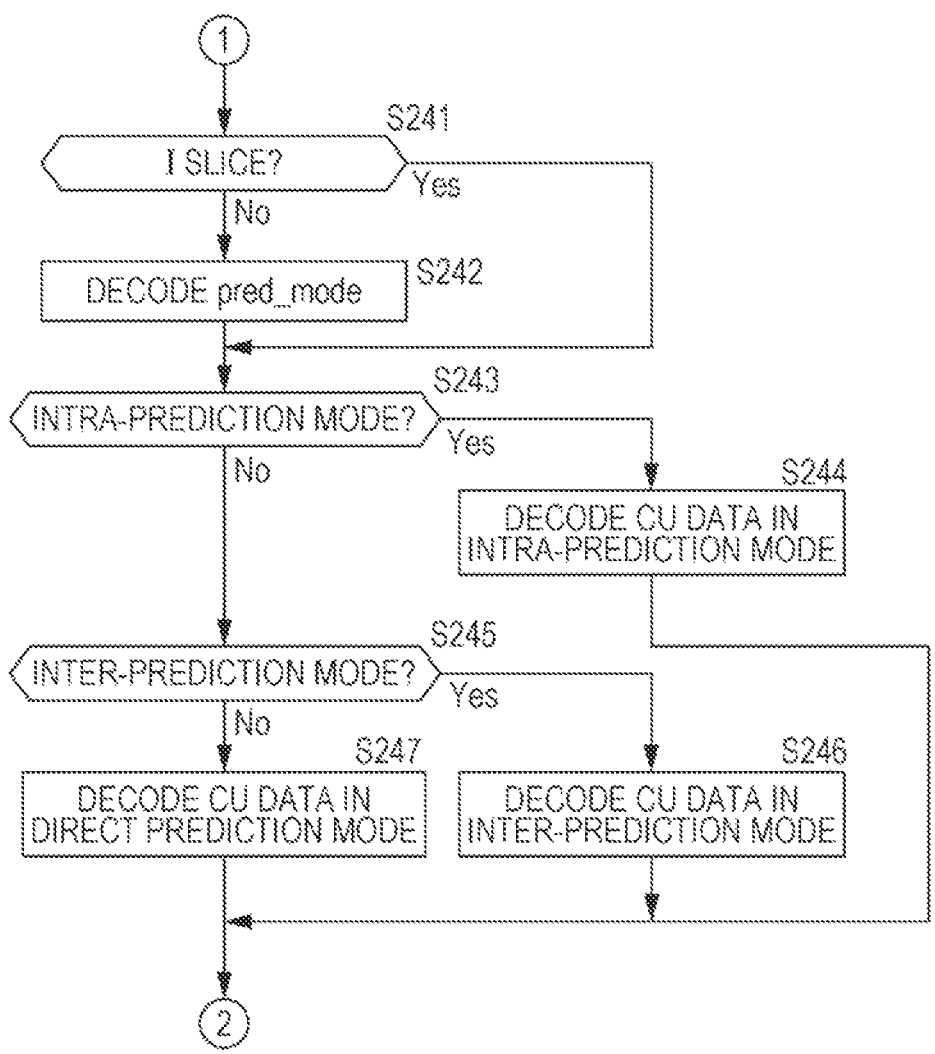
FIG. 15 is a flowchart which illustrates an example of a flow of a CU decoding process and is subsequent to FIG. 14.

In step S238, if the decoding control unit 221 determines that the merge flag is not present, or a value thereof is 0, the process proceeds to FIG. 15.

In this case, the CU data is decoded in a method based on a prediction mode. In other words, in a case where the decoding control unit 221 determines that the corresponding slice is not an I slice in step S241 of FIG. 15, the PredMode decoding portion 245 decodes pred_mode (PredMode) in step S242. If the corresponding slice is determined as being an I slice, pred_mode has not been coded, and thus this process is omitted.

In step S243, if the decoding control unit 221 determines that a prediction mode for the corresponding region is an intra-prediction mode, the intra-decoding portion 246 decodes CU data in the intra-prediction mode (decodes the CU data which has been coded in the intra-prediction mode by using an appropriate method) in step S244. If the CU data has been decoded, the intra-decoding portion 246 finishes the CU decoding process, and returns the process to FIG. 13.

In addition, if the decoding control unit 221 determines that a prediction mode for the corresponding region is not an intra-prediction mode in step S243 and is an inter-prediction mode in step S245, the inter-decoding portion 247 decodes CU data in the inter-prediction mode in step S246 (decodes the CU data which has been coded in the inter-prediction mode by using an appropriate method). If the CU data has been decoded, the inter-decoding portion 247 finishes the CU decoding process, and returns the process to FIG. 13.

Further, if the decoding control unit 221 determines that a prediction mode for the corresponding region is not an intra-prediction mode in step S243 and is not an inter-prediction mode in step S245, the direct mode decoding portion 248 decodes CU data in the direct prediction mode in step S247 (decodes the CU data which has been coded in the direct prediction mode by using an appropriate method). If the CU data has been decoded, the direct mode decoding portion 248 finishes the CU decoding process, and returns the process to FIG. 13.

[One Embodiment of Image Processing Apparatus to which the Present Technology is Applied]

Figure 16:
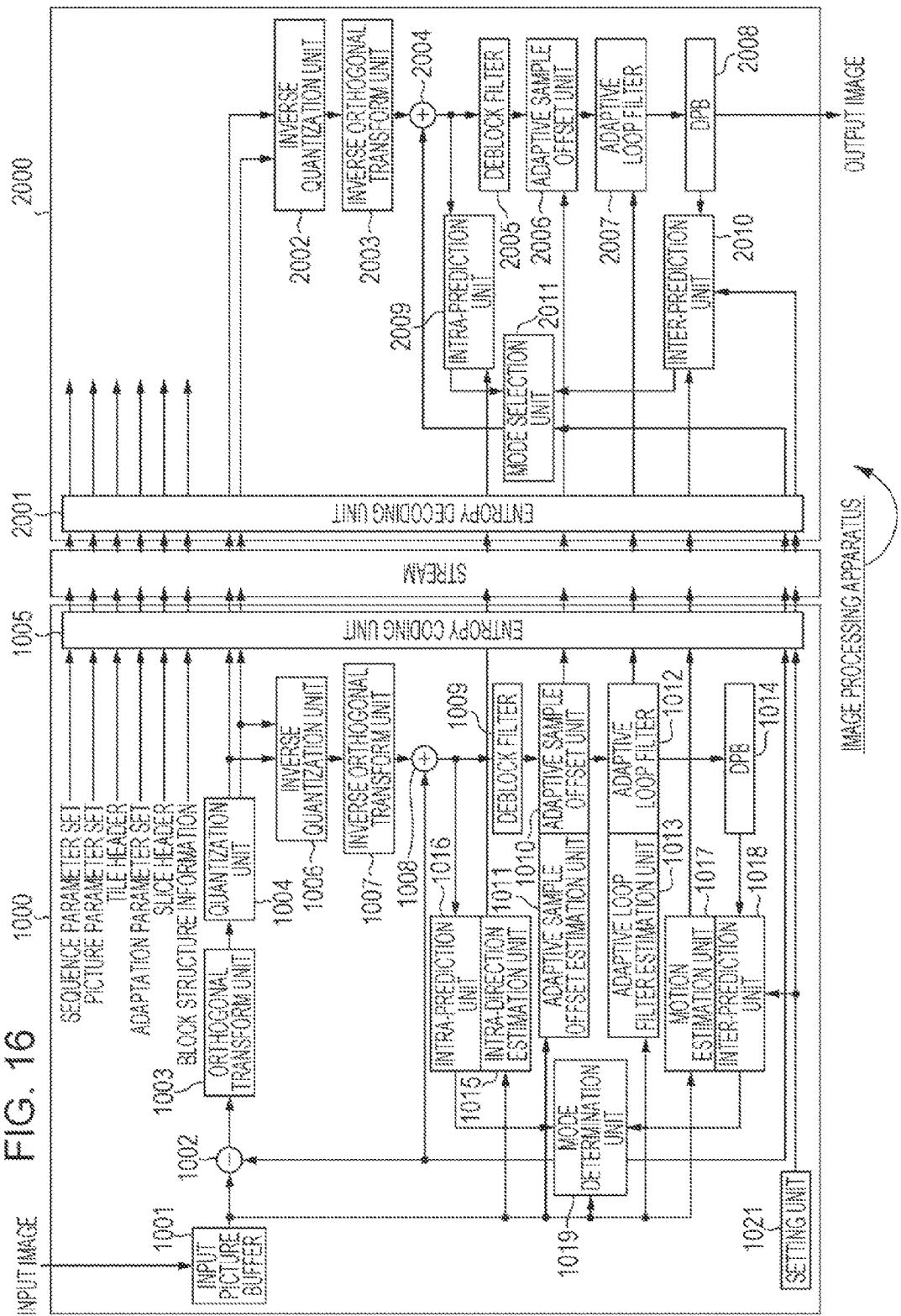
FIG. 16 is a block diagram illustrating a configuration example according to an embodiment of an image processing apparatus to which the present technology is applied.

FIG. 16 is a block diagram illustrating a configuration example of one embodiment of an image processing apparatus to which the present technology is applied.

In FIG. 16, the image processing apparatus includes an encoder 1000 and a decoder 2000. In addition, the encoder 1000 and the decoder 2000 may be mounted in a standalone single apparatus as separate blocks, and each of them may be mounted in a standalone separate apparatus. Further, each of the encoder 1000 and the decoder 2000 may be configured as a standalone single apparatus.

The encoder 1000 is configured in the same manner as the image coding device 100 of FIG. 1.

In other words, in the encoder 1000, an input picture buffer 1001 corresponds to the screen rearrangement buffer 102 of FIG. 1, and a calculation unit 1002 corresponds to the calculation unit 103 of FIG. 1. An orthogonal transform unit 1003 corresponds to the orthogonal transform unit 104 of FIG. 1, and a quantization unit 1004 corresponds to the quantization unit 1005 of FIG. 1. An entropy coding unit 1005 corresponds to the reversible coding unit 106 of FIG. 1, and an inverse quantization unit 1006 corresponds to the inverse quantization unit 108 of FIG. 1. An inverse orthogonal transform unit 1007 corresponds to the inverse orthogonal transform unit 109 of FIG. 1, and a calculation unit 1008 corresponds to the calculation unit 110 of FIG. 1. A deblock filter 1009, an adaptive sample offset unit 1010, an adaptive sample offset estimation unit 1011, an adaptive loop filter 1012, and an adaptive loop filter estimation unit 1013 correspond to the loop filter 111 of FIG. 1, and a decoded picture buffer (DPB) 1014 corresponds to the frame memory 112 of FIG. 1. An intra-direction estimation unit 1015 and an intra-prediction unit 1016 correspond to the intra-prediction unit 114 of FIG. 1, and a motion estimation unit 1017 and an inter-prediction unit 1018 correspond to the motion prediction/compensation unit 115 of FIG. 1. A mode determination unit 1019 corresponds to the prediction image selection unit 116 of FIG. 1.

In addition, the encoder 1000 is different from the image coding device 100 of FIG. 1 in that a setting unit 1021 is additionally provided, the inter-prediction unit 1018 performs a process by using information output by the setting unit 1021, and information output by the setting unit 1021 is included in coded data in the entropy coding unit 1005.

Further, in the encoder 1000 of FIG. 16, a block corresponding to the A/D conversion unit 101, the accumulation buffer 107, the rate control unit 117, and the coding control unit 121 of FIG. 1 is not illustrated.

The decoder 2000 is configured in the same manner as the image decoding device 200 of FIG. 10.

In other words, in the decoder 2000, an entropy decoding unit 2001 corresponds to the reversible decoding unit 202 of FIG. 10, and an inverse quantization unit 2002 corresponds to the inverse quantization unit 203 of FIG. 10. An inverse orthogonal transform unit 2003 corresponds to the inverse orthogonal transform unit 204 of FIG. 10, and a calculation unit 2004 corresponds to the calculation unit 205 of FIG. 10. A deblock filter 2005, an adaptive sample offset unit 2006, and an adaptive sample offset estimation unit 2007 correspond to the loop filter 206 of FIG. 10, and a DPB 2008 corresponds to the frame memory 209 of FIG. 10. An intra-prediction unit 2009 corresponds to the intra-prediction unit 211 of FIG. 10, and an inter-prediction unit 2010 corresponds to the motion prediction/compensation unit 212 of FIG. 10. A mode selection unit 2011 corresponds to the selection unit 213 of FIG. 10.

In addition, the decoder 2000 is different from the image decoding device 200 of FIG. 10 in that the inter-prediction unit 2010 performs a process by using information which is included in coded data obtained in the encoder 1000 and is output by the setting unit 1021.

Further, in the decoder 2000 of FIG. 16, a block corresponding to the accumulation buffer 201, the screen rearrangement buffer 207, the D/A conversion unit 208, and the decoding control unit 221 of FIG. 10 is not illustrated.

In the image processing apparatus of FIG. 16 configured as described above, in the encoder 1000, in the same manner as in the image coding device 100 of FIG. 1, an image is coded, and coded data (coded stream) obtained as a result thereof is transmitted.

However, in the encoder 1000, the setting unit 1021 sets and outputs predetermined information. The information (hereinafter, referred to as setting information) output by the setting unit 1021 is supplied to the inter-prediction unit 1018 and the entropy coding unit 1005.

The inter-prediction unit 1018 generates a prediction image on the basis of the setting information from the setting unit 1021. The prediction image is used to code (prediction-code) a block of an image such as a CU, a PU, a PU partition, and a TU in the calculation unit 1002 to the entropy coding unit 1005, as necessary.

In addition, the entropy coding unit 1005 includes the setting information from the setting unit 1021 in coded data, and transmits the setting information.

On the other hand, the decoder 2000 receives the coded data transmitted from the encoder 1000, and decodes the coded data to an image in the same manner as the image decoding device 200 of FIG. 10.

Here, in the decoder 2000, the entropy decoding unit 2001 separates the setting information from the coded data, and supplies the setting information to the inter-prediction unit 2010.

The inter-prediction unit 2010 generates a prediction image on the basis of the setting information from the entropy decoding unit 2001. The prediction image is used to decode a block of a prediction-coded image in the entropy decoding unit 2001 to the calculation unit 2004 as necessary.

In the image processing apparatus of FIG. 16, the setting information set by the setting unit 1021 includes, for example, identification information or restriction information.

Hereinafter, the identification information and the restriction information will be described.

[Identification Information]

First, identification information which is set by the setting unit 1021 will be described.

Here, as described above, the merge mode is a technique in which a flag (flag information) is transmitted instead of motion information (prediction direction, motion vector, and reference index) (without transmitting the motion information), and coding efficiency can be improved.

The merge mode can be used in any block unit including a CU and a PU, and a technique described below can be applied to the merge mode which is performed in any block unit including the CU and the PU.

Now, a block (corresponding region) which is a coding target in the encoder 1000 is referred to as a target block.

In the merge mode, candidates of a merging region (hereinafter, referred to as merging candidates) which is a region merging with the target block are selected from regions (neighboring regions) which are spatially and temporally close to the target block. In addition, (a merging candidate serving as) a merging region is selected among the merging candidates in order to increase coding efficiency, and merge_idx indicating the merging region is included in the coded stream (coded data).

In addition, merge_idx is described as follows.

merge_idx[x0][y0] specifies the merging candidate index of the merging candidate list where x0, y0 specify the location (x0, y0) of the top-left luma sample of the considered prediction block relative to the top-left luma sample of the picture.

merge_idx is information indicating a region (or motion information of the region) serving as a merging region, used instead of the above-described Merge_Left_Flag. Merge_Left_Flag indicates a region at a left or top position of the target block, but merge_idx can indicate even regions at other positions.

Meanwhile, if access to the DPB 1014 which stores a decoded image frequently occurs in motion compensation (MC) of the encoder 1000, a memory bandwidth increases which is a transmission rate at which the decoded image is read from the DPB 1014.

In other words, in a case where not either of L0 prediction and L1 prediction (hereinafter, referred to as uni-prediction) but both of L0 prediction and L1 prediction (hereinafter, referred to as bi-prediction) are used as prediction of a prediction image used for the MC, or in a case where a block size of a target block is small, a memory bandwidth increases.

However, if a high rate is to be secured as a memory bandwidth, a cost of the encoder 1000 increases. This is also the same for the decoder 2000 including the DPB 2008.

As described above, a maximal memory bandwidth (hereinafter, referred to as a necessary maximal bandwidth) necessary in the MC is a bottleneck in mounting the encoder 1000 and the decoder 2000.

As a method of reducing the necessary maximal bandwidth, for example, there is a method of prohibiting a block with a small size from being used, or a method of prohibiting bi-prediction from being used in accordance with a size of a block. However, for example, in a case where bi-prediction is prohibited from being used in a block with a predetermined size or less, when merging candidates are all regions which are bi-predicted, a merging candidate which will becomes a merging region is not selected with respect to a block with a predetermined size or less, and, as a result, there is a concern that the merge mode cannot be used, and thus coding efficiency may deteriorate.

Therefore, in the encoder 1000, the setting unit 1021 sets identification information, and the inter-prediction unit 1018 performs prediction (generation of a prediction image) on the basis of the identification information, thereby allowing the necessary maximal bandwidth to be minimized.

Here, the identification information is information for identifying a correspondence relationship between a size of a block of an image and changing in a prediction method applied to the block, and, for example, any one of the following first information, second information, and third information may be used as the identification information.

The first information which can be used as the identification information is disable_bip_small_mrg_idc information (flag), and the disable_bip_small_mrg_idc information can take, for example, four values including 0, 1, 2, and 3.

FIG. 17 is a diagram illustrating the disable_bip_small_mrg_idc information.

The disable_bip_small_mrg_idc information at each value indicates a size (block size) of a block (here, for example, a PU partition) of which a prediction method is changed so that uni-prediction is applied instead of bi-prediction.

In other words, the disable_bip_small_mrg_idc information having a value of 0 indicates that a prediction method of a merging candidate is not changed regardless of a block size of a PU partition of a target block.

The disable_bip_small_mrg_idc information having a value of 1 indicates that, in a case where a block size of a PU partition of a target block is 4×4 (the number of width×height pixels), a prediction method of a merging candidate to which bi-prediction is applied is changed (replaced) so that uni-prediction is applied instead of the bi-prediction, and a process in the merge mode is performed.

Here, the fact that a prediction method of a merging candidate to which bi-prediction is applied is changed so that uni-prediction is applied instead of the bi-prediction and a process in the merge mode is performed indicates that a prediction method of a merging candidate to which bi-prediction is applied is not changed to uni-prediction in practice, but, prediction of a merging candidate is performed in uni-prediction, and motion information regarding the uni-prediction is used for a process of a target block (a PU partition thereof). Therefore, prediction of (not a target block but) a merging candidate itself is performed by using a prediction method which is determined (selected) for the merging candidate without change.

In a case where the disable_bip_small_mrg_idc having a value of 1 is set, a prediction method of a merging candidate to which bi-prediction is applied is changed so that uni-prediction is applied instead of the bi-prediction, and a process in the merge mode is performed on a PU partition having a block size of 4×4.

Therefore, for example, in a case where the bi-prediction is prohibited from being used in the PU partition having a block size of 4×4, even if all merging candidates are regions which are bi-predicted, the bi-prediction is changed to the uni-prediction, and a process in the merge mode is performed.

As a result, it is possible to prevent coding efficiency from deteriorating due to being incapable of using the merge mode in a case where the bi-prediction is prohibited from being used in a PU partition having a predetermined size or less.

Here, a loss of changing a prediction method of a merging candidate from the bi-prediction to the uni-prediction is smaller than a loss of being incapable of using the merge mode.

The disable_bip_small_mrg_idc information having a value of 2 indicates that in a case where a block size of a PU partition of a target block is any one of 4×4, 8×4, and 4×8, a prediction method of a merging candidate to which bi-prediction is applied is changed so that uni-prediction is applied instead of the bi-prediction, and a process in the merge mode is performed.

The disable_bip_small_mrg_idc information having a value of 3 indicates that in a case where a block size of a PU partition of a target block is any one of 4×4, 8×4, 4×8, and 8×8, a prediction method of a merging candidate to which bi-prediction is applied is changed so that uni-prediction is applied instead of the bi-prediction, and a process in the merge mode is performed.

Here, block sizes other than the above 4×4, 8×4, 4×8, and 8×8 may be employed as a block size of a PU partition in which a prediction method of a merging candidate is changed so that the uni-prediction is applied instead of the bi-prediction.

In addition, values taken by the disable_bip_small_mrg_idc information are not limited to the four values including 0 to 3.

Further, the bi-prediction is prediction of performing, for example, both of L0 prediction and L1 prediction, and the uni-prediction which is applied to a merging candidate instead of the bi-prediction is either of the L0 prediction and the L1 prediction as the bi-prediction.

In a case where the disable_bip_small_mrg_idc information as the first information is used, it is necessary that either of the L0 prediction and the L1 prediction be determined in advance as the uni-prediction applied to a merging candidate instead of the bi-prediction, and be unitified in the encoder 1000 and the decoder 2000.

Figure 18:
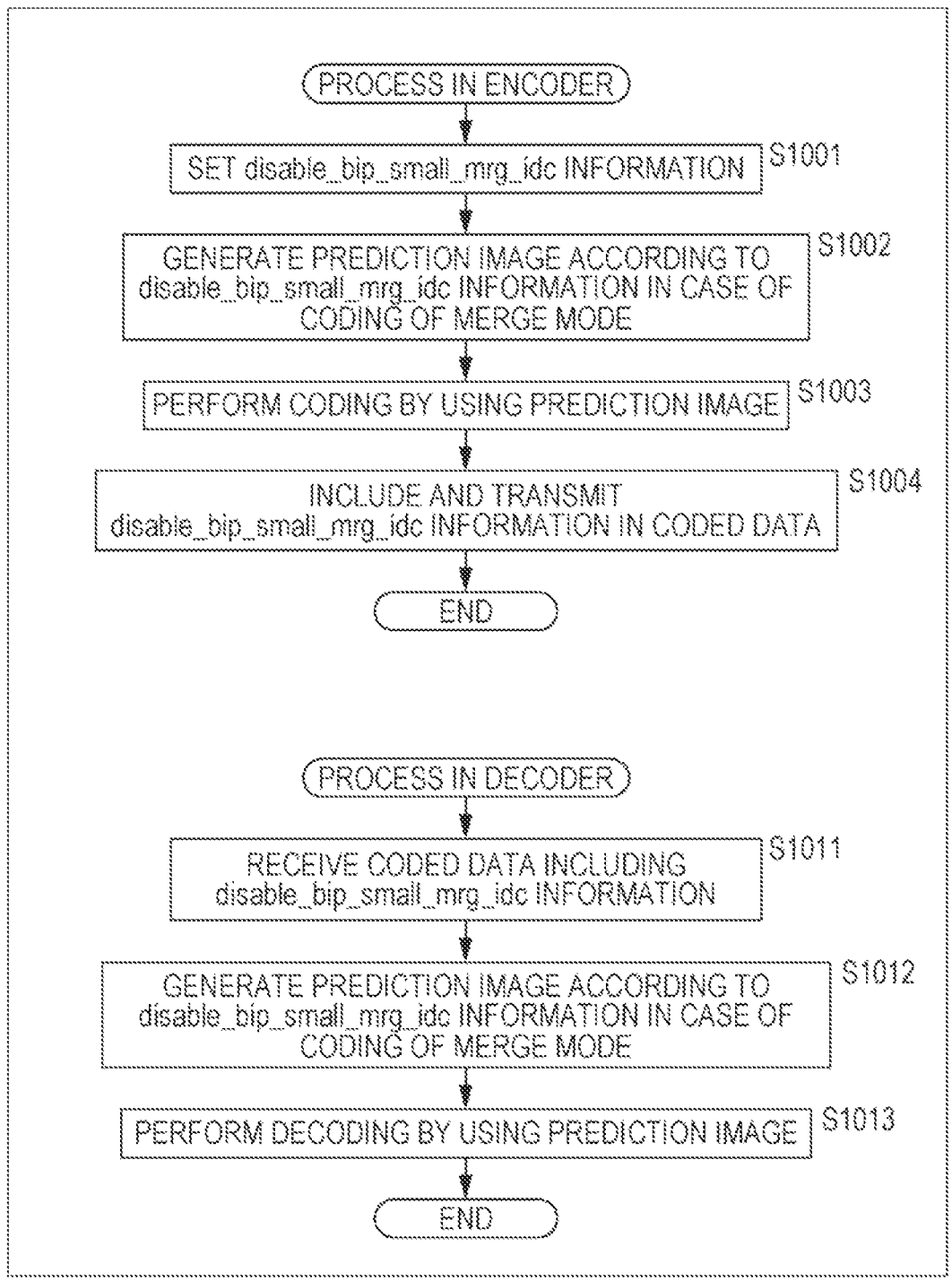
FIG. 18 is a flowchart illustrating a process performed by an encoder 1000 and a decoder 2000 when using the disable_bip_small_mrg_idc information.

FIG. 18 is a flowchart illustrating an outline of a process performed by the encoder 1000 and the decoder 2000 in a case where the disable_bip_small_mrg_idc information as the first information is used.

In the encoder 1000, in step S1001, the setting unit 1021 sets the disable_bip_small_mrg_idc information in a target block, for example, on the basis of a maximal value of a memory bandwidth of the DPB 1014, and supplies the information to the inter-prediction unit 1018 and the entropy coding unit 1005.

In step S1002, the inter-prediction unit 1018 performs a process in the merge mode and further performs generation of a prediction image on the basis of the disable_bip_small_mrg_idc information from the setting unit 1021. In other words, in a case where a process (coding) in the merge mode is performed, the inter-prediction unit 1018 generates a prediction image on the basis of the disable_bip_small_mrg_idc information from the setting unit 1021.

In addition, the setting unit 1021 sets the disable_bip_small_mrg_idc information having a greater value as a maximal value of a memory bandwidth of the DPB 1014 becomes smaller. Therefore, as a maximal value of a memory bandwidth of the DPB 1014 becomes smaller, a prediction method of a merging candidate of a PU partition is changed from the bi-prediction to the uni-prediction up to the PU partition having a greater block size, and a memory bandwidth is minimized when a decoded image is read from the DPB 1014 for generation of a prediction image.

As mentioned above, a memory bandwidth is minimized when a decoded image is read from the DPB 1014, and thus it is possible to prevent an increase in a cost of the encoder 1000.

In step S1003, the calculation unit 1002 to the entropy coding unit 1005 code the target block by using the prediction image generated in step S1002 as necessary.

In step S1004, the entropy coding unit 1005 includes (for example, multiplexes) the disable_bip_small_mrg_idc information from the setting unit 1021 in (into) coded data, and transmits the information.

Further, the entropy coding unit 1005 may include the disable_bip_small_mrg_idc information in, for example, a SPS, a PPS, an APS, or a slice header of the coded data (coded stream).

On the other hand, in the decoder 2000, in step S1011, the entropy decoding unit 2001 receives the coded data including the disable_bip_small_mrg_idc information. In addition, the entropy decoding unit 2001 separates the disable_bip_small_mrg_idc information from the coded data, and supplies the information to the inter-prediction unit 2010.

In step S1012, the inter-prediction unit 2010 performs a process in the merge mode and further performs generation of a prediction image on the basis of the disable_bip_small_mrg_idc information in the same manner as the inter-prediction unit 1018. In other words, in a case where a process (coding) in the merge mode is performed, the inter-prediction unit 2010 generates a prediction image on the basis of the disable_bip_small_mrg_idc information from the entropy decoding unit 2001.

In addition, in step S1013, the entropy decoding unit 2001 to the calculation unit 2004 decode the coded data received in step S1021 by using the prediction image generated in step S1012 as necessary.

Further, in the encoder 1000, the setting unit 1021 may set the disable_bip_small_mrg_idc information in response to an operation performed by a user such as an operator of the encoder 1000.

In addition, in the encoder 1000, in relation to a memory bandwidth at each value, a profile or a level for prescribing a process amount of the decoder may be defined as a necessary maximal bandwidth according to the necessary maximal bandwidth at each value, and profile information and level information (profile_idc and level_idc) may be included in the coded data.

Here, profile_idc and level_idc are described as follows.

profile_idc and level_idc indicate the profile and level to which the coded video sequence conforms.

Therefore, profile_idc and level_idc have not been defined in detail yet, but, for example, profile_idc and level_idc may be defined so as to include information on a necessary maximal bandwidth in the MC.

For example, profile_idc and level_idc may be defined so as to include information such as a minimal value of a block size of a PU partition, whether or not bi-prediction is used, and a combination of a minimal value of a block size of a PU partition and whether or not bi-prediction is used.

In the setting unit 1021, for example, as described above, the disable_bip_small_mrg_idc information is set on the basis of a maximal value of a memory bandwidth of the DPB 1014.

In addition, in the encoder 1000, use of a PU partition having a block size which is equal to or smaller than a predetermined size, or application of bi-prediction to the PU partition having a block size which is equal to or smaller than a predetermined size is prohibited depending on profile_idc or level_idc.

However, for example, although the bi-prediction is prohibited from being applied to a PU partition having a block size of 4×4, in a case where the disable_bip_small_mrg_idc information having a value of 1 is set, in the encoder 1000, in relation to the PU partition of (block size of) 4×4, a prediction method of a merging candidate to which the bi-prediction is applied is changed so that the uni-prediction is applied instead of the bi-prediction, and a process in the merge mode is performed.

Therefore, in relation to the PU partition of 4×4 to which the bi-prediction is prohibited from being applied, even if all merging candidates are regions which are bi-predicted, the bi-prediction is changed to the uni-prediction, and thus a process in the merge mode can be performed.

Also in the decoder 2000, a prediction method of a merging candidate to which the bi-prediction is applied is changed from the bi-prediction to the uni-prediction on the basis of the disable_bip_small_mrg_idc information as necessary, in the same manner as in the encoder 1000.

Next, the second information which can be employed as the identification information will be described.

The second information which can be employed as the identification information is disable_bip_small_mrg_idc extension information which is obtained by extending the disable_bip_small_mrg_idc information which is the first information, and can take seven values including, for example, 0, 1, 2, 3, 4, 5, and 6.

FIG. 19 is a diagram illustrating the disable_bip_small_mrg_idc extension information.

The disable_bip_small_mrg_idc extension information at each value indicates a block size of a PU partition of which a prediction method is changed so that uni-prediction is applied instead of bi-prediction, and a prediction direction of the uni-prediction which is applied instead of the bi-prediction, and semantics thereof are as follows.

In other words, the disable_bip_small_mrg_idc extension information having a value of 0 indicates that a prediction method of a merging candidate is not changed regardless of a block size of a PU partition of a target block in the same manner as the disable_bip_small_mrg_idc information having a value of 0.

The disable_bip_small_mrg_idc extension information having a value of 1 or 2 all indicates that, in a case where a block size of a PU partition of a target block is 4×4, a prediction method of a merging candidate to which bi-prediction is applied is changed so that uni-prediction is applied instead of the bi-prediction, and a process in the merge mode is performed, in the same manner as the disable_bip_small_mrg_idc information having a value of 1.

In addition, the disable_bip_small_mrg_idc extension information having a value of 1 indicates that a prediction direction of the uni-prediction applied instead of the bi-prediction is, for example, L0 prediction of L0 prediction and L1 prediction. Further, the disable_bip_small_mrg_idc extension information having a value of 2 indicates that a prediction direction of the uni-prediction applied instead of the bi-prediction is, for example, L1 prediction of L0 prediction and L1 prediction.

The disable_bip_small_mrg_idc extension information having a value of 3 or 4 all indicates that in a case where a block size of a PU partition of a target block is any one of 4×4, 8×4, and 4×8, a prediction method of a merging candidate to which bi-prediction is applied is changed so that uni-prediction is applied thereto instead of the bi-prediction, and a process in the merge mode is performed, in the same manner as the disable_bip_small_mrg_idc information having a value of 2.

In addition, the disable_bip_small_mrg_idc extension information having a value of 3 indicates that a prediction direction of the uni-prediction applied instead of the bi-prediction is, for example, L0 prediction of L0 prediction and L1 prediction. Further, the disable_bip_small_mrg_idc extension information having a value of 4 indicates that a prediction direction of the uni-prediction applied instead of the bi-prediction is, for example, L1 prediction of L0 prediction and L1 prediction.

The disable_bip_small_mrg_idc extension information having a value of 5 or 6 all indicates that in a case where a block size of a PU partition of a target block is any one of 4×4, 8×4, 4×8, and 8×8, a prediction method of a merging candidate to which bi-prediction is applied is changed so that uni-prediction is applied instead of the bi-prediction, and a process in the merge mode is performed, in the same manner as the disable_bip_small_mrg_idc information having a value of 3.

In addition, the disable_bip_small_mrg_idc extension information having a value of 5 indicates that a prediction direction of the uni-prediction applied instead of the bi-prediction is, for example, L0 prediction of L0 prediction and L1 prediction. Further, the disable_bip_small_mrg_idc extension information having a value of 6 indicates that a prediction direction of the uni-prediction applied instead of the bi-prediction is, for example, L1 prediction of L0 prediction and L1 prediction.

The disable_bip_small_mrg_idc extension information as the second information indicates not only a block size of a PU partition of which a prediction method is changed so that the uni-prediction is applied instead of the bi-prediction but also a prediction direction of the uni-prediction applied instead of the bi-prediction. Therefore, in the same manner as in the disable_bip_small_mrg_idc information as the first information, it is not necessary that either of the L0 prediction and the L1 prediction be determined in advance as the uni-prediction applied to a merging candidate instead of the bi-prediction, in the encoder 1000 and the decoder 2000.

A process performed by the encoder 1000 and the decoder 2000 of FIG. 16 when the disable_bip_small_mrg_idc extension information is used is the same as the process described in FIG. 18 except that the disable_bip_small_mrg_idc extension information is used instead of the disable_bip_small_mrg_idc information, and thus description thereof will not be repeated.

Next, the third information which can be employed as the identification information will be described.

The third information which can be employed as the identification information correspond to two information pieces including the disable_bip_small_mrg_idc information which is the first information, and modify_bip_small_mrg_10 information.

Figure 20:
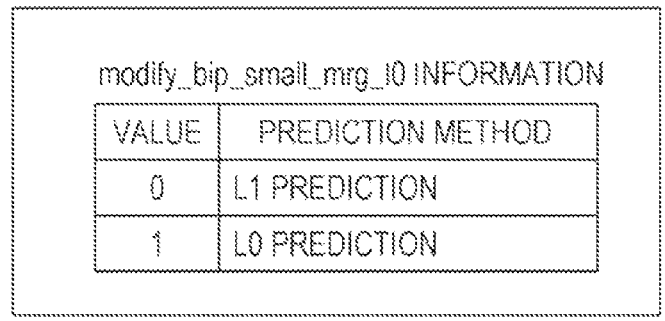
FIG. 20 is a diagram illustrating modify_bip_small_mrg_10 information.

FIG. 20 is a diagram illustrating the modify_bip_small_mrg_10 information.

The modify_bip_small_mrg_10 information takes two values including, for example, 0 and 1, and indicates a prediction direction of uni-prediction applied instead of bi-prediction.

In other words, the modify_bip_small_mrg_10 information having a value of 0 indicates that uni-prediction applied instead of bi-prediction is, for example, L1 prediction, and the modify_bip_small_mrg_10 information having a value of 1 indicates that uni-prediction applied instead of bi-prediction is, for example, L0 prediction.

According to the third information, a block size of a PU partition of which a prediction method is changed can be controlled so that uni-prediction is applied instead of bi-prediction by using the disable_bip_small_mrg_idc information, and a prediction direction of the uni-prediction applied instead of the bi-prediction can be controlled by using the modify_bip_small_mrg_10 information.

As a result, a reference direction can be controlled in a smaller unit.

In a case where there is a difference in prediction quality (prediction error) depending on a prediction direction of uni-prediction, that is, a reference direction, the L1 prediction tends to have higher prediction quality than the L0 prediction, and in a case where a target picture which is a prediction target is temporally close to a reference picture (reference image), generally, the L1 prediction tends to have higher prediction quality. In this case, the L1 prediction is used as uni-prediction applied instead of bi-prediction, and thus it is possible to increase coding efficiency.

In addition, in a case where there is a difference in a quantization parameter QP when reference pictures of the L0 prediction and the L1 prediction are coded, the reference picture with a smaller quantization parameter QP is expected to be predicted with higher quality. In addition, when scenes of moving images are changed, employing a reference direction in which the same scene is selected increases predetermined quality. In other words, in a case where there is a scene change, a picture before the scene change is used as a reference picture when the picture before the scene change is coded, and a picture after the scene change is used as a reference picture when the picture after the scene change is coded, thereby increasing prediction quality.

According to the modify_bip_small_mrg_10 information, it is possible to select one of the L0 prediction and the L1 prediction, which provide better prediction quality, as uni-prediction applied instead of bi-prediction.

In addition, the modify_bip_small_mrg_10 information can be included in coded data when the disable_bip_small_mrg_idc information has values other than 0.

Therefore, the modify_bip_small_mrg_10 information can be included in coded data in a layer lower than the disable_bip_small_mrg_idc information.

For example, the disable_bip_small_mrg_idc information may be included in an SPS, and the modify_bip_small_mrg_10 information may be included in a slice header. The modify_bip_small_mrg_10 information may be included in other elements, for example, a PPS, a tile header, an LCU, a CU, a PU, and the like.

In which layer the modify_bip_small_mrg_10 information and the disable_bip_small_mrg_idc information are included may be determined by the trade-off between to what extent changing in a prediction method based on the modify_bip_small_mrg_10 information and the disable_bip_small_mrg_idc information is controlled in a fine unit, and an increase in a data amount due to the modify_bip_small_mrg_10 information and the disable_bip_small_mrg_idc information being included in coded data.

A process performed by the encoder 1000 and the decoder 2000 of FIG. 16 when the modify_bip_small_mrg_10 information and the disable_bip_small_mrg_idc information are used is the same as the process described in FIG. 18 except that the modify_bip_small_mrg_10 information is used in addition to the disable_bip_small_mrg_idc information, and thus description thereof will not be repeated.

Figure 21:
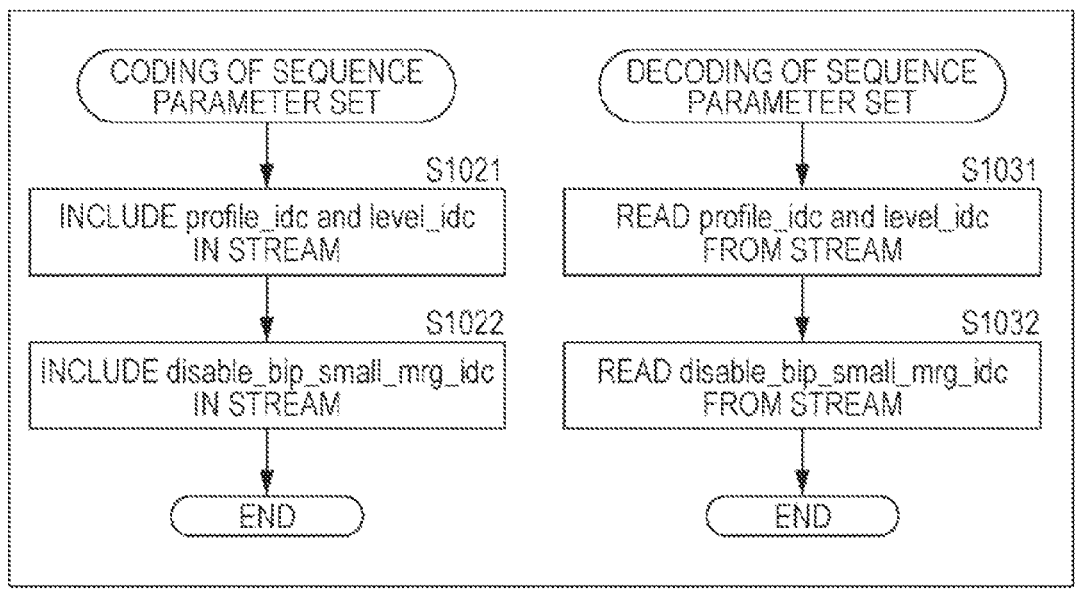
FIG. 21 is a flowchart illustrating coding of an SPS performed by the encoder 1000, and decoding of the SPS performed by the decoder 2000.

FIG. 21 is a flowchart illustrating an outline of coding of an SPS performed by the encoder 1000 and decoding of the SPS performed by the decoder 2000 when the disable_bip_small_mrg_idc information or the disable_bip_small_mrg_idc extension information is used.

In the encoder 1000, in step S1021, the entropy coding unit 1005 includes profile_idc and level_idc in an SPS of coded data (coded stream).

In addition, in step S1022, the entropy coding unit 1005 includes the disable_bip_small_mrg_idc information or the disable_bip_small_mrg_idc extension information supplied from the setting unit 1021 in the SPS of the coded data.

On the other hand, in the decoder 2000, in step S1031, the entropy decoding unit 2001 separates (reads) profile_idc and level_idc from the coded data.

In addition, in step S1032, the entropy decoding unit 2001 separates the disable_bip_small_mrg_idc information or the disable_bip_small_mrg_idc extension information from the coded data, and supplies the information to the inter-prediction unit 2010.

Figure 22:
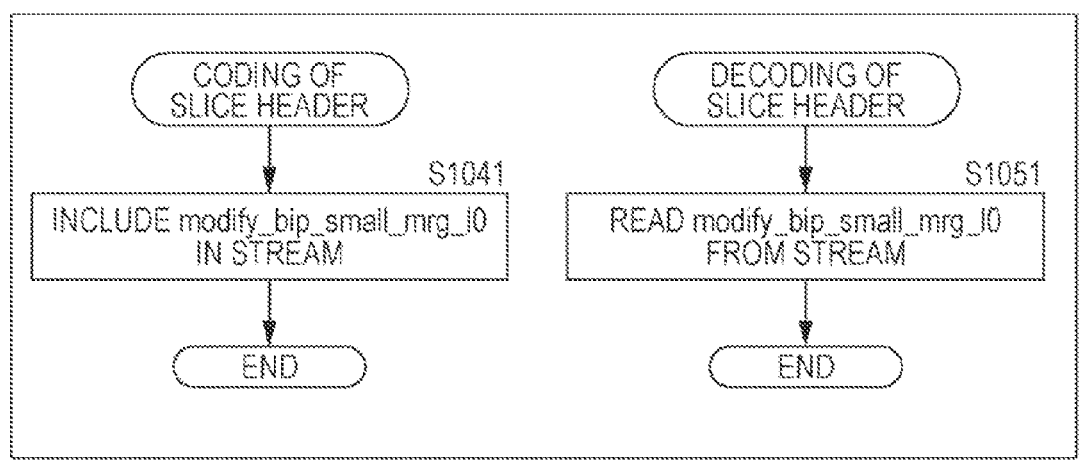
FIG. 22 is a flowchart illustrating coding of a slice header performed by the encoder 1000, and decoding of the slice header performed by the decoder 2000.

FIG. 22 is a flowchart illustrating an outline of coding of a slice header performed by the encoder 1000 and decoding of the slice header performed by the decoder 2000 when the disable_bip_small_mrg_idc information and the modify_bip_small_mrg_10 information are used.

In the encoder 1000, in step S1041, the entropy coding unit 1005 includes the modify_bip_small_mrg_10 information from the setting unit 1021 in a slice header of coded data.

On the other hand, in the decoder 2000, in step S1051, the entropy decoding unit 2001 separates (reads) the modify_bip_small_mrg_10 information from the coded data, and supplies the information to the inter-prediction unit 2010.

In addition, a process such as including the disable_bip_small_mrg_idc information used along with the modify_bip_small_mrg_10 information in the SPS is performed, for example, as described in FIG. 21.

Figure 23:
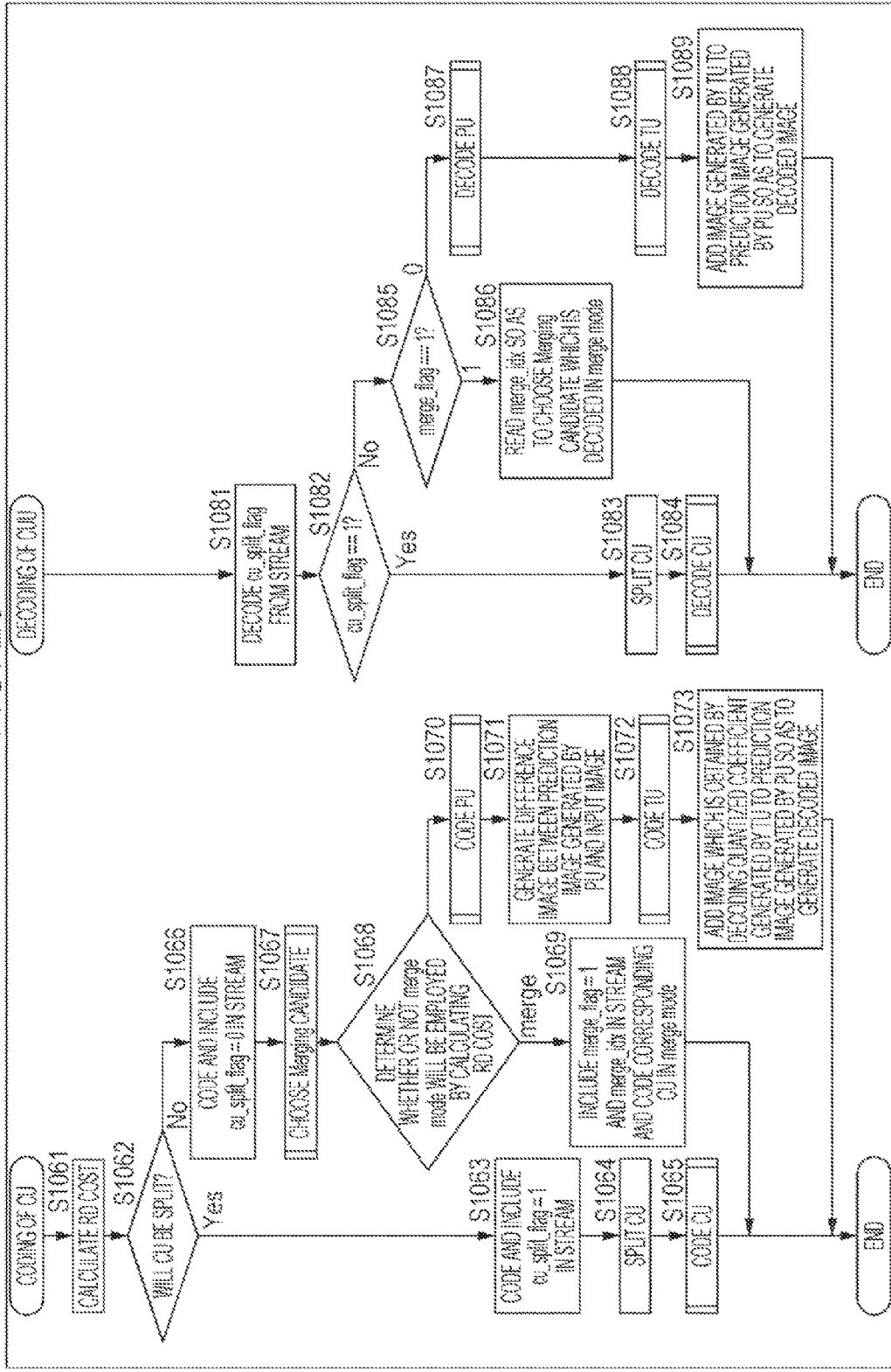
FIG. 23 is a flowchart illustrating coding of the CU performed by the encoder 1000, and decoding of the CU performed by the decoder 2000.

FIG. 23 is a flowchart illustrating an outline of coding of a CU performed by the encoder 1000 and decoding of the CU performed by the decoder 2000.

In the coding of the CU, in step S1061, the encoder 1000 calculates cost function values in respective cases including a case where the CU as a target block is split and a case where the CU is not split. Here, as for the cost function value, for example, a value called an RD cost in which a generated bit rate and coding distortion are taken into consideration is known.

In step S1062, the encoder 1000 determines whether or not the CU as a target block will be split on the basis of the RD cost calculated in step S1061.

Here, in step S1062, in a case where the RD cost when the CU is split is smaller than the RD cost when the CU is not split (in a case where a generated bit rate and coding distortion are comprehensively further improved when the CU is split than when the CU is not split), it is determined that the CU is split.

If it is determined that the CU will be split in step S1062, the process proceeds to step S1063 in which the encoder 1000 sets, for example, 1 which is a value indicating that the CU will be split, in cu_split_flag which is a flag regarding the split of the CU, and includes the flag in coded data (coded stream).

In addition, in step S1064, the encoder 1000 splits the CU as a target block into, for example, new four (2×2) CUs.

Further, in step S1065, the encoder 1000 sequentially recursively performs a coding process of the CU as a target block on the new four CUs obtained due to the split in step S1064.

On the other hand, if it is determined that the CU will not be split in step S1062, the process proceeds to step S1066 in which the encoder 1000 sets, for example, 0 which is a value indicating that the CU will not be split, in cu_split_flag, and includes the flag in coded data.

Then, in step S1067, the encoder 1000 performs a merging candidate choosing process of selecting a merging candidate, and the process proceeds to step S1068.

In step S1068, the encoder 1000 calculates RD costs of respective cases including cases where the CU as a target block is coded by using the merge mode and is coded without using the merge mode.

In addition, in step S1068, the encoder 1000 determines whether or not the CU as a target block will be coded in the merge mode on the basis of the RD cost calculated in step S1068.

Here, in step S1068, in a case where the RD cost when the target block is coded in the merge mode is smaller than the RD cost when the merge mode is not used (in a case where a generated bit rate and coding distortion are comprehensively further improved when the merge mode is used than when the merge mode is not used), it is determined that coding will be performed in the merge mode.

If it is determined that the coding will be performed in the merge mode (the merge mode will be used) in step S1068, the process proceeds to step S1069 in which the encoder 1000 sets 1 which is a value indicating that the merge mode will be used, in merge_flag which is a flag regarding the merge mode, sets a value indicating a position of a merging region in merge_idx indicating the merging region, and includes the flag and the information in the coded data.

In addition, in step S1069, the encoder 1000 codes the CU as a target block in the merge mode (generates a prediction image by using motion information of the merging region as motion information of the target block, and codes the target block).

On the other hand, if it is determined that coding will not be performed in the merge mode (the merge mode will not be used) in step S1068, the process proceeds to step S1070 in which the encoder 1000 performs a coding process of a PU forming the CU as a target block.

In step S1071, the encoder 1000 subtracts the prediction image obtained due to the coding process on the PU in step S1070, from a TU (input image) included in the PU forming the CU as a target block, and generates a difference image for the TU.

In step S1072, the encoder 1000 performs a coding process on the TU for which the difference image is generated in step S1071.

In addition, in step S1073, the encoder 1000 performs orthogonal transform and quantization on the difference image for the TU obtained due to the coding process on the TU, so as to obtain a quantized coefficient, and performs inverse quantization and inverse orthogonal transform on the obtained quantized coefficient, so as to decode the difference image.

Further, in step S1073, the encoder 1000 adds the prediction image obtained due to the coding process on the PU to the difference image decoded in step S1073, thereby generating a decoded image for the TU. The decoded image is stored in the DPB 1014, and is then used as a reference image (picture) as necessary.

On the other hand, in the decoding of the CU, in step S1081, the decoder 2000 decodes cu_split_flag of the CU as a target block from the coded data (coded stream).

In addition, in step S1082, the decoder 2000 determines whether or not a value of cu_split_flag is 1.

If a value of cu_split_flag is 1 in step S1082, that is, the CU as a target block is split, the process proceeds to step S1083 in which the decoder 2000 splits the CU as a target block into new four CUs in the same manner as in a case of step S1064.

Further, in step S1084, the decoder 2000 sequentially recursively performs a decoding process of the CU as a target block on the new four CUs obtained due to the split in step S1083.

On the other hand, if a value of cu_split_flag is not 1 (is 0) in step S1082, that is, the CU as a target block is not split, the process proceeds to step S1085 in which the decoder 2000 determines whether or not a value of merge_flag is 1.

In step S1085, if a value of merge_flag is 1, that is, the CU as a target block has been coded in the merge mode, the process proceeds to step S1086 in which the decoder 2000 reads merge_idx from the coded data and performs the same merging candidate choosing process as in the case of step S1067.

In addition, in step S1086, the decoder 2000 selects a merging candidate at a position indicated by merge_idx as a merging region among merging candidates obtained due to the merging candidate choosing process, and decodes the CU as a target block in the merge mode by using (motion information of) the merging region (generates a prediction image by using the motion information of the merging region as motion information of the target block, and decodes the target block).

In addition, in step S1085, if a value of merge_flag is not 1 (is 0), that is, the CU as a target block has been coded without using the merge mode, the process proceeds to step S1087 in which the decoder 2000 performs a decoding process on the PU forming the CU as a target block, and performs a decoding process on the TU included in the PU in step S1088.

Further, in step S1089, the decoder 2000 adds the prediction image obtained due to the decoding process on the PU to a difference image which is obtained by performing inverse quantization and inverse orthogonal transform on a quantized coefficient which is obtained due to the decoding process on the TU, thereby generating a decoded image for the TU. The decoded image is stored in the DPB 2008, and is then used as a reference image (picture) as necessary.

Figure 24:
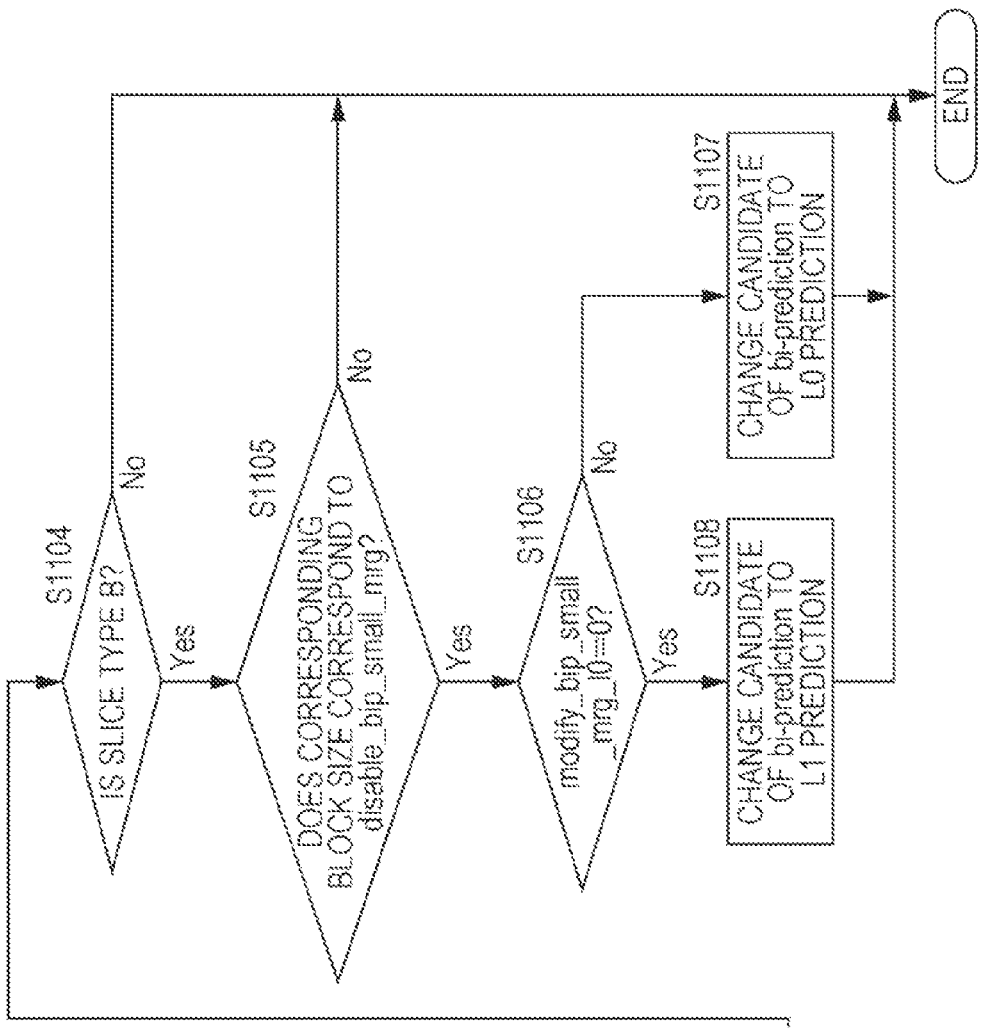
FIG. 24 is a flowchart illustrating choice (selection) of merge candidates.

FIG. 24 is a flowchart illustrating the choice (selection) of the merging candidate in step S1067 of FIG. 23.

In other words, FIG. 24 is a flowchart illustrating the choice of a merging candidate when the disable_bip_small_mrg_idc information and the modify_bip_small_mrg_10 information are used.

In step S1101, among neighboring blocks which are blocks which are spatially and temporally close to the target block, the encoder 1000 adds an inter-prediction block which is inter-predicted to a merging candidate.

In addition, in this step, if a prediction method of the inter-prediction block is bi-prediction, the inter-prediction block is added to a merging candidate in a state of the bi-prediction.

In step S1102, the encoder 1000 excludes an inter-prediction block on which motion information overlaps motion information of other inter-prediction blocks which are merging candidates, from the merging candidates.

In step S1103, the encoder 1000 adds an (virtual) inter-prediction block whose motion vector is a zero vector to a merging candidate.

Then, in step S1104, the encoder 1000 determines whether or not a slice type of target block is B.

If a slice type of target block is not B in step S1104, that is, the target block is not bi-predicted, the merging candidate choosing process finishes. In this case, a merging region is selected by using the merging candidates obtained in steps S1101 and S1103 without change.

In addition, if a slice type of target block is not B in step S1104, that is, the target block is bi-predicted, the process proceeds to step S1105 in which the encoder 1000 determines whether or not a block size of the target block corresponds to a block size in which a prediction method is changed, indicated by the disable_bip_small_mrg_idc information.

In step S1105, if it is determined that a block size of the target block does not correspond to the block size indicated by the disable_bip_small_mrg_idc information, the merging candidate choosing process finishes. Also in this case, a merging region is selected by using the merging candidates obtained in steps S1101 and S1103 without change.

In addition, in step S1105, if it is determined that a block size of the target block corresponds to the block size indicated by the disable_bip_small_mrg_idc information, the process proceeds to step S1106 in which the encoder 1000 determines whether or not the modify_bip_small_mrg_10 information has a value of 0.

In step S1106, if it is determined that the modify_bip_small_mrg_10 information does not have a value of 0, that is, the modify_bip_small_mrg_10 information has a value of 1, the process proceeds to step S1107 in which the encoder 1000 changes bi-prediction for a merging candidate for which a prediction direction is the bi-prediction to L0 prediction of uni-prediction, and finishes the merging candidate choosing process. In this case, in relation to a merging candidate for which a prediction method is bi-prediction among the merging candidates obtained in steps S1101 and S1103, the bi-prediction is changed to the L0 prediction, and, then, a merging region is selected among the merging candidates.

In addition, in step S1106, if it is determined that the modify_bip_small_mrg_10 information has a value of 0, the process proceeds to step S1108 in which the encoder 1000 changes bi-prediction for a merging candidate for which a prediction direction is the bi-prediction to L1 prediction of the uni-prediction, and finishes the merging candidate choosing process. In this case, in relation to a merging candidate for which a prediction method is bi-prediction among the merging candidates obtained in steps S1101 and S1103, the bi-prediction is changed to the L0 prediction, and, then, a merging region is selected among the merging candidates.

[Restriction Information]

Next, restriction information set by the setting unit 1021 will be described.

As described in the identification information, a maximal memory bandwidth (necessary maximal bandwidth) necessary in the MC is a bottleneck in mounting the encoder 1000 and the decoder 2000.

Therefore, in the encoder 1000, the setting unit 1021 sets restriction information, and the inter-prediction unit 1018 performs prediction (generation of a prediction image) on the basis of the restriction information, thereby allowing the necessary maximal bandwidth to be minimized.

Here, the restriction information is information for restricting an image coding (decoding) process, and includes, for example, a restriction mode RB or a restriction mode RV described below.

According to the restriction mode RB, a size of a block of an image and a prediction method applied to the block having the size are restricted, and, according to the restriction mode RV, the number of motion vectors (the number of reference blocks) used to generate a prediction image in the MC of a block of an image is restricted.

FIG. 25 is a diagram illustrating the restriction mode RB.

In FIG. 25, for example, in a case where the restriction mode RB is B4, Bi-4×4, Bi-4×8, Bi-8×4, and Uni-4×4 are prohibited.

Here, for example, Bi-4×4 indicates that bi-prediction (Bi) is applied to a PU partition having a block size of 4×4.

In addition, for example, Uni-4×4 indicates that uni-prediction (Uni) is applied to a PU partition having a block size of 4×4.

Therefore, in a case where the restriction mode RB is B4, applying bi-prediction and uni-prediction to a PU partition having a block size of 4×4 by using Bi-4×4 and Uni-4×4, and further using (inter-predicting) the PU partition having a block size of 4×4 is restricted.

In addition, in a case where the restriction mode RB is B4, applying bi-prediction to a PU partition having a block size of 4×8 by using Bi-4×8 is restricted.

Further, in a case where the restriction mode RB is B4, applying bi-prediction to a PU partition having a block size of 8×4 by using Bi-8×4 is restricted.

In the encoder 1000, the setting unit 1021 sets the restriction mode RB, for example, on the basis of a maximal value of a memory bandwidth of the DPB 1014, and supplies the set restriction mode to the inter-prediction unit 1018 and the entropy coding unit 1005.

The inter-prediction unit 1018 performs generation of a prediction image according to the restriction mode RB from the setting unit 1021.

Meanwhile, the entropy coding unit 1005 includes the restriction mode RB from the setting unit 1021 in coded data and transmits the restriction mode.

In the entropy coding unit 1005, the restriction mode RB may be included in, for example, an SPS, a PPS, an APS, a slice header, or the like of the coded data (coded stream).

In addition, the setting unit 1021 sets the restriction mode RB having a greater value B#i as a maximal value of a memory bandwidth of the DPB 1014 becomes smaller.

Here, the value B#i of the restriction mode RB being great indicates that a number #i is large.

In FIG. 25, the restriction mode RB has a decreasing necessary maximal bandwidth in the MC in an order of B1, B2, . . . , and B7.

Here, in FIG. 25, in a case where the restriction mode RB is B1, Bi-4×4 is restricted, and in a case where the restriction mode RB is B2, Bi-4×8 is restricted in addition to Bi-4×4. In a case where the restriction mode RB is B3, Bi-8×4 is restricted in addition to Bi-4×4 and Bi-4×8. As mentioned above, in a certain restriction mode RB=B#i, new restriction content is added to restriction content in the previous restriction mode B#i−1.

The new restriction content is a combination of a block size in which consumption at a memory bandwidth is the maximum at that time and a prediction method applied to a PU partition having the block size.

As described above, in FIG. 25, in a case where the restriction mode RB is B1, Bi-4×4 is restricted, and in a case where the restriction mode RB is B2, Bi-4×8 is restricted in addition to Bi-4×4. In a case where the restriction mode RB is B3, Bi-8×4 is restricted in addition to Bi-4×4 and Bi-4×8.

Therefore, prediction of Bi-4×4 (prediction of applying bi-prediction to a PU partition having a block size of 4×4) consumes the largest memory bandwidth, and prediction of Bi-4×8 consumes the second largest memory bandwidth. In addition, prediction of Bi-8×4 consumes the third largest memory bandwidth.

Here, as mentioned above, the prediction of Bi-4×8, that is, the prediction of a vertically long block (PU partition) having width×height of 4×8 pixels consumes a larger memory bandwidth than the prediction of Bi-8×4, that is, the prediction of a horizontally long block having width×height of 8×4 pixels, and the reason thereof will be described later.

As mentioned above, since the restriction mode RB has a decreasing necessary maximal bandwidth in the MC in an order of B1, B2, . . . , and B7, the restriction mode RB having a great value B#i is set by the setting unit 1021, and thus it is possible to minimize a memory bandwidth when a decoded image is read from the DPB 1014 for generation of a prediction image. As a result, it is possible to prevent an increase in a cost of the encoder 1000.

In addition, in a case where the setting unit 1021 sets the restriction mode RB having a greater value B#i as a maximal value of a memory bandwidth of the DPB 1014 becomes smaller according to FIG. 25, applying bi-prediction or uni-prediction up to a block having a larger size is restricted as a maximal value of a memory bandwidth of the DPB 1014 becomes smaller.

In the decoder 2000, the entropy decoding unit 2001 separates the restriction mode RB from the coded data, and supplies the restriction mode to the inter-prediction unit 2010.

The inter-prediction unit 2010 performs generation of a prediction image according to the restriction mode RB.

In other words, in a case where the coded data is suitable for the restriction mode RB, for example, in a case where Bi-4×4 is restricted in the restriction mode RB, and Bi-4×4 is not included in the coded data according to the restriction mode RB, the inter-prediction unit 2010 generates, for example, a prediction image.

In addition, in a case where the coded data is not suitable for the restriction mode RB, for example, in a case where Bi-4×4 is restricted in the restriction mode RB, but Bi-4×4 is included in the coded data, for example, the inter-prediction unit 2010 does not generate a prediction image and causes the decoder 2000 to stop the process.

In addition, in the encoder 1000, the setting unit 1021 may set the restriction mode RB in response to an operation performed by a user such as an operator of the encoder 1000.

In addition, in the encoder 1000, in relation to a memory bandwidth at each value, a profile or a level may be defined as a necessary maximal bandwidth according to the necessary maximal bandwidth at each value, and the restriction mode RB may be linked to the profile or the level.

Here, when a level is indicated by Lv.#i, and the necessary maximal bandwidth becomes smaller as a value #i of the level becomes greater, the level Lv.#i can be linked to, for example, the restriction mode RB=B#i.

In this case, in the encoder 1000, for example, if the level Lv.1 is set, the setting unit 1021 sets the restriction mode RB to B1 which is linked to the level Lv.1.

In addition, in the encoder 1000, coding is performed without using a combination of a block size and a prediction method, indicated by the restriction mode RB, according to the restriction mode RB, and information on the profile and the level is included in coded data so as to be transmitted.

In the decoder 2000, the information on the profile and the level can be decoded from the coded data, and, for example, the restriction mode RB linked to the level can be recognized from the level.

In addition, in the encoder 1000, the restriction mode RB can be included in the coded data so as to be transmitted, and, in the decoder 2000, the restriction mode RB included in the coded data can be decoded.

The decoder 2000 can check whether or not a combination of a block size and a prediction method, restricted by the restriction mode RB is included in the coded data.

In a case where the coded data is not suitable for the restriction mode RB, that is, in a case where a combination of a block size and a prediction method, restricted by the restriction mode RB, is included in the coded data, the decoder 2000 may inform a high-order system of the fact that the coded data is not suitable for the restriction mode RB, and the high-order system may determine how to treat the coded data.

In addition, in a case where a size of an image (picture frame) is indicated by a profile or a level, the encoder 1000 may set the restriction mode RB for restricting application of bi-prediction or uni-prediction to a block having a larger size, for example, as the size of the image indicated by the profile or the level becomes larger.

Figure 26:
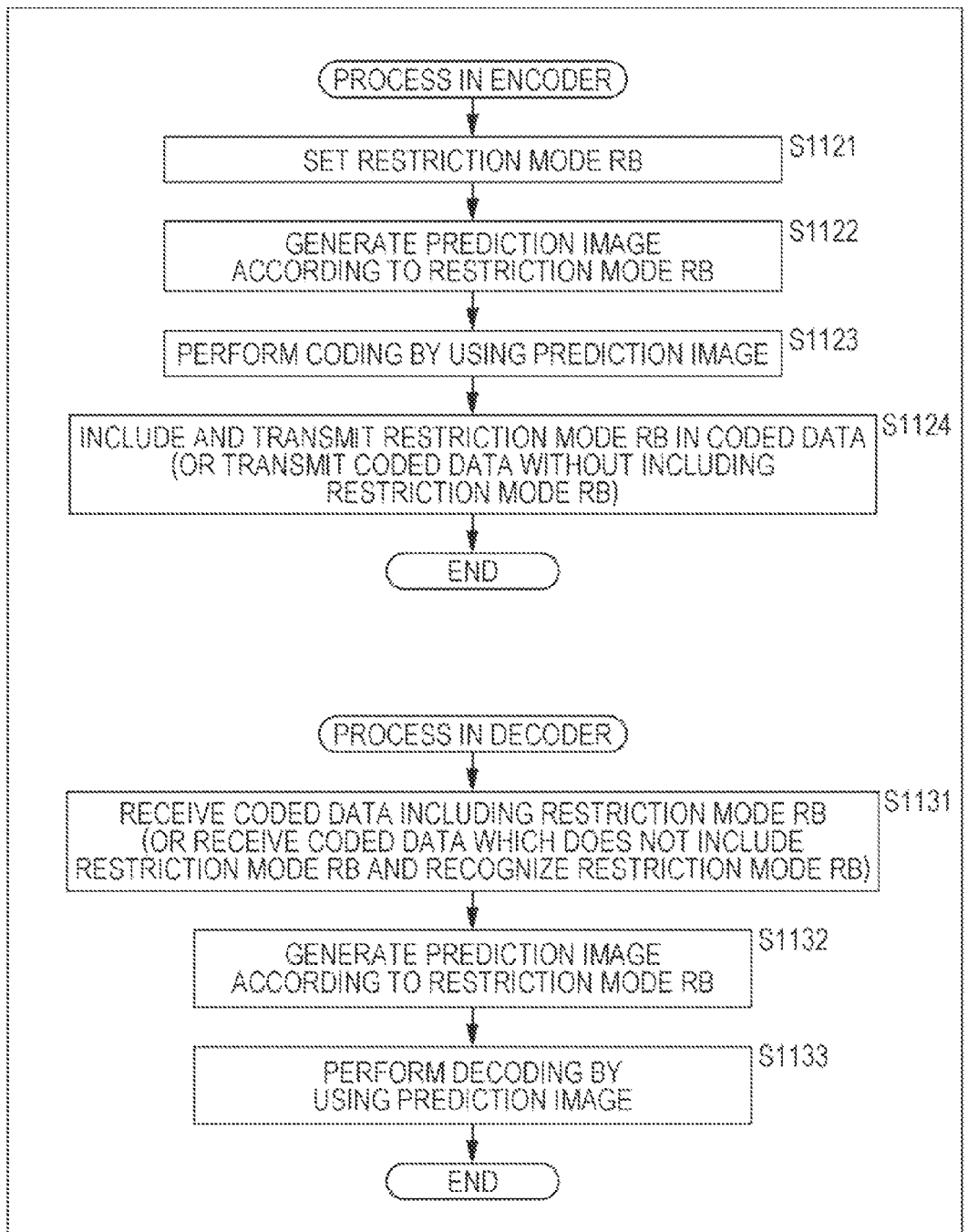
FIG. 26 is a flowchart illustrating a process performed by the encoder 1000 and the decoder 2000 when using the restriction mode RB.

FIG. 26 is a flowchart illustrating a process performed by the encoder 1000 and the decoder 2000 when the restriction mode RB is used.

In the encoder 1000, in step S1121, the setting unit 1021 sets the restriction mode RB in a target block on the basis of, for example, a maximal value of a memory bandwidth of the DPB 1014, a user's operation, a level, or the like, and supplies the set restriction mode to the inter-prediction unit 1018 and the entropy coding unit 1005.

In step S1122, the inter-prediction unit 1018 generates a prediction image while restricting a block size of a PU partition and a prediction method applied to the PU partition having the block size according to the restriction mode RB from the setting unit 1021.

In step S1123, the calculation unit 1002 to the entropy coding unit 1005 code the target block by using the prediction image generated in step S1122 as necessary, so as to generate coded data.

In step S1124, the entropy coding unit 1005 includes the restriction mode RB from the setting unit 1021 in the coded data and transmits the restriction mode.

In addition, since a profile and a level can be included in the coded data, in a case where the restriction mode RB is linked to the level (or the profile), the restriction mode RB can be recognized from information on the level included in the coded data, and thus the restriction mode RB is not required to be included in the coded data.

Therefore, in a case where the restriction mode RB is linked to the level, the coded data can be transmitted without including the restriction mode RB.

Meanwhile, in the decoder 2000, in step S1131, the entropy decoding unit 2001 receives the coded data. In addition, the entropy decoding unit 2001 separates the restriction mode RB from the coded data, and supplies the restriction mode RB to the inter-prediction unit 2010.

In addition, in a case where the restriction mode RB is linked to the level, and thus the restriction mode RB is not included in the coded data, the entropy decoding unit 2001 supplies the level included in the coded data to the inter-prediction unit 2010, and the inter-prediction unit 2010 recognizes the restriction mode RB on the basis of the level from the entropy decoding unit 2001.

In step S1132, the inter-prediction unit 2010 generates a prediction image according to the restriction mode RB.

In other words, the inter-prediction unit 1018 generates a prediction image while checking whether or not the coded data is suitable for the restriction mode RB, that is, checking whether or not a combination of a block size and a prediction method, restricted by the restriction mode RB, is included in the coded data.

In addition, in a case where the coded data is not suitable for the restriction mode RB, the decoder 2000 informs a high-order system of the fact.

On the other hand, in a case where the coded data is suitable for the restriction mode RB, in step S1133, the entropy decoding unit 2001 to the calculation unit 2004 decode the coded data received in step S1131 by using the prediction image generated in step S1132 as necessary.

Figure 27:
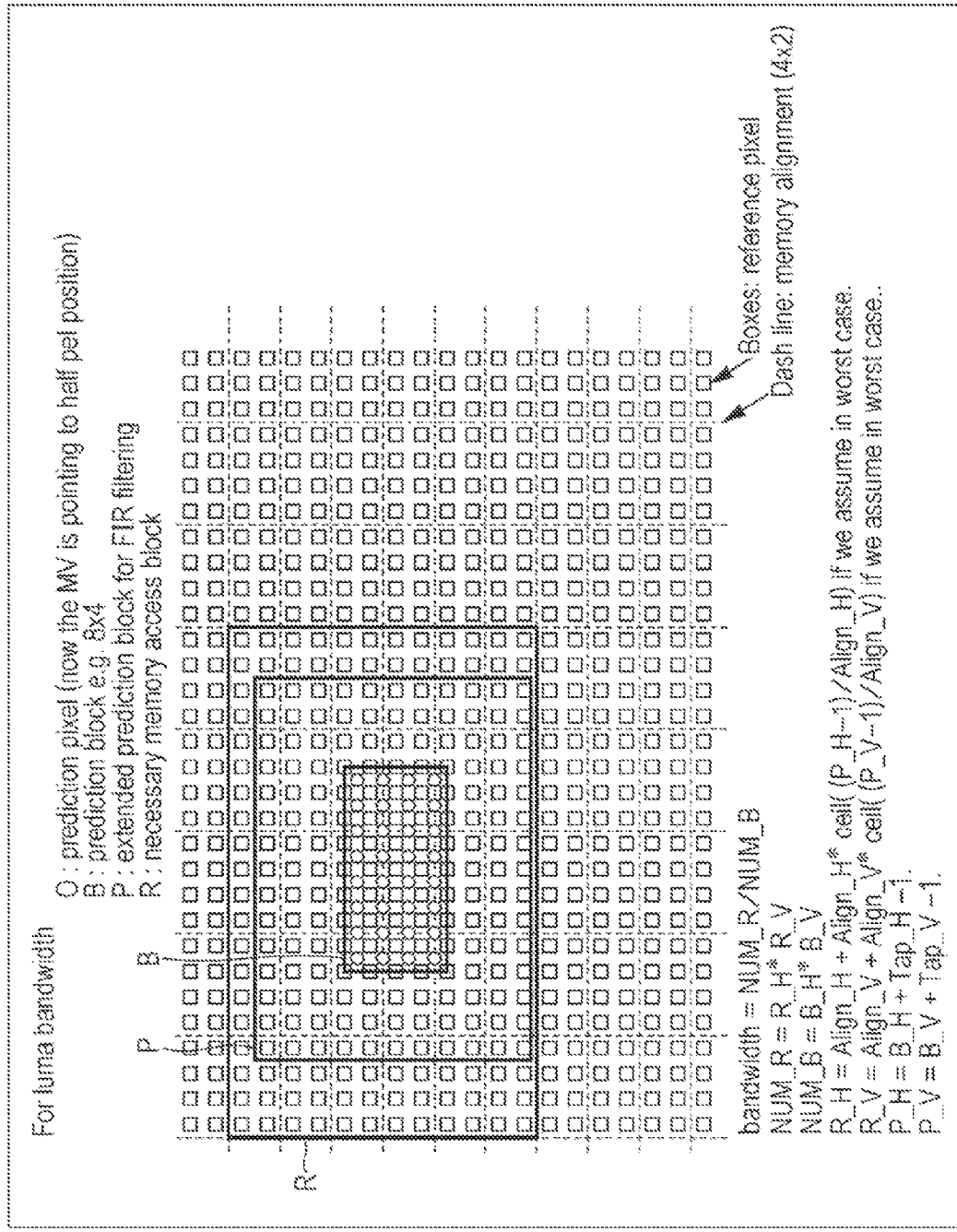
FIG. 27 is a diagram illustrating that prediction of a vertically long block consumes a memory bandwidth more than prediction of a horizontally long block.
Figure 28:
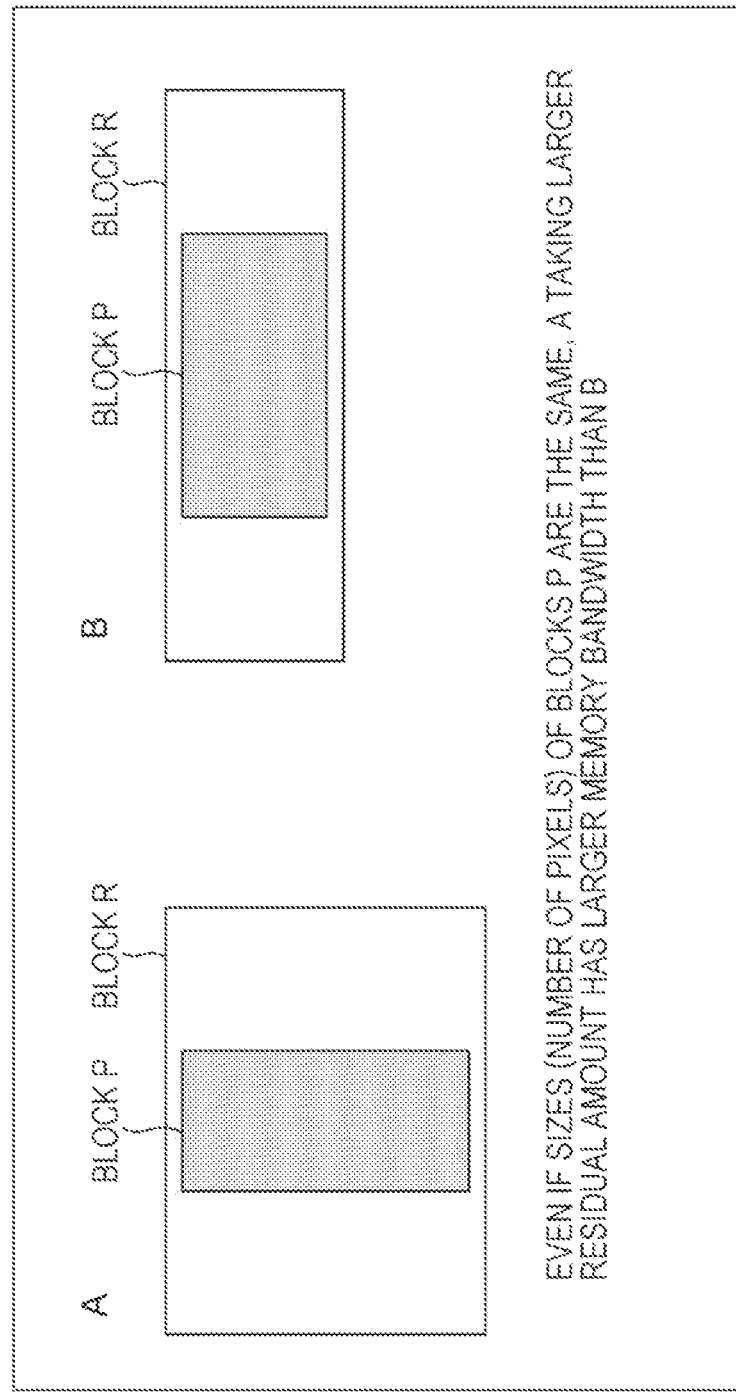
FIG. 28 is a diagram illustrating that prediction of a vertically long block consumes a memory bandwidth more than prediction of a horizontally long block.

FIGS. 27 and 28 are diagrams illustrating that, even in blocks having the same size (the number of pixels), prediction of a vertically long block such as 4×8 consumes a larger memory bandwidth than prediction of a horizontally long block such as 8×4.

In a case where pixels of a decoded image (picture) stored in a memory are read from the memory such as the DPB 1014, 64 bits or 128 bits become a bus width (data transmission path width) unit.

If one pixel is formed by 8 bits, eight pixels are simultaneously read in parallel in a bus width of 64 bits, and sixteen pixels are simultaneously read in parallel in a bus width of 128 bits.

In general mounting, a horizontally long rectangular block is employed as a minimal unit of pixel groups which are simultaneously read from a memory, due to experimental convenience or the like.

For example, in FIG. 27, pixels (values) are read for each block having width×height of 4×2 pixels, partitioned by the dash lines.

Here, the minimal unit of pixel groups which are simultaneously read from the memory is referred to as a minimal block.

In addition, in FIG. 27, the square (mark) indicates one pixel (data thereof) stored in the memory, and the circle (O mark) indicates a position of a pixel of a prediction image. In FIG. 27, the prediction image is an image which deviates by ½ pixel in each of horizontal direction and vertical direction from a pixel of an image (reference image) stored in the memory.

In addition, a block B indicates a block of pixels of the prediction image, and is a block of 8×4 pixels in FIG. 27.

A block P indicates a block of pixels of a reference image to which a finite impulse response (FIR) filter as an interpolation filter is applied when a prediction image is generated from the reference image, and is a block which is obtained by extending the block B of the prediction image (hereinafter, referred to as a prediction block).

In FIG. 27, the block P is a block of 15×11 pixels. In the inter-prediction units 1018 and 2010, an interpolation filter is applied to the pixels of the block P, and thus the prediction image of the block B is generated.

A block R is a block of pixels which are required to be read from the memory when the pixels of the block P are read from the memory, and is a block formed by 5×6 minimal blocks in width×height, that is, a block of 20×12 pixels in FIG. 27.

Here, when the number of pixels of the block (hereinafter, also referred to as a reading necessary block) R which are required to be read when the pixels of the block P are read from the memory is denoted by NUM_R, and the number of pixels of the prediction block B is denoted by NUM_B, a memory bandwidth is expressed by, for example, Equation (1).

$$\text{bandwidth} = \text{NUM\_}R/\text{NUM\_}B \quad (1)$$

The number NUM_B of pixels of the prediction block B is expressed by Equation (2) when the number of horizontal pixels and the number of vertical pixels are respectively denoted by B_H and B_V.

$$\text{NUM\_}B = B\_H \times B\_V \quad (2)$$

In FIG. 27, B_H×B_V is 8×4 pixels.

The number NUM_R of pixels of the reading necessary block R is expressed by Equation (3) when the number of horizontal pixels and the number of vertical pixels are respectively denoted by R_H and R_V.

$$\text{NUM\_}R = R\_H \times R\_V \quad (3)$$

Here, when the number of horizontal pixels and the number of vertical pixels of the minimal block are respectively denoted by Align_H and Align_V, the number R_H of horizontal pixels and the number R_V of vertical pixels of the reading necessary block R are expressed by Equations (4) and (5) in the worst case.

$$R\_H = \text{Align\_}H + \text{Align\_}H \times \text{ceil}((P\_H-1)/\text{Align\_}H) \quad (4)$$

$$R\_V = \text{Align\_}V + \text{Align\_}V \times \text{ceil}((P\_V-1)/\text{Align\_}V) \quad (5)$$

In addition, in Equations (4) and (5), ceil(x) indicates a minimal integer which is equal to or greater than x. Further, P_H and P_V respectively indicate the number of horizontal pixels and the number of vertical pixels of the block P to which the interpolation filter is applied, and are respectively expressed by Equations (6) and (7).

$$P\_H = B\_H + \text{Tap}\_H - 1 \qquad (6)$$

$$P\_V = B\_V + \text{Tap}\_V - 1 \qquad (7)$$

In Equations (6) and (7), Tap_H and Tap_V respectively indicate the number of horizontal taps and the number of vertical taps of an FIR filter as the interpolation filter.

In a case where the minimal block is formed by a plurality of pixels, pixels which are unnecessary in inter-prediction may be read from the memory, but the unnecessary pixels are discarded after read from the memory.

In a case where the minimal block has a horizontally long rectangular shape, more residual pixels are read at left and right parts of the reading necessary block R which are read from the memory than at upper and lower parts thereof.

As in a vertically long block such as 4×8 and a horizontally long block such as 8×4, the number of pixels is the same, but, in relation to the prediction block B having a different shape, the prediction block B which includes the most pixels which are unnecessary in inter-prediction in pixels which are read for generation of a prediction image from the memory is a block which consumes the largest memory bandwidth.

In a case where the minimal block has a horizontally long rectangular shape, as illustrated in FIG. 28, when the pixels of the reading necessary block R including the extended block P (a block to which the interpolation filter is applied) of the prediction block B are read, more pixels which are unnecessary in inter-prediction (filtering with the interpolation filter) are included when the prediction block B has a vertically long rectangular shape (A of FIG. 28) than when the prediction block B has a horizontally long rectangular shape (B of FIG. 28).

For this reason, the vertically long prediction block B such as 4×8 and the horizontally long prediction block B such as 8×4 have the same number of pixels, but prediction of the vertically long prediction block B consumes a larger memory bandwidth than prediction of the horizontally long prediction block B.

FIG. 29 is a diagram illustrating the restriction mode RV.

As described above, according to the restriction mode RV, the number of motion vectors (the number of reference blocks) used to generate a prediction image in the MC (ME) of a block of an image is restricted.

In FIG. 29, the restriction mode RV=V#i can take three values including V1, V2, and V3, and the number of motion vectors is restricted depending on a frame rate (Frame rate) and a size of an LCU (LCU size).

For example, in a case where a frame rate is a value in a range expressed by an expression 0<rate<=30, and a size of an LCU is 16×16 pixels, when the restriction mode RV is set to the value V1, the number of motion vectors which can be used in the MC is restricted to 32.

Here, in the restriction mode RV, instead of the number of motion vectors, the number of reference blocks read from the DPB 1014 (DPB 2008) may be restricted.

According to FIG. 29, the number of reference blocks or a maximal value of the number of motion vectors is restricted by the frame rate and the size of an LCU.

For example, if the frame rate increases, the necessary maximal bandwidth also increases, and thus the number of reference blocks or the number of motion vectors is reduced in proportion to the frame rate according to FIG. 29.

In the encoder 1000, the setting unit 1021 sets the restriction mode RV on the basis of, for example, a maximal value of a memory bandwidth of the DPB 1014 as well as the frame rate and the size of an LCU, and supplies the set restriction mode RV to the inter-prediction unit 1018 and the entropy coding unit 1005.

The inter-prediction unit 1018 performs generation of a prediction image according to the restriction mode RV from the setting unit 1021.

Meanwhile, the entropy coding unit 1005 includes the restriction mode RV from the setting unit 1021 in coded data and transmits the restriction mode.

In the entropy coding unit 1005, the restriction mode RV may be included in, for example, an SPS, a PPS, an APS, a slice header, or the like of the coded data.

In addition, the setting unit 1021 sets the restriction mode RV having a greater value V#i as a maximal value of a memory bandwidth of the DPB 1014 becomes smaller.

Here, the value V#i of the restriction mode RV being great indicates that a number #i is large.

The restriction mode RV has a decreasing necessary maximal bandwidth in the MC in an order of V1, V2, and V3.

The restriction mode RV having a great value V#i is set by the setting unit 1021, and thus it is possible to minimize a memory bandwidth when a decoded image is read from the DPB 1014 for generation of a prediction image. As a result, it is possible to prevent an increase in a cost of the encoder 1000.

In the decoder 2000, the entropy decoding unit 2001 separates the restriction mode RV from the coded data, and supplies the restriction mode to the inter-prediction unit 2010.

The inter-prediction unit 2010 performs generation of a prediction image according to the restriction mode RV.

In other words, in a case where the coded data is suitable for the restriction mode RV, for example, in a case where the number of motion vectors is restricted to two in the restriction mode RV, and a block for which a prediction image is generated by using motion vectors exceeding two is not included in the coded data, the inter-prediction unit 2010 generates, for example, a prediction image.

In addition, in a case where the coded data is not suitable for the restriction mode RV, for example, in a case where the number of motion vectors is restricted to two in the restriction mode RV, but a block for which a prediction image is generated by using motion vectors exceeding two is included in the coded data, the inter-prediction unit 2010 performs the same process as in the above-described case where the coded data is not suitable for the restriction mode RB.

In addition, in the encoder 1000, the setting unit 1021 may set the restriction mode RV in response to an operation performed by a user such as an operator of the encoder 1000.

In addition, in the encoder 1000, in relation to maximal value of a memory bandwidth of the DPB 1014, a profile or a level may be defined as a necessary maximal bandwidth according to a restriction amount of the necessary maximal bandwidth, and the restriction mode RV may be linked to the profile or the level.

Here, when the necessary maximal bandwidth becomes smaller as a value #i of the level Lv.#i becomes greater, the level Lv.#i can be linked to, for example, the restriction mode RV=V#i.

In this case, in the encoder 1000, for example, if the level Lv.1 is set, the setting unit 1021 sets the restriction mode RV to V1 which is linked to the level Lv.1.

In addition, in the encoder 1000, coding is performed by restricting the number of motion vectors to the number (or less) indicated by the restriction mode RV, according to the restriction mode RV, and information (level_idc or the like) on the profile and the level is included in coded data so as to be transmitted.

In the decoder 2000, the information on the profile and the level can be decoded from the coded data, and, for example, the restriction mode RV linked to the level can be recognized from the level.

In addition, in the encoder 1000, the restriction mode RV can be included in the coded data so as to be transmitted, and, in the decoder 2000, the restriction mode RV included in the coded data can be decoded.

In a case where the coded data is not suitable for the restriction mode RV, the decoder 2000 informs a high-order system of the fact that the coded data is not suitable for the restriction mode RV. The high-order system determines how to treat the coded data.

In addition, a size of an image (picture frame) may be indicated by a profile or a level. For example, in a case where the size of an image is indicated by the level, when the greater of a value of the level is, the larger the size of an image is, the level Lv.#i is linked to the restriction mode RV=V#i, and, thus, for example, as the size of an image indicated by the level becomes larger, the encoder 1000 restricts the number of motion vectors to a smaller number, thereby reducing a memory bandwidth.

In a case where the level (or the profile) is linked to the restriction mode RV, in the same manner as in a case where the level is linked to the restriction mode RB, the restriction mode RV can be recognized from the level, and, thus, in the encoder 1000, the restriction mode RV may not be included in the coded data.

Here, if an LCU size increases, since the number of LCUs per picture decreases, the number of reference blocks or MVs which can be used by a single LCU as the number of LCUs decreases.

In addition, if an image size increases, for example, since the number of LCUs with a predetermined LCU size increases in a single picture, the number of reference block or MVs which can be used by a single LCU decreases as the number of LCUs increases.

Further, as described above, in a case where the number of reference blocks (or motion vectors) is reduced in proportion to a frame rate, in FIG. 29, if it is used as a reference that the number of reference blocks is two when a frame rate is 0<rate<=30, an LCU size is 8×8, and the restriction mode RV is V3, the number of reference blocks is restricted to one (=2×½) when a frame rate is 30<rate<=60, an LCU size is 8×8, and the restriction mode RV is V3. The number of reference blocks is restricted to 0.5 (=2×½×½) when a frame rate is 0<rate<=30, an LCU size is 8×8, and the restriction mode RV is V3.

However, since an non-integer such as 0.5 as the number of reference blocks is not appropriate, in FIG. 29, the number of reference blocks which is 0.5 on calculation is rounded up to 1 which is a minimal value of values taken as the number of (one or more) reference blocks.

As mentioned above, in a case where the number of reference blocks is rounded up, the DPB 1014 of the encoder 1000 and the DPB 2008 of the decoder 2000 are required to be mounted so as to read reference blocks of the rounded-up number.

In addition, the restriction modes RB and RV may be used together. Further, the identification information and the restriction information may be used together.

Furthermore, although, in the restriction mode RV of FIG. 29, the number of motion vectors or reference blocks used in an LCU is restricted depending on an LCU size, the number of motion vectors or reference blocks may be restricted depending on a size of a region in a region unit such as a PU, a TU, an SCU, or a picture, as well as the LCU. However, if a region for which the number of motion vectors or the like is restricted is set to a too wide region, many motion vectors are assigned to a part of the wide region, and, as a result, motion vectors assigned to other parts may be considerably restricted. In addition, if a region for which the number of motion vectors or the like is restricted is set to a too narrow region, the number of motion vectors assigned to the narrow region is originally small, and thus a degree of freedom of restricting the number of motion vectors decreases. Therefore, a region for which the number of motion vectors is restricted is preferably a region having a proper size such as an LCU, in consideration of the above facts.

[First Example of Syntax of Header Information Including Identification Information]

FIG. 30 is a diagram illustrating a first example of syntax of header information of coded data, including identification information.

In other words, FIG. 30 illustrates syntax of header information seq_parameter_set_rbsp( ), and a flag disable_bip_small_mrg_idc as identification information is included in the header information seq_parameter_set_rbsp( ).

The flag disable_bip_small_mrg_idc of FIG. 30 indicates a size of a block (prediction block) for which bi-prediction is prohibited.

FIG. 31 is a diagram illustrating a value taken by the flag disable_bip_small_mrg_idc as identification information of FIG. 30 and a size of a block for which bi-prediction is prohibited by the flag disable_bip_small_mrg_idc at each value.

In FIG. 31, the flag disable_bip_small_mrg_idc can take values including 0, 1, 2, and 3.

In a case where a value of the flag disable_bip_small_mrg_idc is 0, bi-prediction is not prohibited.

In a case where a value of the flag disable_bip_small_mrg_idc is 1, bi-prediction is prohibited for a block of 4×4 (a block having a block size of 4×4).

In a case where a value of the flag disable_bip_small_mrg_idc is 2, bi-prediction is prohibited for three types of blocks of 4×4, 8×4, and 4×8, and, in a case where a value of the flag disable_bip_small_mrg_idc is 3, bi-prediction is prohibited for four types of blocks of 4×4, 8×4, 4×8, and 8×8.

In addition, for example, the flag disable_bip_small_mrg_idc as identification information of FIG. 30 is set by the setting unit 1021 of the image processing apparatus of FIG. 16, so as to be used for inter-prediction by the inter-prediction unit 1018 and be included in coded data by the entropy coding unit 1005.

Further, for example, the flag disable_bip_small_mrg_idc as identification information of FIG. 30 is separated from coded data by the entropy decoding unit 2001 of the image processing apparatus of FIG. 16 and is used for inter-prediction by the inter-prediction unit 2010.

[Second Example of Syntax of Header Information Including Identification Information]

FIGS. 32 and 33 are diagrams illustrating a second example of syntax of header information of coded data, including identification information.

In other words, FIG. 32 illustrates syntax of header information seq_parameter_set_rbsp( ), and flags disable_inter_4×8_8×4_8×8_bidir_flag and disable_inter_4×

8_8×4 bidir_flag as identification information are included in the header information seq_parameter_set_rbsp( ).

In FIG. 32, the flag disable_inter_4×8_8×4_8× 8_bidir_flag as identification information indicates whether or not bi-prediction can be applied to three types of blocks of 4×8, 8×4, and 8×8.

For example, in a case where a value of the flag disable_inter_4×8_8×4_8×8_bidir_flag is 0, bi-prediction is not prohibited for three types of blocks of 4×8, 8×4, and 8×8, and, in a case where a value of the flag disable_inter_4× 8_8×4_8×8_bidir_flag is 1, bi-prediction is prohibited for three types of blocks of 4×8, 8×4, and 8×8.

In addition, in FIG. 32, the flag disable_inter 4×8_8× 4_bidir_flag as identification information indicates whether or not bi-prediction can be applied to two types of blocks of 4×8 and 8×4.

For example, in a case where a value of the flag disable_inter_4×8_8×4_bidir_flag is 0, bi-prediction is not prohibited for two types of blocks of 4×8 and 8×4, and, in a case where a value of the flag disable_inter_4×8_8×4_bidir_flag is 1, bi-prediction is prohibited for two types of blocks of 4×8 and 8×4.

Therefore, in a case where a value of the flag disable_inter_4×8_8×4_8×8_bidir_flag is 1, when a target block is a block of 4×8, 8×4, or 8×8, a prediction method of a merging candidate to which bi-prediction is applied is replaced so that uni-prediction is applied instead of the bi-prediction, and a process in the merge mode is performed on the target block.

In addition, in a case where a value of the flag disable_inter_4×8_8×4_bidir_flag is 1, when a target block is a block of 4×8 or 8×4, a prediction method of a merging candidate to which bi-prediction is applied is replaced so that uni-prediction is applied instead of the bi-prediction, and a process in the merge mode is performed on the target block.

In FIG. 32, the flag disable_inter_4×8_8×4_8× 8_bidir_flag is included in the header information seq_parameter_set_rbsp( ) in a case where a value of a flag log 2_min_coding_block_size_minus3 is equal to or smaller than 1. In addition, the flag disable_inter_4×8_8× 4_bidir_flag is included in the header information seq_parameter_set_rbsp( ) in a case where a value of the flag log 2_min_coding_block_size_minus3 is 0 and a value of the flag disable_inter_4×8_8×4_8×8_bidir_flag is 0.

Here, the flag log 2_min_coding_block_size_minus3 indicates a minimal size of a CU (coding block).

In a case where a minimal size of a CU indicated by the flag log 2_min_coding_block_size_minus3 is a size (32×32 or 64×64) larger than 16×16, as a PU which is a target block, a block having a size of 16×16 (or a larger size) is used, and a block having a size of 8×8 (or a smaller size) is not used.

Therefore, in a case where a minimal size of a CU indicated by the flag log 2_min_coding_block_size_minus3 is a size larger than 16×16, since the flags disable_inter_4× 8_8×4_8×8_bidir_flag and flag disable_inter_4×8_8× 4_bidir_flag have no meaning as identification information, the entropy decoding unit 2001 (FIG. 16) does not read (disregard) the flags even if the flags are included in coded data.

In addition, in a case where the flag disable_inter_4×8_8× 4_8×8_bidir_flag is not included in the header information seq_parameter_set_rbsp( ), a value of the flag disable_inter_4×8_8×4_8×8_bidir_flag is estimated to be 0.

Further, in a case where the flag disable_inter_4×8_8× 4_bidir_flag is not included in the header information seq_parameter_set_rbsp( ), if a value of the flag disable_inter_4× 8_8×4_8×8_bidir_flag is 0, a value of the flag disable_inter_4×8_8×4_bidir_flag is also estimated to be 0, and if a value of the flag disable_inter_4×8_8×4_8×8_bidir_flag is 1, a value of the flag disable_inter_4×8_8×4_bidir_flag is also estimated to be 1.

FIG. 33 illustrates syntax of header information prediction_unit(x0,y0,log 2CbSize), and a flag disable_bidir as identification information is included in the header information prediction_unit(x0,y0,log 2CbSize).

The flag disable_bidir as identification information is set to a value of 0 or 1 depending on the flags disable_inter_4× 8_8×4_8×8_bidir_flag and disable_inter_4×8_8× 4_bidir_flag as identification information of FIG. 32.

In a case where a value of the flag disable_bidir is 0, bi-prediction is not prohibited, and, in a case where a value of the flag disable_bidir is 1, bi-prediction is prohibited.

In FIG. 33, a flag inter_pred_flag[x0][y0] which is described after the flag disable_bidir indicates whether a prediction method of a block at a position indicated by x0 and y0 is uni-prediction or bi-prediction, but in a case where a value of the flag disable_bidir is 1, and bi-prediction is prohibited, the entropy decoding unit 2001 (FIG. 16) does not read the flag inter_pred_flag[x0][y0] from coded data, and a prediction method of the block at the position indicated by x0 and y0 is interpreted as uni-prediction.

In addition, for example, the flags disable_inter_4×8_8× 4_8×8_bidir_flag and disable_inter_4×8_8×4_bidir_flag as identification information of FIG. 32, and the flag disable_bidir as identification information of FIG. 33 are set by the setting unit 1021 of the image processing apparatus of FIG. 16 so as to be used for inter-prediction by the inter-prediction unit 1018 and be included in coded data by the entropy coding unit 1005.

Further, for example, the flags disable_inter_4×8_8×4_8× 8_bidir_flag and disable_inter_4×8_8×4 bidir_flag as identification information of FIG. 32, and the flag disable_bidir as identification information of FIG. 33 are separated from coded data by the entropy decoding unit 2001 of the image processing apparatus of FIG. 16 so as to be used for inter-prediction by the inter-prediction unit 2010.

Here, for example, the flags disable_inter_4×8_8×4_8× 8_bidir_flag and disable_inter_4×8_8×4_bidir_flag as identification information of FIG. 32, and the flag disable_bidir as identification information of FIG. 33 may also be employed in a case of performing inter-prediction in modes other than the merge mode in cases other than a case of performing the merge mode.

Further, information indicating whether or not bi-prediction can be applied to a block of 4×4 among blocks having a size equal to or smaller than 8×8 is not included in the flags disable_inter_4×8_8×4_8×8_bidir_flag and disable_inter_4×8_8×4_bidir_flag as identification information included in the header information seq_parameter_set_rbsp ( ) of FIG. 32. This is because a flag inter_4×4_enabled_flag is present in the header information seq_parameter_set_rbsp( ) at the present time.

In other words, at the present time, the flag inter_4× 4_enabled_flag indicating whether or not a block of 4×4 is used is defined in the header information seq_parameter_set_rbsp( ) illustrated in FIG. 30, and treating of the block of 4×4 follows the flag inter_4×4_enabled_flag. Therefore, in FIG. 32, a flag indicating whether or not bi-prediction can be applied to the block of 4×4 is not defined.

Thus, for example, in a case where the flag inter_4×4 enabled_flag is deleted in the future, a flag indicating whether or not bi-prediction can be applied to a block of 4×4 or a block having a block size of 4×4 or a larger block size may be defined and be included in the header information seq_parameter_set_rbsp( ) of FIG. 32 instead of the flags disable_inter_4×8_8×4_8×8_bidir_flag and disable_inter_4×8_8×4_bidir_flag (or along with the flags disable_inter_4×8_8×4_8×8_bidir_flag and disable_inter_4×8_8×4 bidir_flag) which do not include information on the block of 4×4.

In addition, the present technology is applicable to an image coding device and an image decoding device which are used when image information (bit stream) which has been compressed through orthogonal transform such as discrete cosine transform and motion compensation, such as, for example, MPEG or H.26x, is received via a network medium such as satellite broadcast, a cable television, the Internet, or a mobile phone. Further, the present technology is applicable to an image coding device and an image decoding device which are used when a process is performed on storage media such as an optical disc, a magnetic disk, and a flash memory. Furthermore, the present technology is also applicable to a motion prediction compensation device included in the image coding device and the image decoding device.

[Personal Computer]

The above-described series of processes may be performed by hardware or software. When the series of processes is performed by the software, programs constituting the software are installed in a computer. Here, the computer includes a computer incorporated into dedicated hardware, or a general purpose personal computer or the like which can execute various kinds of functions by installing various kinds of programs.

Figure 34:
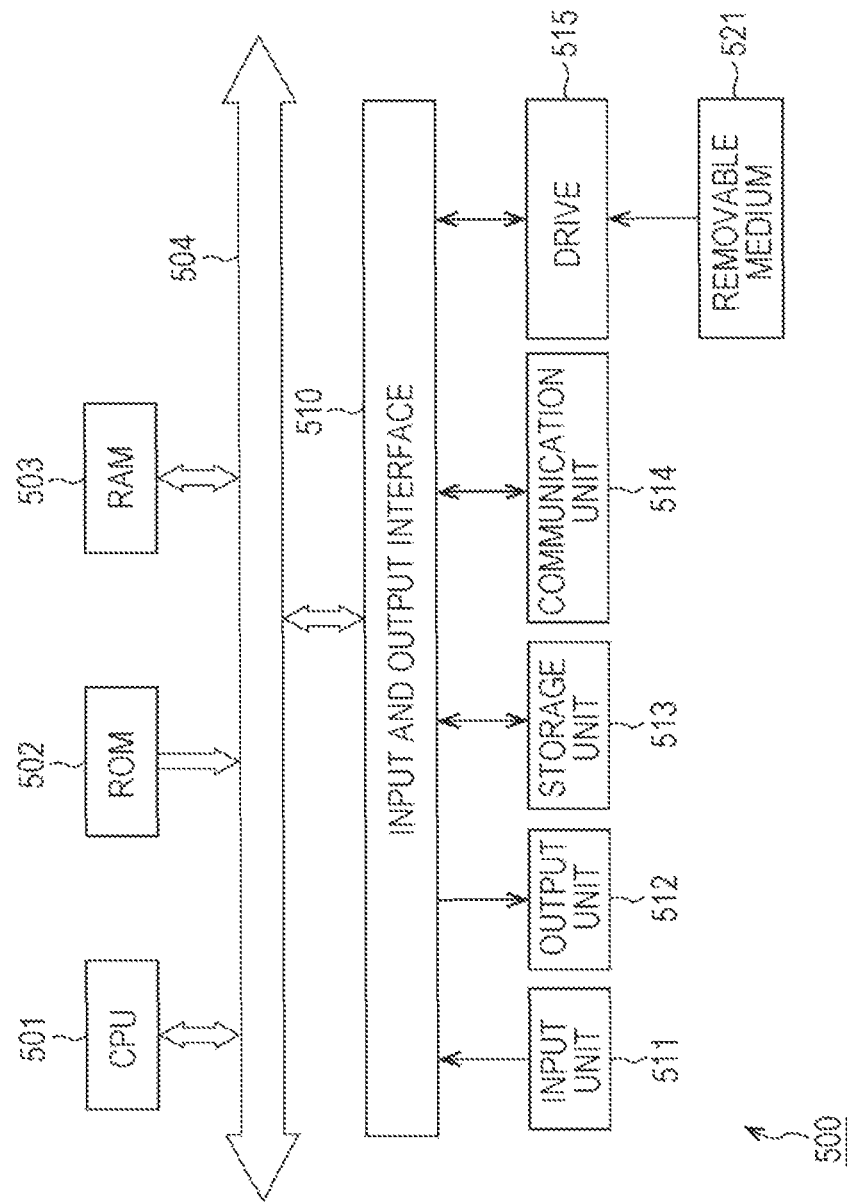
FIG. 34 is a block diagram illustrating a main configuration example of a personal computer.

In FIG. 34, a CPU (Central Processing Unit) 501 of the personal computer 500 performs various processes according to a program stored in a read only memory (ROM) 502 or a program which is loaded to a random access memory (RAM) 503 from a storage unit 513. The RAM 503 stores data or the like which is necessary for the CPU 501 to execute various processes.

The CPU 501, the ROM 502, and the RAM 503 are connected to each other via a bus 504. In addition, an input and output interface 510 is also connected to the bus 504.

The input and output interface 510 is connected to an input unit 511 including a keyboard, a mouse, and the like, an output unit 512 including a display such as a cathode ray tube (CRT) or a liquid crystal display (LCD), a speaker, and the like, a storage unit 513 including a hard disk, or the like, and a communication unit 514 including a modem, or the like. The communication unit 514 performs a communication process via a network including the Internet.

A drive 515 is connected to the input and output interface 510 as necessary, a removable medium 521 such as a magnetic disk, an optical disc, a magneto-optical disc, or a semiconductor memory, is installed therein as appropriate, and a computer program read therefrom is installed in the storage unit 513 as necessary.

In a case where the above-described series of processes is executed in software, a program constituting the software is installed from a network or a recording medium.

The recording medium includes, for example, as illustrated in FIG. 34, not only the removable medium 521 such as a magnetic disk (including a floppy disk), an optical disc (including a compact disc-read only memory (CD-ROM) and a digital versatile disc (DVD)), a magneto-optical disc (including a mini disc (MD)), or a semiconductor memory, which is distributed so as to deliver a program to a user separately from a device body and records the program therein, but also the ROM 502 which is sent to a user in a state of being incorporated into a device body in advance and records a program therein, or a hard disk included in the storage unit 513.

In addition, the program executed by the computer may be a program which performs processes in a time series according to the order described in the present specification, and may be a program which performs processes in parallel or at a necessary timing such as when accessed.

Further, in the present specification, the steps for describing programs recorded on a recording medium include not only processes performed in a time series according to the described order, but also processes performed in parallel or separately even if not necessarily performed in the time series.

In addition, in the present specification, the system refers to the entire apparatus including a plurality of devices.

Further, in the above description, a configuration described as a single device (or a processing unit) may be divided into and formed by a plurality of devices (or processing units). Conversely, in the above description, configurations described as a plurality of devices (or processing units) may be formed by a single device (or a processing unit) altogether. In addition, configurations other than those described above may be added to the configuration of each device (or each processing unit). Further, a part of the configuration of one device (or a processing unit) may be included in the configuration of another device (or another processing unit) as long as the configuration and operations of the overall system are substantially the same. In addition, the present technology is not limited to the above-described embodiments but may have various modifications without departing from the scope of the present technology.

The image processing apparatus according to the above-described embodiment is applicable to various electronic apparatuses such as a transmitter or a receiver in delivery on satellite broadcasting, cable broadcasting such as cable TV, and the Internet, and delivery to a terminal by cellular communication, a recording apparatus which records images on media such as an optical disc, a magnetic disk, and a flash memory, and a reproduction apparatus which reproduces images from the storage media. Hereinafter, four application examples will be described.

First Application Example: Television Receiver

Figure 35:
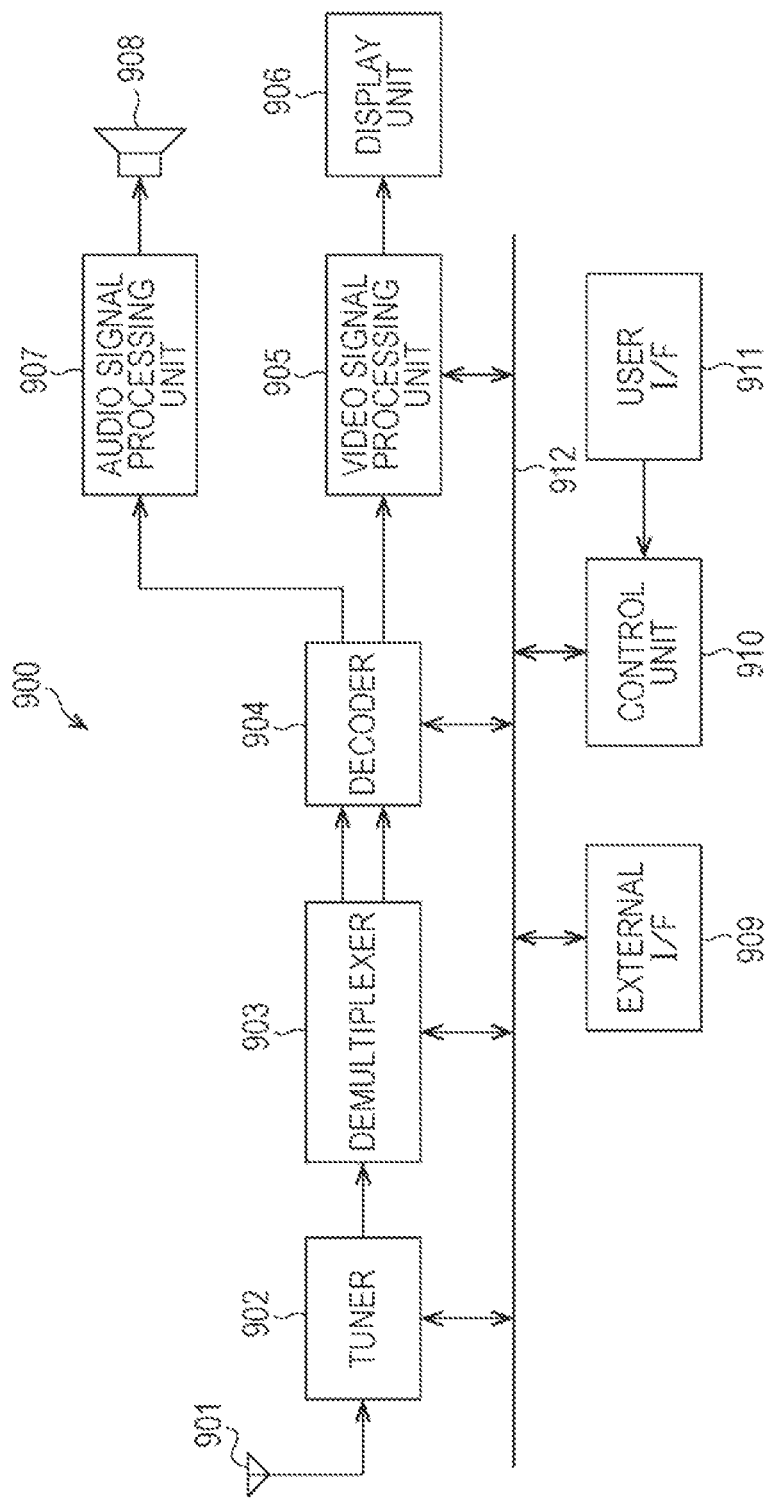
FIG. 35 is a block diagram illustrating an example of a schematic configuration of a television apparatus.

FIG. 35 illustrates an example of a schematic configuration of a television apparatus to which the above-described embodiment is applied. The television apparatus 900 includes an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal of a desired channel from a broadcast signal which is received via the antenna 901, and demodulates the extracted signal. In addition, the tuner 902 outputs a coded stream which is obtained through demodulation, to the demultiplexer 903. In other words, the tuner 902 functions as transmission means in the television apparatus 900, for receiving the coded stream in which an image is coded.

The demultiplexer 903 demultiplexes an image (video) stream and an audio stream of a viewing target program from the coded stream, and outputs the separated streams to the decoder 904. In addition, the demultiplexer 903 extracts auxiliary data such as electronic program guide (EPG) from the coded stream, and supplies the extracted data to the control unit 910. Further, the demultiplexer 903 may perform descrambling when the coded stream is scrambled.

The decoder 904 decodes the image stream and the audio stream which are input from the demultiplexer 903. In addition, the decoder 904 outputs image data which is generated due to the decoding process, to the video signal processing unit 905. Further, the decoder 904 outputs audio data which is generated due to the decoding process, to the audio signal processing unit 907.

The video signal processing unit 905 reproduces the image data input from the decoder 904 so that an image is displayed on the display unit 906. In addition, the video signal processing unit 905 may display an application screen which is supplied via a network, on the display unit 906. Further, the video signal processing unit 905 may perform an additional process such as, for example, noise removal, on the image data, in accordance with settings thereof. Furthermore, the video signal processing unit 905 may generate a graphical user interface (GUI) image such as, for example, a menu, a button, or a cursor, and may superimpose the generated image on the output image.

The display unit 906 is driven by a driving signal which is supplied from the video signal processing unit 905, and displays an image on a screen of a display device (for example, a liquid crystal display, a plasma display, or an organic electroluminescence display (OLED)).

The audio signal processing unit 907 performs reproduction processes such as D/A conversion and amplification on the audio data which is input from the decoder 904, so as to allow sound to be output from the speaker 908. In addition, the audio signal processing unit 907 may perform an additional process such as noise removal on the audio data.

The external interface 909 is an interface which connects the television apparatus 900 to an external apparatus or the network. For example, an image stream or an audio stream which is received via the external interface 909 may be decoded by the decoder 904. In other words, the external interface 909 also functions as transmission means in the television apparatus 900, for receiving a coded stream in which an image is coded.

The control unit 910 includes a processor such as a CPU, and memories such as a RAM and a ROM. The memories store a program executed by the CPU, program data, EPG data, data acquired via the network, and the like. The program stored in the memories is read and executed by the CPU, for example, when the television apparatus 900 is started. The CPU executes the program, and thus controls an operation of the television apparatus 900 in response to, for example, an operation signal which is input from the user interface 911.

The user interface 911 is connected to the control unit 910. The user interface 911 includes, for example, buttons and switches which allow a user to operate the television apparatus 900, a reception unit of a remote control signal, and the like. The user interface 911 generates an operation signal by detecting an operation performed by a user via these constituent elements, and outputs the generated operation signal to the control unit 910.

The bus 912 connects the tuner 902, the demultiplexer 903, the decoder 904, the video signal processing unit 905, the audio signal processing unit 907, the external interface 909, and the control unit 910, to each other.

In the television apparatus 900 with the above configuration, the decoder 904 has a function of the decoder 2000 according to the above-described embodiment.

Second Application Example: Mobile Phone

Figure 36:
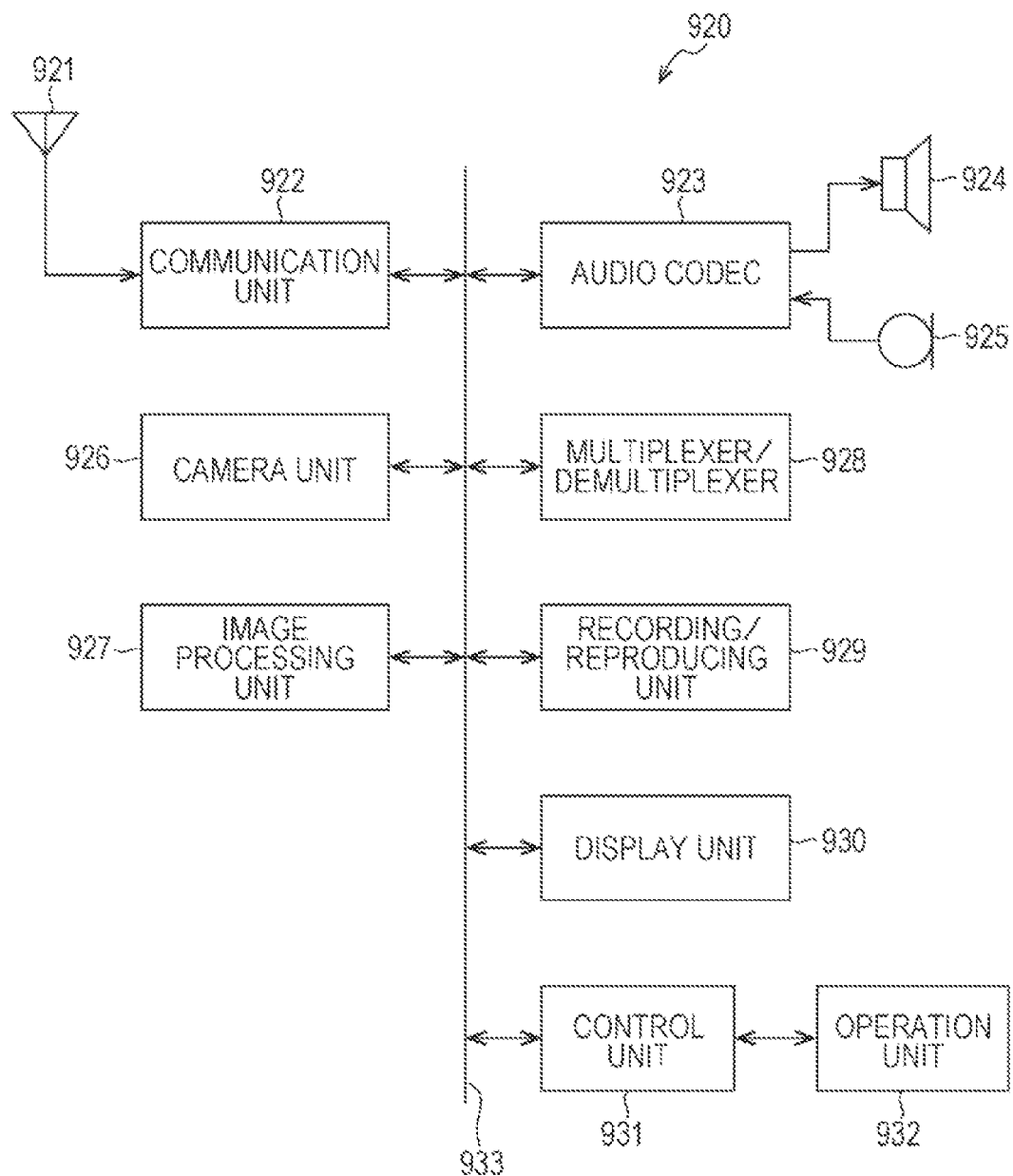
FIG. 36 is a block diagram illustrating an example of a schematic configuration of a mobile phone.

FIG. 36 illustrates an example of a schematic configuration of a mobile phone to which the above-described embodiment is applied. The mobile phone 920 includes an antenna 921, a communication unit 922, an audio codec 923, a speaker 924, a microphone 925, a camera unit 926, an image processing unit 927, a multiplexer/demultiplexer 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 connects the communication unit 922, the audio codec 923, the camera unit 926, the image processing unit 927, the multiplexer/demultiplexer 928, the recording/reproducing unit 929, the display unit 930, and the control unit 931, to each other.

The mobile phone 920 performs operations such as transmission and reception of audio signals, transmission and reception of electronic mails or image data, capturing of an image, and recording of data in various operation modes including a speech mode, a data communication mode, a photographing mode, and a videophone mode.

In the speech mode, an analog audio signal generated by the microphone 925 is supplied to the audio codec 923. The audio codec 923 converts the analog audio signal into audio data, and compresses the converted audio data through A/D conversion. In addition, the audio codec 923 outputs the compressed audio data to the communication unit 922. The communication unit 922 codes and modulates the audio data so as to generate a transmission signal. Further, the communication unit 922 transmits the generated transmission signal to a base station (not illustrated) via the antenna 921. Furthermore, the communication unit 922 amplifies a wireless signal which is received via the antenna 921 and converts a frequency thereof, so as to acquire a received signal. Moreover, the communication unit 922 demodulates and decodes the received signal so as to generate audio data, and outputs the generated audio data to the audio codec 923. The audio codec 923 decompresses and D/A converts the audio data so as to generate an analog audio signal. In addition, the audio codec 923 supplies the generated audio signal to the speaker 924 so as to output a sound.

Further, in the data communication mode, for example, the control unit 931 generates text data forming an electronic mail in response to an operation performed by a user using the operation unit 932. Furthermore, the control unit 931 displays text on the display unit 930. Moreover, the control unit 931 generates electronic mail data in response to a transmission instruction made by the user by using the operation unit 932, and outputs the generated electronic mail data to the communication unit 922. The communication unit 922 codes and modulates the electronic mail data so as to generate a transmission signal. In addition, the communication unit 922 transmits the generated transmission signal to the base station (not illustrated) via the antenna 921. Further, the communication unit 922 amplifies a wireless signal which is received via the antenna 921 and converts a frequency thereof so as to acquire a received signal. Furthermore, the communication unit 922 demodulates and decodes the received signal so as to recover electronic mail data, and outputs the recovered electronic mail data to the control unit 931. The control unit 931 displays content of the electronic mail on the display unit 930 and stores the electronic mail data on a recording medium of the recording/reproducing unit 929.

The recording/reproducing unit 929 includes any readable and writable storage medium. For example, the storage medium may be a built-in storage medium such as a RAM or a flash memory, and may be an externally attached storage medium such as a hard disk, a magnetic disk, a magneto-optical disc, an optical disc, an unallocated space bitmap (USB) memory, or a memory card.

In addition, in the photographing mode, for example, the camera unit 926 images a subject so as to generate image data, and outputs the generated image data to the image processing unit 927. The image processing unit 927 codes the image data which is input from the camera unit 926, and stores the coded stream on the storage medium of the recording/reproducing unit 929.

Further, in the videophone mode, for example, the multiplexer/demultiplexer 928 multiplexes the image stream which has been coded by the image processing unit 927 and the audio stream which is input from the audio codec 923, and outputs the multiplexed stream to the communication unit 922. The communication unit 922 codes and modulates the stream so as to generate a transmission signal. Furthermore, the communication unit 922 transmits the generated transmission signal to the base station (not illustrated) via the antenna 921. In addition, the communication unit 922 amplifies a wireless signal which is received via the antenna 921 and converts a frequency thereof so as to acquire a received signal. A coded stream may be included in the transmission signal and received signal. Further, the communication unit 922 demodulates and decodes the received signal so as to recover a stream, and outputs the recovered stream to the multiplexer/demultiplexer 928. The multiplexer/demultiplexer 928 demultiplexes an image stream and an audio stream from the input stream, and outputs the video stream to the image processing unit 927 and the audio stream to the audio codec 923. The image processing unit 927 decodes the image stream so as to generate image data. The image data is supplied to the display unit 930 so as to allow a series of images to be displayed on the display unit 930. The audio codec 923 decompresses and D/A converts the audio stream so as to generate an analog audio signal. Furthermore, the audio codec 923 supplies the generated audio signal to the speaker 924 so as to output a sound.

In the mobile phone 920 with the above configuration, the image processing unit 927 has functions of the encoder 1000 and the decoder 2000 according to the above-described embodiment.

Third Application Example: Recording/Reproducing Apparatus

Figure 37:
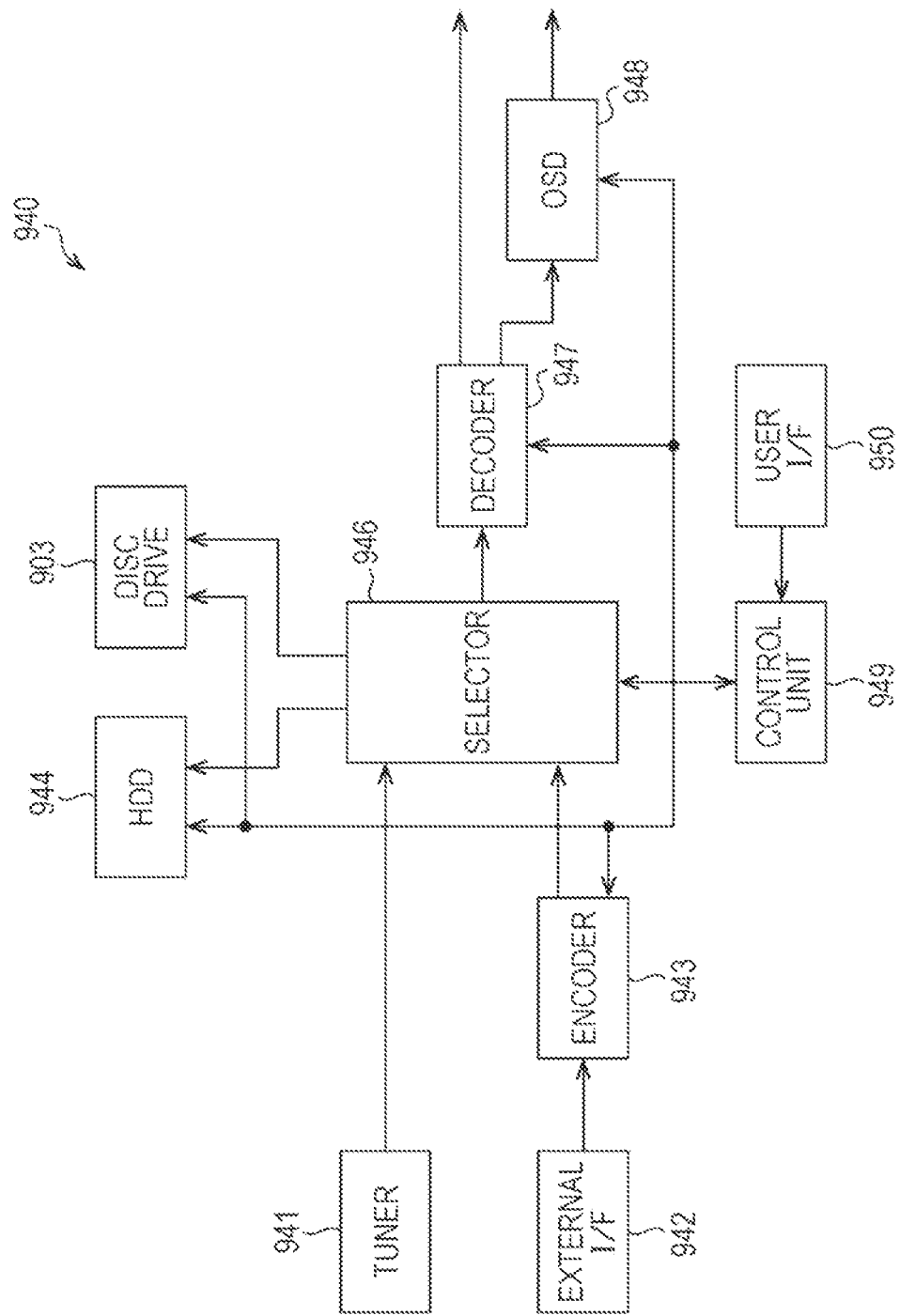
FIG. 37 is a block diagram illustrating an example of a schematic configuration of a recording/reproducing apparatus.

FIG. 37 illustrates an example of a schematic configuration of a recording/reproducing apparatus to which the above-described embodiment is applied. The recording/reproducing apparatus 940 codes, for example, audio data and image data of a received broadcast program, and records the coded data on a recording medium. In addition, the recording/reproducing apparatus 940 may code, for example, audio data and image data which are acquired from other apparatuses, and may record the coded data on the recording medium. Further, the recording/reproducing apparatus 940 reproduces the data recorded on the recording medium on a monitor and a speaker, for example, in response to an instruction from a user. At this time, the recording/reproducing apparatus 940 decodes the audio data and the image data.

The recording/reproducing apparatus 940 includes a tuner 941, an external interface 942, an encoder 943, a hard disk drive (HDD) 944, a disc drive 945, a selector 946, a decoder 947, an on-screen display (OSD) 948, a control unit 949, and a user interface 950.

The tuner 941 extracts a signal of a desired channel from a broadcast signal which is received via an antenna (not illustrated), and demodulates the extracted signal. In addition, the tuner 941 outputs a coded stream which is obtained through demodulation, to the selector 946. In other words, the tuner 941 functions as transmission means in the recording/reproducing apparatus 940.

The external interface 942 is an interface which connects the recording/reproducing apparatus 940 to an external apparatus or a network. The external interface 942 may be, for example, an IEEE1394 interface, a network interface, a USB interface, a flash memory interface, or the like. For example, image data and audio data which are received via the external interface 942 are input to the encoder 943. In other words, the external interface 942 functions as transmission means in the recording/reproducing apparatus 940.

The encoder 943 codes the image data and the audio data in a case where the image data and the audio data input from the external interface 942 are not coded. In addition, the encoder 943 outputs the coded stream to the selector 946.

The HDD 944 records a coded stream in which content data such as an image and a sound is compressed, various programs, and other data in an internal hard disk. In addition, the HDD 944 reads the data from the hard disk when the image and the sound are reproduced.

The disc drive 945 records and reads data on and from a recording medium which is installed therein. The recording medium installed in the disc drive 945 may be, for example, a DVD disc (DVD-Video, DVD-RAM, DVD-R, DVD-RW, DVD+R, DVD+RW, or the like), a Blu-ray (registered trademark) disc, or the like.

When an image and a sound are recorded, the selector 946 selects a coded stream which is input from the tuner 941 or the encoder 943, and outputs the selected coded stream to the HDD 944 or the disc drive 945. In addition, when an image and a sound are reproduced, the selector 946 outputs a coded stream which is input from the HDD 944 or the disc drive 945, to the decoder 947.

The decoder 947 decodes the coded stream so as to generate image data and audio data. In addition, the decoder 947 outputs the generated image data to the OSD 948. Further, the decoder 904 outputs the generated audio data to an external speaker.

The OSD 948 reproduces the image data which is input from the decoder 947 so as to display an image. In addition, the OSD 948 may superimpose a GUI image such as, for example, a menu, a button, or a cursor on the displayed image.

The control unit 949 includes a processor such as a CPU, and memories such as a RAM and a ROM. The memories store a program executed by the CPU, program data, and the like. The program stored in the memories is read and executed by the CPU, for example, when the recording/reproducing apparatus 940 is started. The CPU executes the program, and thus controls an operation of the recording/reproducing apparatus 940 in response to, for example, an operation signal which is input from the user interface 950.

The user interface 950 is connected to the control unit 949. The user interface 950 includes, for example, buttons and switches which allow a user to operate the recording/reproducing apparatus 940, a reception unit of a remote control signal, and the like. The user interface 950 generates an operation signal by detecting an operation performed by a user via these constituent elements, and outputs the generated operation signal to the control unit 949.

In the recording/reproducing apparatus 940 with the above configuration, the encoder 943 has a function of the encoder 1000 according to the above-described embodiment. In addition, the decoder 947 has a function of the decoder 2000 according to the above-described embodiment.

Fourth Application Example: Imaging Apparatus

Figure 38:
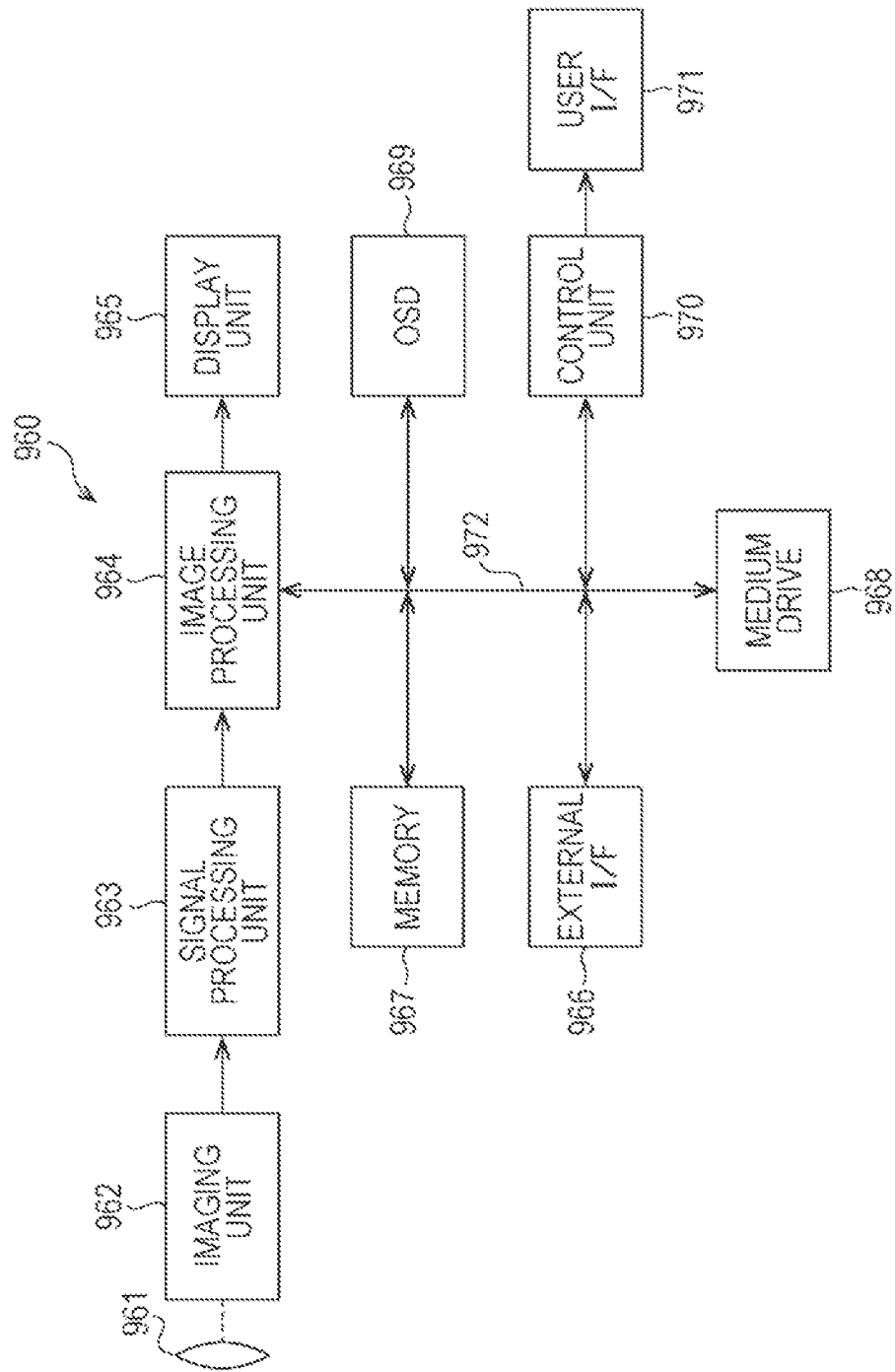
FIG. 38 is a block diagram illustrating an example of a schematic configuration of an imaging apparatus.

FIG. 38 illustrates an example of a schematic configuration of an imaging apparatus to which the above-described embodiment is applied. The imaging apparatus 960 images a subject so as to generate an image, and codes image data so as to record the coded data on a recording medium.

The imaging apparatus 960 includes an optical block 961, an imaging unit 962, a signal processing unit 963, an image processing unit 964, a display unit 965, an external interface 966, a memory 967, a medium drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 connects the image processing unit 964, the external interface 966, the memory 967, the medium drive 968, the OSD 969, and the control unit 970, to each other.

The optical block 961 includes a focus lens, a diaphragm mechanism, and the like. The optical block 961 forms an optical image of a subject on an imaging surface of the imaging unit 962. The imaging unit 962 includes an image sensor such as a charge coupled device (CCD) or a complementary metal oxide semiconductor (CMOS), and converts the optical image formed on the imaging surface into an image signal as an electrical signal through photoelectric conversion. In addition, the imaging unit 962 outputs the image signal to the signal processing unit 963.

The signal processing unit 963 performs various camera signal processes such as knee correction, gamma correction, and color correction, on the image signal which is input from the imaging unit 962. The signal processing unit 963 outputs the image data having undergone the camera signal processes to the image processing unit 964.

The image processing unit 964 codes the image data which is input from the signal processing unit 963 so as to generate coded data. In addition, the image processing unit 964 outputs the generated coded data to the external interface 966 or the medium drive 968. Further, the image processing unit 964 decodes the coded data which is input from the external interface 966 or the medium drive 968, so as to generate image data. Furthermore, the image processing unit 964 outputs the generated image data to the display unit 965. Moreover, the image processing unit 964 may output image data which is input from the signal processing unit 963, to the display unit 965, so as to display an image. In addition, the image processing unit 964 may superimpose display data which is acquired from the OSD 969, on an image which is output to the display unit 965.

The OSD 969 generates a GUI image such as, for example, a menu, a button, or a cursor, and outputs the generated image to the image processing unit 964.

The external interface 966 is formed by, for example, a USB input and output terminal. The external interface 966 connects the imaging apparatus 960 to a printer, for example, when an image is printed. In addition, the external interface 966 is connected to a drive as necessary. A removable medium such as, for example, a magnetic disk or an optical disc may be installed in the drive, and a program read from the removable medium may be installed in the imaging apparatus 960. Further, the external interface 966 may be configured as a network interface which is connected to a network such as a LAN or the Internet. In other words, the external interface 966 functions as transmission means in the imaging apparatus 960.

A recording medium installed in the medium drive 968 may be any readable and writable removable medium such as, for example, a magnetic disk, a magneto-optical disc, an optical disc, or a semiconductor memory. In addition, a recording medium may be fixedly installed in the medium drive 968, so as to configure a non-portable storage unit such as, for example, a built-in hard disk drive or a solid state drive (SSD).

The control unit 970 includes a processor such as a CPU, and memories such as a RAM and a ROM. The memories store a program executed by the CPU, program data, and the like. The program stored in the memories is read and executed by the CPU, for example, when the imaging apparatus 960 is started. The CPU executes the program, and thus controls an operation of the imaging apparatus 960 in response to, for example, an operation signal which is input from the user interface 971.

The user interface 971 is connected to the control unit 970. The user interface 971 includes, for example, buttons and switches which allow a user to operate the imaging apparatus 960, and the like. The user interface 971 generates an operation signal by detecting an operation performed by a user via these constituent elements, and outputs the generated operation signal to the control unit 970.

In the imaging apparatus 960 with the above configuration, the image processing unit 964 has functions of the encoder 1000 and the decoder 2000 according to the above-described embodiment.

[Application to Multi-View Image Coding and Multi-View Image Decoding]

Figure 39:
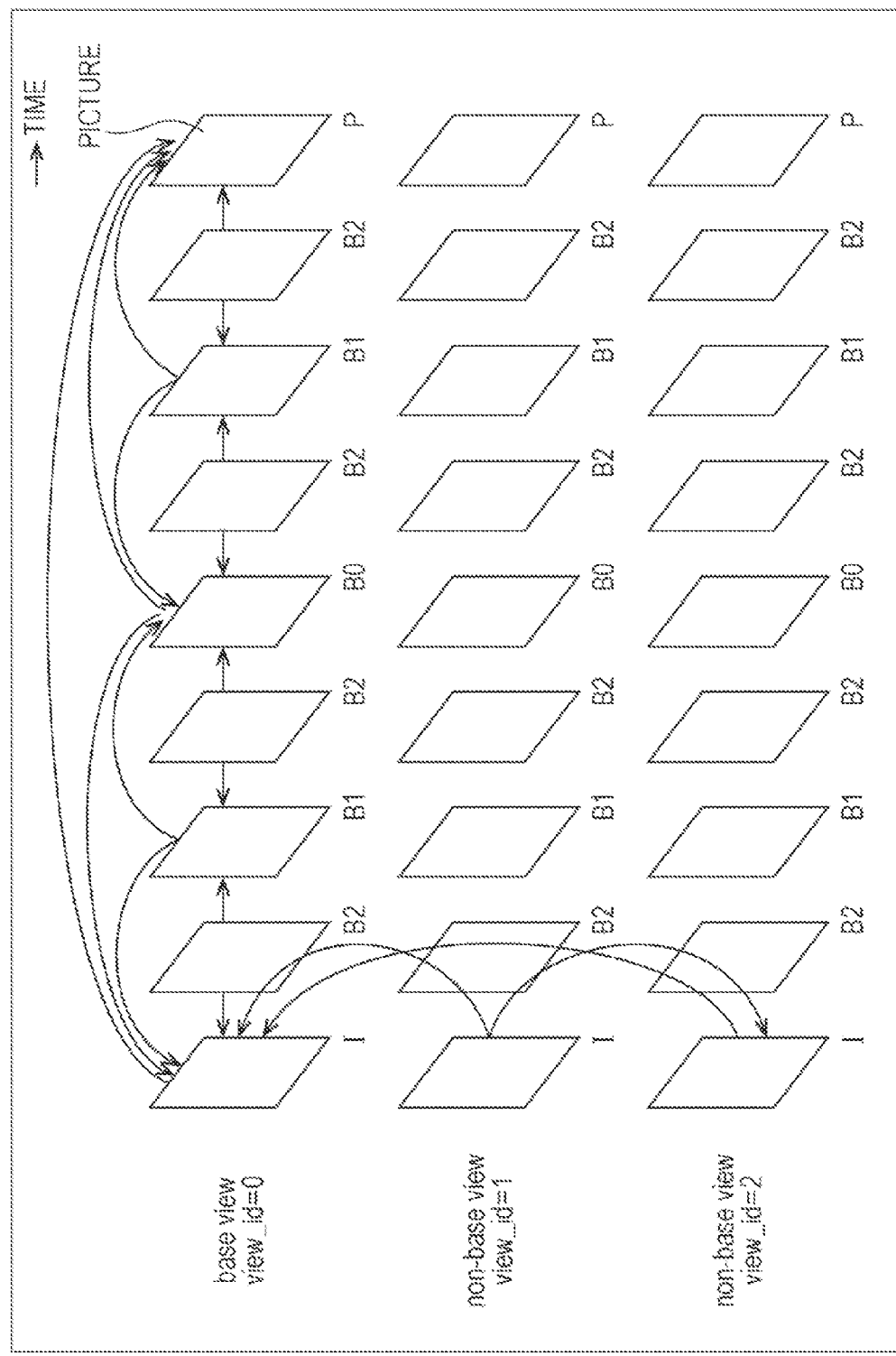
FIG. 39 is a diagram illustrating an example of a multi-view image coding method.

FIG. 39 is a diagram illustrating an example of a multi-view image coding method.

The above-described series of processes may be applied to multi-view image coding and multi-view image decoding.

As illustrated in FIG. 39, multi-view images include images at a plurality of views, and an image at a certain view among the plurality of views is designated as a base view image. The images at the respective views other than the base view image are treated as non-base view images.

In FIG. 39, three-view images are present as multi-view images, and an image having 0 as view_id for identifying an image at each view is a base view image. In addition, images having view_id of 1 and 2 are non-base view images.

Here, in the multi-view image coding and multi-view image decoding, the base view image is processed (coded and decoded) without referring to images at other views. On the other hand, the non-base view image may be processed by referring to images at other views. In FIG. 39, the arrow indicates reference of an image, and an image on the start point of the arrow may be processed by referring to an image on the end point of the arrow as necessary.

In a case where the multi-view images as illustrated in FIG. 39 are coded and decoded, each view image is coded and decoded, and the technique for the image processing apparatus of FIG. 16 is applicable to coding and decoding of each view. Accordingly, as described above, it is possible to prevent an increase in a cost.

In addition, in the coding and decoding of each view, the flag and other information used for the technique for the image processing apparatus of FIG. 16 can be shared.

[Multi-View Image Coding Device]

Figure 40:
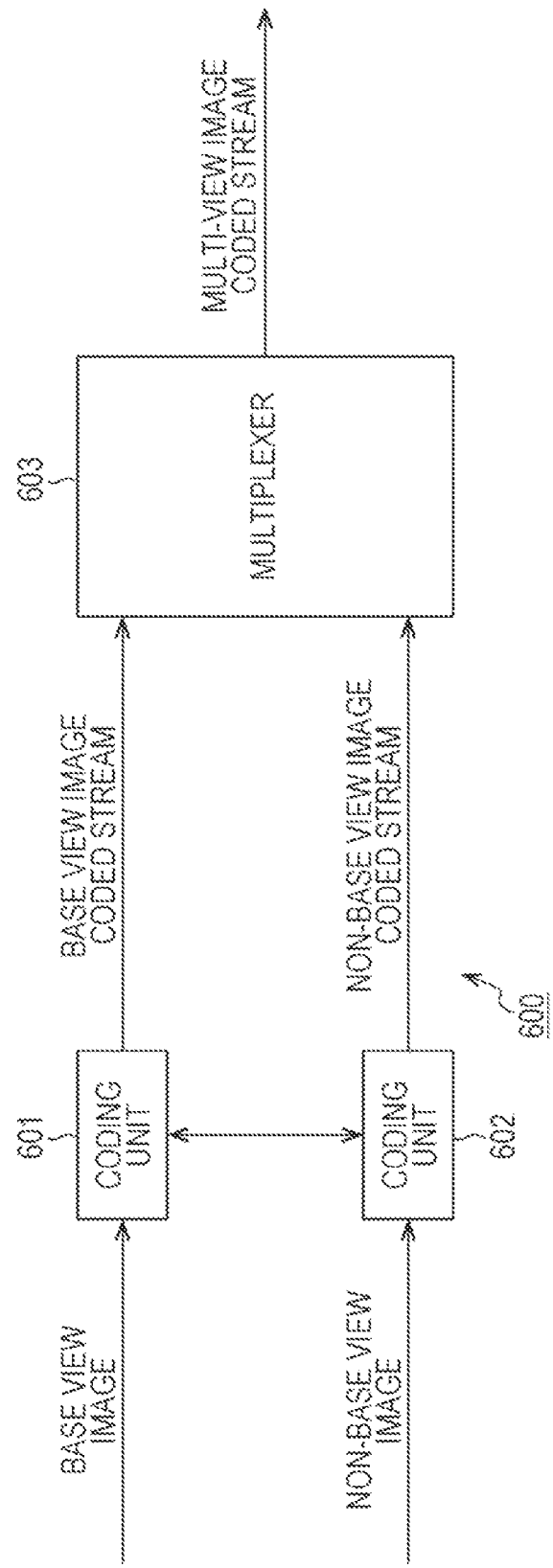
FIG. 40 is a diagram illustrating a main configuration example of a multi-view image coding device to which the present technology is applied.

FIG. 40 is a block diagram illustrating a configuration example of a multi-view image coding device which performs the above-described multi-view image coding.

As illustrated in FIG. 40, the multi-view image coding device 600 includes a coding unit 601, a coding unit 602, and a multiplexer 603, and codes multi-view images formed by two-view images including, for example, a base view image and a non-base view image. As the multi-view images formed by two-view images, there are, for example, three-dimensional (3D) images formed by a left eye image which is observed with the left eye and a right eye image which is observed with the right eye.

The coding unit 601 codes the base view image so as to generate a base view image coded stream. The coding unit 602 codes the non-base view image while referring to the base view image (a base view image which is coded by the coding unit 601 and is locally decoded) as necessary, so as to generate a non-base view image coded stream. The multiplexer 603 multiplexes the base view image coded stream generated in the coding unit 601 and the non-base view image coded stream generated in the coding unit 602, so as to generate a multi-view image coded stream.

The technique for the encoder 1000 of the image processing apparatus of FIG. 16 is applicable to the coding unit 601 and the coding unit 602 of the multi-view image coding device 600. In addition, as described above, the coding unit 601 and the coding unit 602 can share the flag and other information.

[Multi-View Image Decoding Device]

Figure 41:
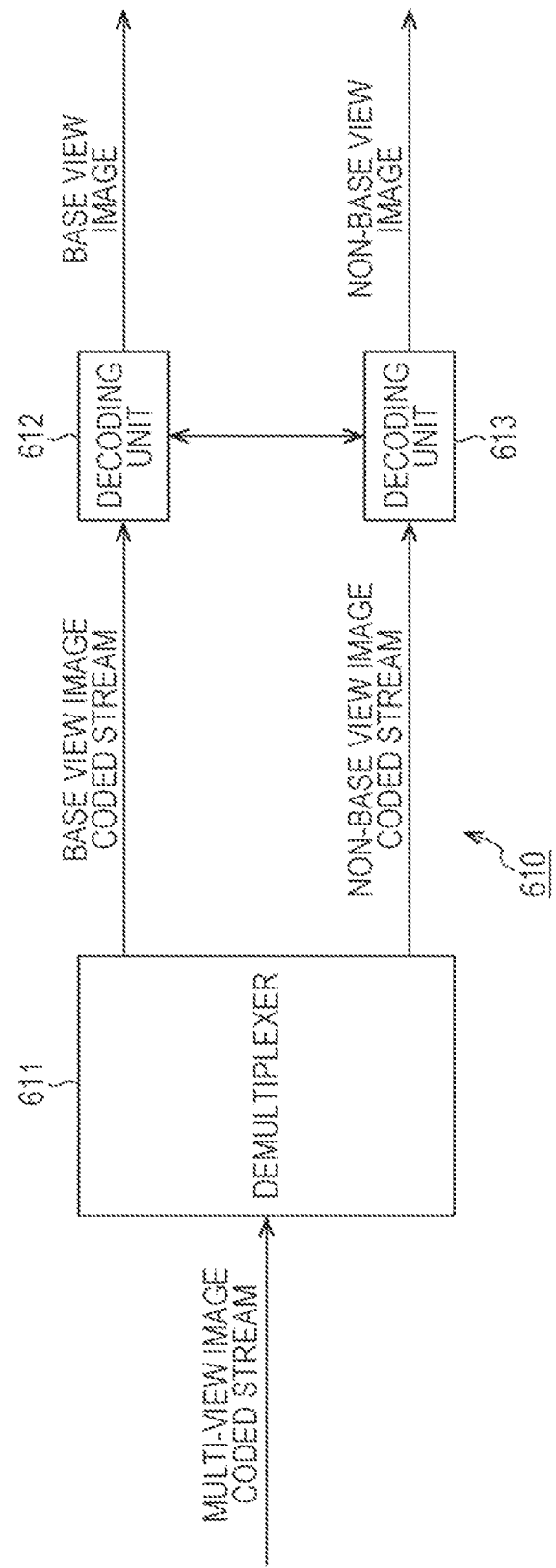
FIG. 41 is a diagram illustrating a main configuration example of a multi-view image decoding device to which the present technology is applied.

FIG. 41 is a block diagram illustrating a configuration example of a multi-view image decoding device which performs the above-described multi-view image decoding.

As illustrated in FIG. 41, the multi-view image decoding device 610 includes a demultiplexer 611, a decoding unit 612, and a decoding unit 613, and decodes, for example, the multi-view image coded stream obtained by the multi-view image coding device of FIG. 40.

The demultiplexer 611 demultiplexes the multi-view image coded stream into which the base view image coded stream and the non-base view image coded stream are multiplexed, so as to extract the base view image coded stream and the non-base view image coded stream. The decoding unit 612 decodes the base view image coded stream extracted by the demultiplexer 611 so as to obtain a base view image. The decoding unit 613 decodes the non-base view image coded stream extracted by the demultiplexer 611 while referring to the base view image which is decoded by the decoding unit 612 as necessary, so as to obtain a non-base view image.

The decoder 2000 of the image processing apparatus of FIG. 16 is applicable to the decoding unit 612 and the decoding unit 613 of the multi-view image decoding device 610. In addition, as described above, the decoding unit 612 and the decoding unit 613 can share the flag and other information.

[Application to Layer Image Coding and Layer Image Decoding]

Figure 42:
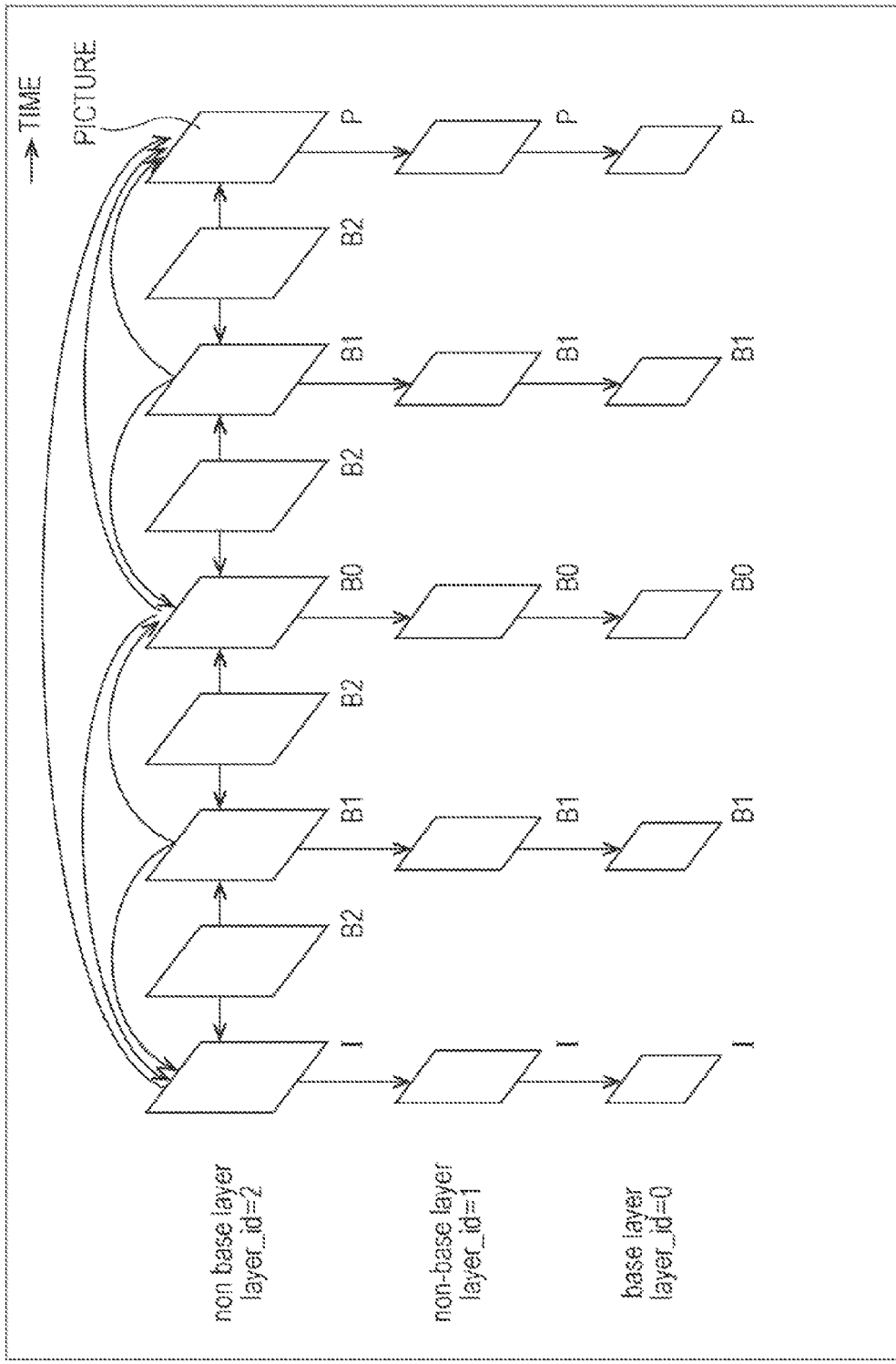
FIG. 42 is a diagram illustrating an example of a layer image coding method.

FIG. 42 is a diagram illustrating an example of a layer image coding method.

The above-described series of processes may be applied to layer image coding and layer image decoding.

As illustrated in FIG. 42, layer images include images of a plurality of layers (resolutions), and an image (for example, an image with the lowest resolution) of a certain layer among the plurality of layers is designated as a base layer image. The images of the respective layers other than the base layer image are treated as non-base layer images.

In FIG. 42, three-layer images are present as layer images, and an image having 0 as layer_id for identifying an image of each layer is a base layer image. In addition, images having layer_id of 1 and 2 are non-base layer images. Further, the non-base layer image having layer_id of 2 is, for example, an image with an original resolution of certain content, and the non-base layer image having layer_id of 1 is, for example, an image which is obtained by deteriorating the resolution of the non-base layer image having layer_id of 2. Furthermore, the base layer image having layer_id of 0 is an image which is obtained by deteriorating the resolution of the non-base layer image having layer_id of 1.

Here, in the layer image coding and layer image decoding, the base layer image is processed (coded and decoded) without referring to images of other layers. On the other hand, the non-base layer image may be processed by referring to images of other layers. In FIG. 42, in the same manner as in FIG. 39, the arrow indicates reference of an image, and an image on the start point of the arrow may be processed by referring to an image on the end point of the arrow as necessary.

In a case where the layer images as illustrated in FIG. 42 are coded and decoded, an image of each layer is coded and decoded, and the technique for the image processing apparatus of FIG. 16 is applicable to coding and decoding of each layer. Accordingly, as described above, it is possible to prevent an increase in a cost.

In addition, in the coding and decoding of each layer, the flag and other information used for the technique for the image processing apparatus of FIG. 16 can be shared.

[Layer Image Coding Device]

Figure 43:
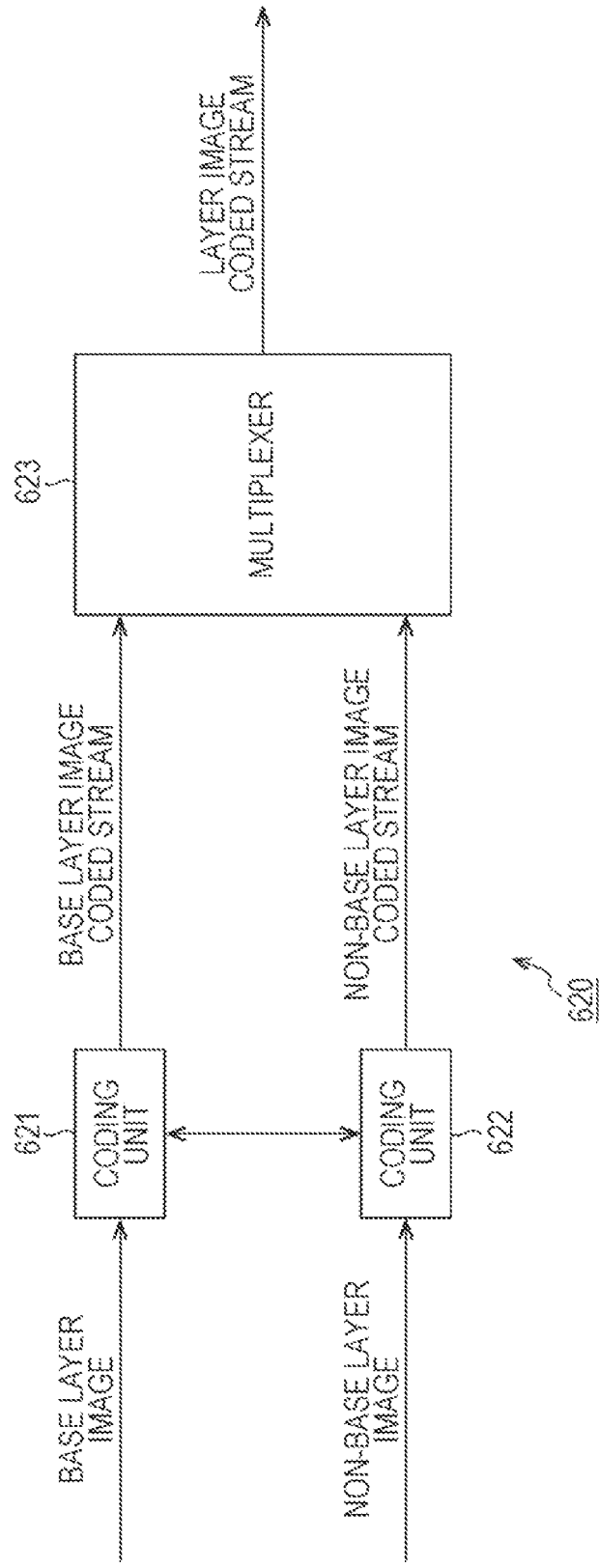
FIG. 43 is a diagram illustrating a main configuration example of a layer image coding device to which the present technology is applied.

FIG. 43 is a block diagram illustrating a configuration example of a layer image coding device which performs the above-described layer image coding.

As illustrated in FIG. 43, the layer image coding device 620 includes a coding unit 621, a coding unit 622, and a multiplexer 623, and codes layer images formed by two-layer images including, for example, a base layer image and a non-base layer image.

The coding unit 621 codes the base layer image so as to generate a base layer image coded stream. The coding unit 622 codes the non-base layer image while referring to the base layer image (a base layer image which is coded by the coding unit 621 and is locally decoded) as necessary, so as to generate a non-base layer image coded stream. The multiplexer 623 multiplexes the base layer image coded stream generated in the coding unit 621 and the non-base layer image coded stream generated in the coding unit 622, so as to generate a layer image coded stream.

The technique for the encoder 1000 of the image processing apparatus of FIG. 16 is applicable to the coding unit 621 and the coding unit 622 of the layer image coding device 620. In addition, as described above, the coding unit 621 and the coding unit 622 can share the flag and other information.

[Layer Image Decoding Device]

Figure 44:
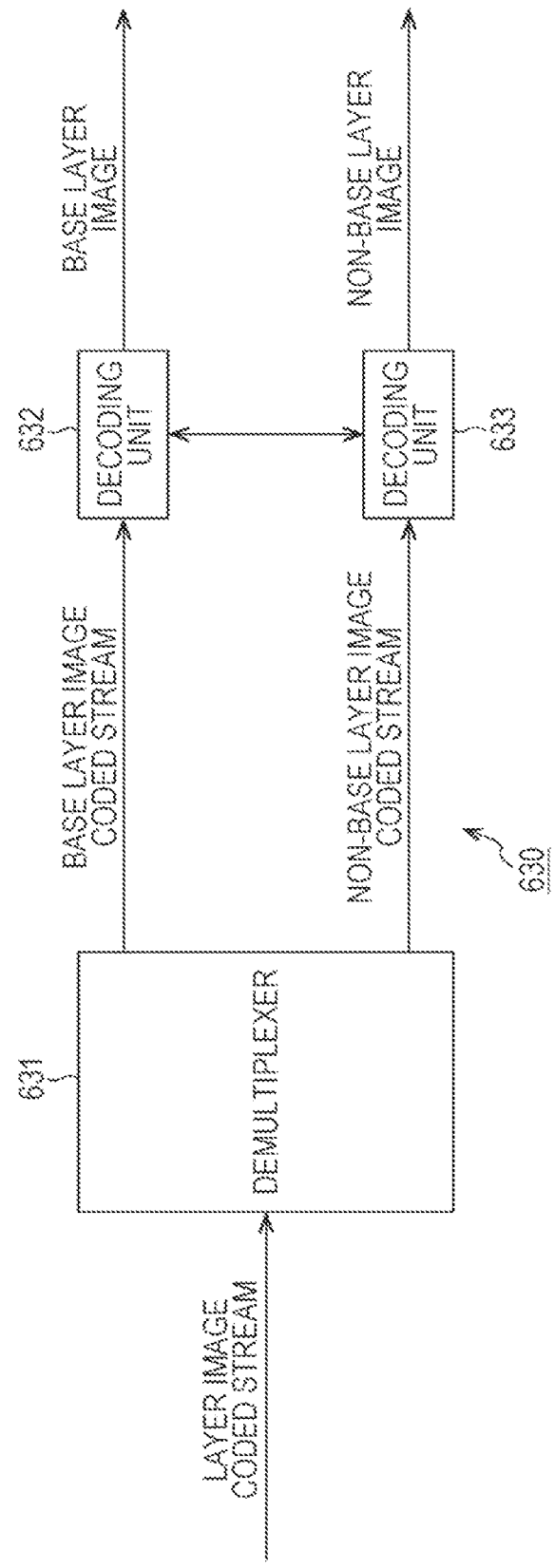
FIG. 44 is a diagram illustrating a main configuration example of a layer image decoding device to which the present technology is applied.

FIG. 44 is a block diagram illustrating a configuration example of a layer image decoding device which performs the above-described layer image decoding.

As illustrated in FIG. 44, the layer image decoding device 630 includes a demultiplexer 631, a decoding unit 632, and a decoding unit 633, and decodes, for example, the layer image coded stream obtained by the layer image coding device of FIG. 43.

The demultiplexer 631 demultiplexes the layer image coded stream into which the base layer image coded stream and the non-base layer image coded stream are multiplexed, so as to extract the base layer image coded stream and the non-base layer image coded stream. The decoding unit 632 decodes the base layer image coded stream extracted by the demultiplexer 631 so as to obtain a base layer image. The decoding unit 633 decodes the non-base layer image coded stream extracted by the demultiplexer 631 while referring to the base layer image which is decoded by the decoding unit 632 as necessary, so as to obtain a non-base layer image.

The technique for the decoder 2000 of the image processing apparatus of FIG. 16 is applicable to the decoding unit 632 and the decoding unit 633 of the layer image decoding device 630. In addition, as described above, the decoding unit 632 and the decoding unit 633 can share the flag and other information.

[Examples of Using Layer Image Coding Method]

A description will be made of examples of using the above-described layer image coding method.

[First Example of Using Layer Image Coding Method]

Figure 45:
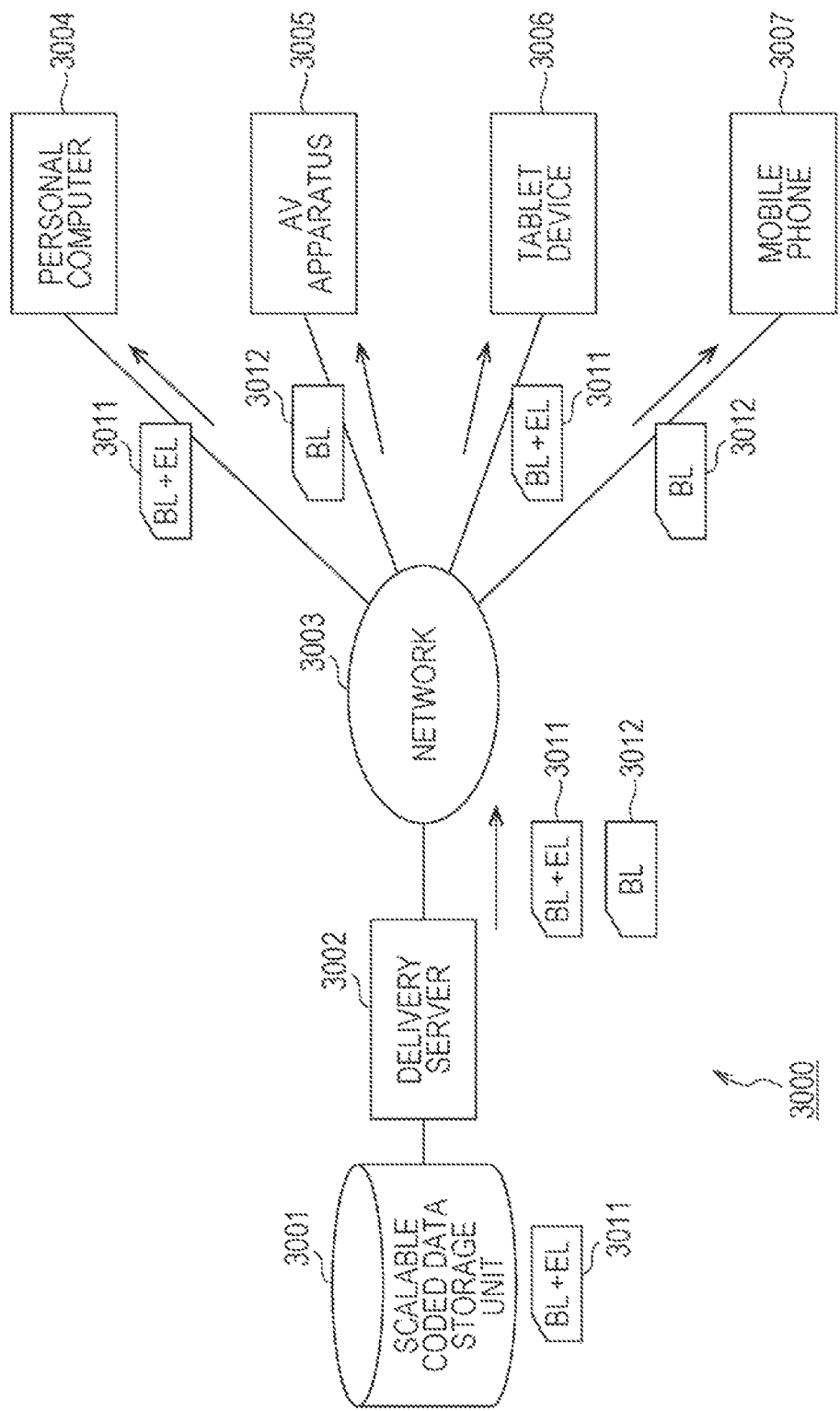
FIG. 45 is a block diagram illustrating an example of using scalable coding.

FIG. 45 is a diagram illustrating a first example of using the layer image coding method.

The layer image coding (hereinafter, also referred to as scalable coding) may be used, for example, to select data to be transmitted as in an example illustrated in FIG. 45.

In a data transmission system 3000 illustrated in FIG. 45, scalable coded data which is obtained by scalably coding a layer image is stored in a scalable coded data storage unit 3001.

A delivery server 3002 reads the scalable coded data stored in the scalable coded data storage unit 3001, and delivers the scalable coded data to terminal apparatuses such as a personal computer 3004, an AV apparatus 3005, a tablet device 3006, and a mobile phone 3007 via a network 3003.

At this time, the delivery server 3002 selects and transmits coded data with appropriate quality (resolution and the like) on the basis of performances of the terminal apparatuses, communication circumstances, or the like. If the delivery server 3002 unnecessarily transmits high quality data, it cannot be said that a high quality image is obtained in the terminal apparatus, and there is a concern that delay or overflow may occur. In addition, there is a concern that high quality data may unnecessarily occupy a communication band, and may unnecessarily increase a load on the terminal apparatus. Conversely, if the delivery server 3002 merely transmits low quality data, it is difficult to obtain a high quality image even if performances of the terminal apparatuses or communication circumstances are sufficient. For this reason, the delivery server 3002 reads and transmits coded data with quality (layer) which is suitable for the performances of the terminal apparatuses or the communication circumstances from the scalable coded data storage unit 3001.

Here, in FIG. 45, the scalable coded data storage unit 3001 stores scalable coded data (BL+EL) 3011. The scalable coded data (BL+EL) 3011 is a layer image coded stream into which a base layer image coded stream BL and a non-base layer image coded stream EL are multiplexed.

The base layer image coded stream BL is coded data obtained by coding a base layer image. In addition, the non-base layer image coded stream EL is coded data obtained by coding a non-base layer (enhance layer) image while referring to the base layer image as necessary.

Therefore, the scalable coded data (BL+EL) 3011 is coded data which includes images of both of the base layer and the non-base layer, and is data which allows both of the base layer image and the non-base layer image to be obtained through decoding.

The delivery server 3002 selects an appropriate layer on the basis of a performance of a terminal apparatus which receives data (receives delivered data) or communication circumstances, and reads data (necessary to decode an image) of the layer from the scalable coded data storage unit 3001. For example, the delivery server 3002 reads the scalable coded data (BL+EL) 3011 which has high quality (which allows a high quality image to be obtained) from the scalable coded data storage unit 3001, and transmits the data as it is, in relation to the personal computer 3004 or the tablet device 3006 having a high processing performance. In contrast, for example, in relation to the AV apparatus 3005 or the mobile phone 3007 having a low processing performance, the delivery server 3002 extracts base layer data (base layer image coded stream BL) from the scalable coded data (BL+EL) 3011, and transmits the data as scalable coded data (BL) 3012 which is the same content data as the scalable coded data (BL+EL) 3011 in terms of content but has lower quality than the scalable coded data (BL+EL) 3011.

As mentioned above, since a data amount can be easily adjusted by using the scalable coded data, it is possible to minimize the occurrence of delay or overflow or to minimize an unnecessary increase in a load on a terminal apparatus or a communication medium.

In addition, in the scalable coding, since coding of a non-base layer (enhance layer) image is performed while referring to a base layer image, redundancy between layers is reduced in the scalable coded data (BL+EL) 3011, and thus a data amount becomes smaller than in a case where a non-base layer image is coded without referring to images of other layers, that is, in an independent manner. Therefore, a storage region of the scalable coded data storage unit 3001 can be used more efficiently.

In addition, various apparatuses such as the personal computer 3004 to the mobile phone 3007 can be employed as terminal apparatuses which receive data from the delivery server 3002, and there are various performances of hardware of the terminal apparatuses. Further, there are various applications which are executed by the terminal apparatuses, and there are also various performances of software thereof. Furthermore, all communication line networks including a wired network, a wireless network, or both networks, such as, for example, the Internet or a local area network (LAN) can be employed as the network 3003 which is a communication medium, and there are various data transmission performances. Moreover, a data transmission performance of the network 3003 serving as a communication medium may vary depending on a traffic amount or other communication circumstances.

Therefore, before starting data transmission, the delivery server 3002 may perform communication with a terminal apparatus which is a transmission destination of the data, so as to obtain information regarding performances of the terminal apparatus such as a hardware performance of the terminal apparatus and a performance of an application (software) executed by the terminal apparatus, and information regarding communication circumstances such as an available bandwidth of the network 3003. In addition, the delivery server 3002 may select an appropriate layer on the basis of the information regarding the performances of the terminal apparatus and the information regarding the communication circumstances.

Further, the extraction of the scalable coded data (BL) 3012 from the scalable coded data (BL+EL) 3011 may be performed by the terminal apparatus as well as the delivery server 3002. For example, the personal computer 3004 may not only decode the scalable coded data (BL+EL) 3011 which is transmitted from the delivery server 3002 so as to display a non-base layer image, but also extract the base layer scalable coded data (BL) 3012 from the scalable coded data (BL+EL) 3011 which is transmitted from the delivery server 3002 so as to store the data, to transmit the data to other devices, or to decode the data for display of a base layer image.

Of course, the number of scalable coded data storage units 3001, the number of delivery servers 3002, the number of networks 3003, and the number of terminal apparatuses are all arbitrary.

In addition, the terminal apparatus may receive, for example, scalable coded data of a plurality of content items from the delivery server 3002. Further, in a case where scalable coded data of a plurality of content items is received from the delivery server 3002, the terminal apparatus may perform, for example, display of a plurality of screens such as so-called two-screen display in which a non-base layer image is displayed in relation to a certain content item among the plurality of content items, and a base layer image is displayed in relation to the other content items.

[Second Example of Using Layer Image Coding Method]

Figure 46:
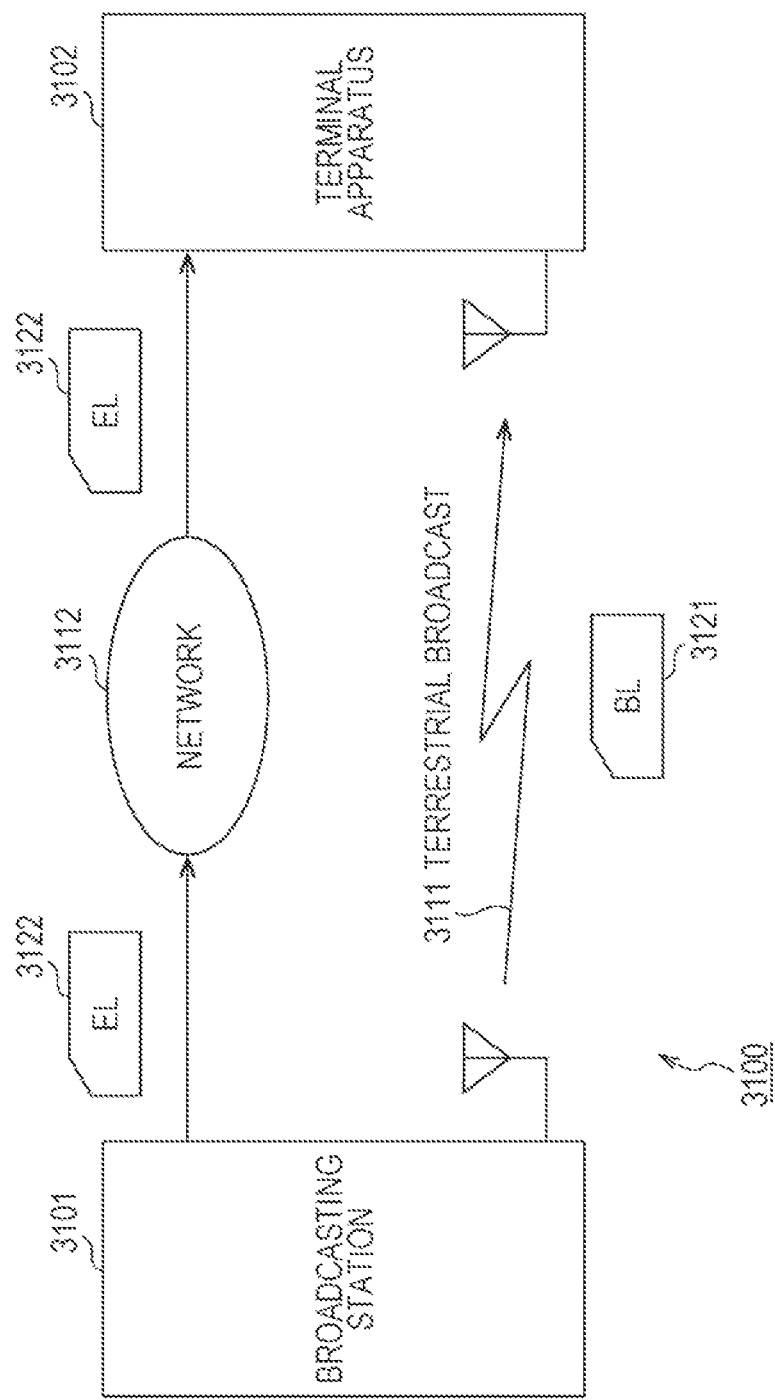
FIG. 46 is a block diagram illustrating another example of using scalable coding.

FIG. 46 is a diagram illustrating a second example of using the layer image coding method.

The scalable coding may be used, for example, for transmission using a plurality of communication media as in an example illustrated in FIG. 46.

In a data transmission system 3100 illustrated in FIG. 46, a broadcasting station 3101 transmits base layer scalable coded data (BL) 3121 by using a terrestrial broadcast 3111. In addition, the broadcasting station 3101 transmits (for example, packetizes and transmits) non-base layer scalable coded data (EL) 3122 via any network 3112 formed by a wired network, a wireless network, or both networks.

A terminal apparatus 3102 has a reception function of the terrestrial broadcast 3111 which is broadcasted by the broadcasting station 3101, and receives the base layer scalable coded data (BL) 3121 which is transmitted via the terrestrial broadcast 3111. In addition, the terminal apparatus 3102 further has a communication function of performing communication using the network 3112, and receives the non-base layer scalable coded data (EL) 3122 which is transmitted via the network 3112.

The terminal apparatus 3102 may decode the base layer scalable coded data (BL) 3121 which is acquired via the terrestrial broadcast 3111, for example, in response to an instruction from a user, so as to obtain a base layer image, to store the image, and to transmit the image to other apparatuses.

In addition, for example, in response to an instruction from a user, the terminal apparatus 3102 may combine the base layer scalable coded data (BL) 3121 which is acquired via the terrestrial broadcast 3111 with the non-base layer scalable coded data (EL) 3122 which is acquired via the network 3112 so as to obtain scalable coded data (BL+EL), and may decode the data so as to obtain a base layer image, to store the image, and to transmit the image to other apparatuses.

As mentioned above, the scalable coded data may be transmitted via a communication medium which is different for each layer, for example. In this case, a load can be distributed, and thus it is possible to minimize the occurrence of delay or overflow.

In addition, a communication medium used for transmission may be selected for each layer depending on circumstances. For example, the base layer scalable coded data (BL) 3121 having a relatively large amount of data may be transmitted via a communication media having a large bandwidth, and the non-base layer scalable coded data (EL) 3122 having a relatively small amount of data may be transmitted via a communication medium having a small bandwidth. In addition, for example, a communication medium for transmitting the non-base layer scalable coded data (EL) 3122 may be changed between the network 3112 and the terrestrial broadcast 3111 depending on an available bandwidth of the network 3112. Of course, this is also the same for data of any layer.

The control is performed as mentioned above, and thus it is possible to further minimize an increase in a load in data transmission.

In addition, the number of layers is arbitrary, and the number of communication media used for transmission is also arbitrary. Further, the number of terminal apparatuses 3102 serving as a data transmission destination is also arbitrary. Furthermore, the data transmission system 3100, which splits coded data which is scalably coded into a plurality of data items in the unit of layers and transmits the data items via a plurality of lines as illustrated in FIG. 46, is not limited to a system which uses a broadcast.

[Third Example of Using Layer Image Coding Method]

Figure 47:
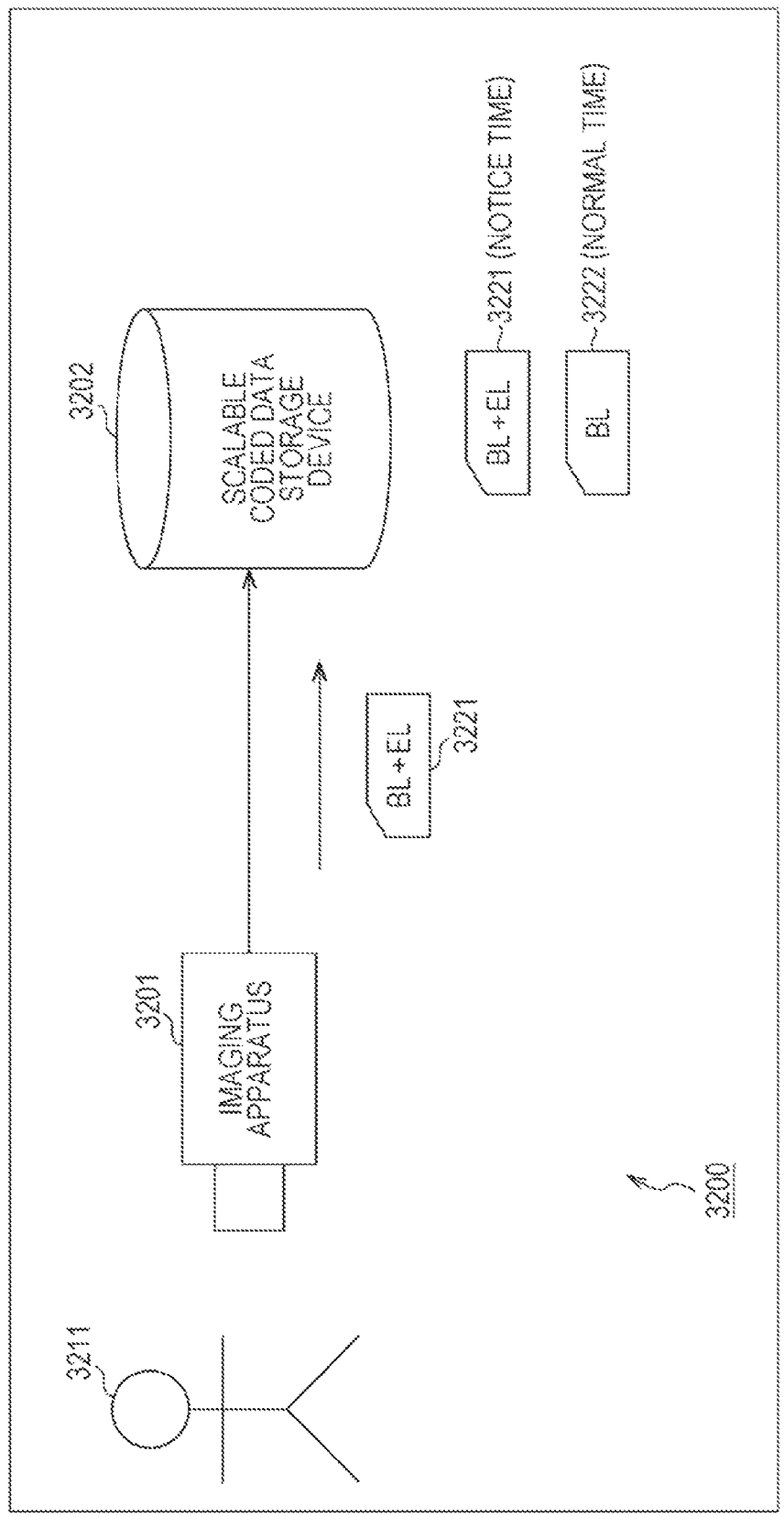
FIG. 47 is a block diagram illustrating still another example of using scalable coding.

FIG. 47 is a diagram illustrating a third example of using the layer image coding method.

The scalable coding may be used, for example, to store coded data as in an example illustrated in FIG. 47.

In an imaging system 3200 illustrated in FIG. 47, an imaging apparatus 3201 scalably codes image data which is obtained by imaging a subject 3211, and supplies resultant data to a scalable coded data storage device 3202 as scalable coded data (BL+EL) 3221.

The scalable coded data storage device 3202 stores the scalable coded data (BL+EL) 3221 which is supplied from the imaging apparatus 3201, with quality (resolution) based on circumstances. For example, in a case of the normal time, the scalable coded data storage device 3202 extracts base layer data from the scalable coded data (BL+EL) 3221, and stores the data as base layer scalable coded data (BL) 3222 having a small amount of data with low quality. In contrast, for example, in a case of the notice time, the scalable coded data storage device 3202 stores the scalable coded data (BL+EL) 3221 having a large amount of data with high quality as it is.

Accordingly, since the scalable coded data storage device 3202 can preserve a high quality image as necessary only, it is possible to minimize an increase in a data amount while minimizing a reduction in the value of an image due to image quality deterioration, and thus to improve use efficiency of a storage region.

For example, the imaging apparatus 3201 is assumed to be a monitoring camera. In a case (a case of the normal time) where a monitoring target (for example, an trespasser) is not reflected in a captured image (image data obtained by the imaging apparatus 3201), there is a high probability that content of the captured image may not be important, and thus a reduction in a data amount is prioritized, and the captured image (scalable coded data) is stored with low quality. In contrast, in a case (a case of the notice time) where a monitoring target is reflected in a captured image as the subject 3211, there is a high probability that content of the captured image may be important, and thus image quality is prioritized, and the captured image (scalable coded data) is stored with high quality.

In addition, the normal time and the notice time may be determined, for example, by the scalable coded data storage device 3202 analyzing an image. Further, the normal time and the notice time may be determined, for example, by the imaging apparatus 3201, and a determination result may be transmitted to the scalable coded data storage device 3202.

In addition, a determination criterion of the normal time and the notice time is arbitrary, and content of a captured image which is used as a determination criterion is arbitrary. Of course, conditions other than the content of a captured image may be used as a determination criterion. For example, the normal time and the notice time can be determined on the basis of the magnitude, a waveform, or the like of a recorded sound. In addition, the normal time and the notice time may be changed, for example, for each predetermined time interval, or by an external instruction such as an instruction from a user.

In addition, in the above description, an example of changing two states including the normal time and the notice time has been described, but the number of states is arbitrary, and, for example, three or more states such as the normal time, the slight notice time, the notice time, the great notice time, may be changed. Here, an upper limit number of changed states depends on the number of layers of scalable coded data.

In addition, the imaging apparatus 3201 may determine the number of scalable coded layers on the basis of a state. For example, in a case of the normal time, the imaging apparatus 3201 may generate the base layer scalable coded data (BL) 3222 having a small amount of data with low quality, and may supply the data to the scalable coded data storage device 3202. Further, for example, in a case of the notice time, the imaging apparatus 3201 may generate the base layer and non-base layer scalable coded data (BL+EL) 3221 having a large amount of data with high quality, and may supply the data to the scalable coded data storage device 3202.

In addition, usage of the imaging system 3200 is arbitrary and is not limited to a monitoring camera.

Further, in the present specification, a description has been made of an example in which various information pieces such as the prediction mode information and the merge information are multiplexed into a header of a coded stream, and are transmitted from a coding side to a decoding side. However, a method of transmitting the information pieces is not limited to this example. For example, the information may be transmitted or recorded as separate data correlated with a coded stream without being multiplexed into the coded stream. Here, the term "correlated" indicates that an image (which may be a part of the image such as a slice or a block) included in the coded stream can be linked to information corresponding to the image during decoding. In other words, the information may be transmitted on a transmission path different from that of the image (or the coded stream). Furthermore, the information may be recorded on a recording medium (or a different recording area of the same recording medium) different from that of the image (or the coded stream). Moreover, the information and the image (or the coded stream) may be correlated with each other in any unit such as, for example, a plurality of frames, one frame, or a part of the frame.

As mentioned above, although the preferred embodiment of the present technology has been described in detail with reference to the accompanying drawings, the present invention is not limited to this example. It is obvious that those skilled in the art can conceive of various modifications or alterations in the scope of the technical spirit recited in the claims, and it is understood that they naturally also fall within the technical scope of the present technology.

In addition, the present technology may have the following configurations.

[1] An image processing apparatus including a setting unit that sets identification information for identifying a correspondence relationship between a size of a block of an image and changing of a prediction method applied to the block; a prediction unit that generates a prediction image according to the identification information set by the setting unit; a coding unit that codes the image by using the prediction image generated by the prediction unit, so as to generate a coded stream; and a transmission unit that transmits the coded stream generated by the coding unit and the identification information set by the setting unit.

[2] The image processing apparatus according to [1], in which the setting unit sets the identification information on the basis of a memory bandwidth which is a transmission rate at which a decoded image is read from a storage unit which stores the decoded image used to generate the prediction image.

[3] The image processing apparatus according to [1] or [2], in which the setting unit sets, as the identification information, information indicating a size of a block of which a prediction method is changed so that uni-prediction is applied instead of bi-prediction.

[4] The image processing apparatus according to [1] or [2], in which the setting unit sets, as the identification information, information indicating a size of a block of which a prediction method is changed so that uni-prediction is applied instead of bi-prediction, and a prediction direction of the uni-prediction applied instead of the bi-prediction.

[5] The image processing apparatus according to [1] or [2], in which the setting unit sets, as the identification information, information indicating a size of a block of which a prediction method is changed so that uni-prediction is applied instead of bi-prediction, and information indicating a prediction direction of the uni-prediction applied instead of the bi-prediction.

[6] The image processing apparatus according to any one of [1] to [5], in which the transmission unit transmits the identification information as a sequence parameter set (SPS) of the coded stream.

[7] An image processing method including a setting step of setting identification information for identifying a correspondence relationship between a size of a block of an image and changing of a prediction method applied to the block; a prediction step of generating a prediction image according to the identification information set in the setting step; a coding step of coding the image by using the prediction image generated in the prediction step, so as to generate a coded stream; and a transmission step of transmitting the coded stream generated in the coding step and the identification information set in the setting step.

[8] An image processing apparatus including a reception unit that receives identification information for identifying a correspondence relationship between a size of a block of an image and changing of a prediction method applied to the block, and a coded stream generated by coding the image; a prediction unit that generates a prediction image according to the identification information received by the reception unit; and a decoding unit that decodes the coded stream received by the reception unit by using the prediction image generated by the prediction unit.

[9] The image processing apparatus according to [8], in which the identification information is information indicating a size of a block of which a prediction method is changed so that uni-prediction is applied instead of bi-prediction.

[10] The image processing apparatus according to [8], in which the identification information is information indicating a size of a block of which a prediction method is changed so that uni-prediction is applied instead of bi-prediction, and a prediction direction of the uni-prediction applied instead of the bi-prediction.

[11] The image processing apparatus according to [8], in which the identification information is two information pieces including information indicating a size of a block of which a prediction method is changed so that uni-prediction is applied instead of bi-prediction, and information indicating a prediction direction of the uni-prediction applied instead of the bi-prediction.

[12] The image processing apparatus according to any one of [8] to [11], in which the reception unit receives the identification information which is transmitted as a sequence parameter set (SPS) of the coded stream.

[13] An image processing method including a reception step of receiving identification information for identifying a correspondence relationship between a size of a block of an image and changing of a prediction method applied to the block, and a coded stream generated by coding the image; a prediction step of generating a prediction image according to the identification information received in the reception step; and a decoding step of decoding the coded stream received in the reception step by using the prediction image generated in the prediction step.

EXPLANATION OF REFERENCE

100 IMAGE CODING DEVICE, 106 REVERSIBLE CODING UNIT, 121 CODING CONTROL UNIT, 143 MERGE FLAG CODING PORTION, 144 MERGE MODE CODING PORTION, 200 IMAGE DECODING DEVICE, 202 REVERSIBLE DECODING UNIT, 221 DECODING CONTROL UNIT, 243 MERGE FLAG DECODING PORTION, 244 MERGE MODE DECODING PORTION, 1001 INPUT PICTURE BUFFER, 1002 CALCULATION UNIT, 1003 ORTHOGONAL TRANSFORM UNIT, 1004 QUANTIZATION UNIT, 1005 ENTROPY CODING UNIT, 1006 INVERSE QUANTIZATION UNIT, 1007 INVERSE ORTHOGONAL TRANSFORM UNIT, 1008 CALCULATION UNIT, 1009 DEBLOCK FILTER, 1010 ADAPTIVE SAMPLE OFFSET UNIT, 1011 ADAPTIVE SAMPLE OFFSET ESTIMATION UNIT, 1012 ADAPTIVE LOOP FILTER, 1013 ADAPTIVE LOOP FILTER ESTIMATION UNIT, 1014 DPB, 1015 INTRA-DIRECTION ESTIMATION UNIT, 1016 INTRA-PREDICTION UNIT, 1017 MOTION ESTIMATION UNIT, 1018 INTER-PREDICTION UNIT, 1019 MODE DETERMINATION UNIT, 1021 SETTING UNIT, 2001 ENTROPY DECODING UNIT, 2002 INVERSE QUANTIZATION UNIT, 2003 INVERSE ORTHOGONAL TRANSFORM UNIT, 2004 CALCULATION UNIT, 2005 DEBLOCK FILTER, 2006 ADAPTIVE SAMPLE OFFSET UNIT, 2007 ADAPTIVE LOOP FILTER, 2008 DPB, 2009 INTRA-PREDICTION UNIT, 2010 INTER-PREDICTION UNIT, 2011 MODE SELECTION UNIT

The invention claimed is:

1. An image processing apparatus comprising:
circuitry configured to
set identification information for identifying a correspondence relationship between a size of a block of a plurality of blocks expressed by a layer structure of an image and changing of a prediction method applied to the block, wherein the prediction method is changed so that uni-prediction is applied instead of bi-prediction,
generate a prediction image according to the set identification information,
code the image by using the generated prediction image, so as to generate a coded stream, and
initiate transmission of the generated coded stream and the set identification information,
wherein the circuitry is further configured to set the identification information for prohibiting occurrence of bi-prediction of each block having a size of 8×8 on the basis of a current available memory bandwidth, which is a transmission rate at which a decoded image is read from a memory which stores the decoded image used to generate the prediction image.

2. The image processing apparatus according to claim 1, wherein the circuitry is further configured to set, as the identification information, information indicating the size of a block for which the prediction method is changed so that uni-prediction is applied instead of bi-prediction.

3. The image processing apparatus according to claim 1, wherein the circuitry is further configured to set, as the identification information, information indicating the size of a block for which the prediction method is changed so that uni-prediction is applied instead of bi-prediction, and a prediction direction of the uni-prediction applied instead of the bi-prediction.

4. The image processing apparatus according to claim 1, wherein the circuitry is further configured to set, as the identification information, information indicating the size of a block for which the prediction method is changed so that uni-prediction is applied instead of bi-prediction, and information indicating a prediction direction of the uni-prediction applied instead of the bi-prediction.

5. The image processing apparatus according to claim 1, wherein the circuitry is further configured to initiate transmission of the identification information as a sequence parameter set (SPS) of the coded stream.

6. The image processing apparatus according to claim 1, wherein, as the current memory bandwidth becomes smaller, the circuitry is further configured to set the identification information for prohibiting occurrence of bi-prediction of larger size blocks.

7. An image processing method, implemented via at least one processor, the method comprising:
setting identification information for identifying a correspondence relationship between a size of a block of a plurality of blocks expressed by a layer structure of an image and changing of a prediction method applied to the block, wherein the prediction method is changed so that uni-prediction is applied instead of bi-prediction;
generating a prediction image according to the set identification information;
coding the image by using the generated prediction image generated, so as to generate a coded stream; and
transmitting the generated coded stream and the set identification information, wherein setting the identification information further comprises prohibiting occurrence of bi-prediction of each block having a size of 8×8 on the basis of a current available memory bandwidth, which is a transmission rate at which a decoded image is read from a memory which stores the decoded image used to generate the prediction image.

8. The image processing method according to claim 7, wherein, as the current memory bandwidth becomes smaller, setting the identification information further comprises prohibiting occurrence of bi-prediction of larger size blocks.

9. An image processing apparatus comprising:
circuitry configured to
   receive identification information for identifying a correspondence relationship between a size of a block of a plurality of blocks expressed by a layer structure of an image and changing of a prediction method applied to the block, and a coded stream generated by coding the image, wherein the prediction method is changed so that uni-prediction is applied instead of bi-prediction,
   generate a prediction image according to the received identification information; and
   decode the received coded stream by using the generated prediction image,
wherein the identification information is information for prohibiting occurrence of bi-prediction of each block having a size of 8×8 on the basis of a current available memory bandwidth, which is a transmission rate at which a decoded image is read from a memory which stores the decoded image used to generate the prediction image.

10. The image processing apparatus according to claim 9, wherein the identification information is information indicating the size of a block for which the prediction method is changed so that uni-prediction is applied instead of bi-prediction.

11. The image processing apparatus according to claim 9, wherein the identification information is information indicating the size of a block for which the prediction method is changed so that uni-prediction is applied instead of bi-prediction, and a prediction direction of the uni-prediction applied instead of the bi-prediction.

12. The image processing apparatus according to claim 9, wherein the identification information comprises at least two information pieces including information indicating the size of a block for which the prediction method is changed so that uni-prediction is applied instead of bi-prediction, and information indicating a prediction direction of the uni-prediction applied instead of the bi-prediction.

13. The image processing apparatus according to claim 9, wherein the received identification information is transmitted as a sequence parameter set (SPS) of the coded stream.

14. The image processing apparatus according to claim 9, wherein, as the current memory bandwidth becomes smaller, the circuitry is further configured to receive the identification information for prohibiting occurrence of bi-prediction of larger size blocks.

15. An image processing method, implemented via at least one processor, the method comprising:
   receiving identification information for identifying a correspondence relationship between a size of a block of a plurality of blocks expressed by a layer structure of an image and changing of a prediction method applied to the block, and a coded stream generated by coding the image, wherein the prediction method is changed so that uni-prediction is applied instead of bi-prediction;
   generating a prediction image according to the received identification information; and
   decoding the received coded stream by using the generated prediction image,
wherein the identification information is information for prohibiting occurrence of bi-prediction of each block having a size of 8×8 on the basis of a current available memory bandwidth, which is a transmission rate at which a decoded image is read from a memory which stores the decoded image used to generate the prediction image.

16. The image processing method according to claim 15, wherein, as the current memory bandwidth becomes smaller, receiving the identification information further comprises receiving the identification information for prohibiting occurrence of bi-prediction of larger size blocks.

* * * * *